United States Patent
Pedersen et al.

(10) Patent No.: US 7,734,844 B2
(45) Date of Patent: Jun. 8, 2010

(54) TRUSTED INTERFACE UNIT (TIU) AND METHOD OF MAKING AND USING THE SAME

(75) Inventors: Robert Pedersen, Burnsville, MN (US); Basil Chambers, Minneapolis, MN (US); Patrick Sullivan, Minnetonka, MN (US); William O'Donnell, Minneapolis, MN (US)

(73) Assignee: General Dynamics Advanced Information Systems, Inc., Fairfax, VA (US)

( * ) Notice: Subject to any disclaimer, the term of this patent is extended or adjusted under 35 U.S.C. 154(b) by 795 days.

(21) Appl. No.: 10/921,228

(22) Filed: Aug. 19, 2004

(65) Prior Publication Data

US 2005/0198412 A1 Sep. 8, 2005

Related U.S. Application Data

(60) Provisional application No. 60/496,706, filed on Aug. 19, 2003.

(51) Int. Cl.
*G06F 3/00* (2006.01)
*G06F 15/173* (2006.01)
*G06F 7/04* (2006.01)
*H04L 29/06* (2006.01)

(52) U.S. Cl. .................. 710/36; 709/238; 709/215; 709/225; 713/160; 713/166; 726/2; 726/26

(58) Field of Classification Search ............ 710/7, 710/11, 20, 36, 42; 380/256, 37, 278; 709/238, 709/225, 215; 713/160, 166; 726/2, 26
See application file for complete search history.

(56) References Cited

U.S. PATENT DOCUMENTS

| 5,126,728 | A | * | 6/1992 | Hall | 726/30 |
| 5,204,961 | A | * | 4/1993 | Barlow | 726/1 |
| 5,577,209 | A | | 11/1996 | Boyle et al. | |
| 5,659,756 | A | * | 8/1997 | Hefferon et al. | 710/200 |
| 5,940,591 | A | | 8/1999 | Boyle et al. | |
| 6,289,462 | B1 | * | 9/2001 | McNabb et al. | 726/21 |
| 6,304,973 | B1 | * | 10/2001 | Williams | 726/3 |
| 7,370,348 | B1 | * | 5/2008 | Patel et al. | 726/5 |
| 2003/0110205 | A1 | * | 6/2003 | Johnson | 709/104 |

OTHER PUBLICATIONS

Richard Stevens, TCP/IP Illustrated, vol. 1: The Protocols, vol. 1, 1994.*

(Continued)

*Primary Examiner*—Alan Chen
(74) *Attorney, Agent, or Firm*—Steptoe & Johnson LLP

(57) ABSTRACT

The disclosure relates to a trusted interface unit and a method of making and using the same. According to one embodiment of the present invention, a method of transmitting data on a network may include receiving data from a partition within a node on the network. This node may be configured to transmit data associated with a number of sensitivity levels. According to one embodiment of the invention, these sensitivity levels may be classification levels. One method of transmission of data may include determining the identity of the partition that originated the data within the node. Furthermore, a label may be added to the data received from within the node and the data may be encrypted with a key that may be uniquely associated with the label on the data. After encryption, the data may be transmitted on the network. Additional methods including the reception of data are disclosed. Various node and network architectures are disclosed implementing the methods and apparatus of the present invention.

29 Claims, 34 Drawing Sheets

OTHER PUBLICATIONS

Greve, D. et al "A Separation Kernel Formal Security Policy"; ACL2 Workshop, Jul. 2003, pp. 1-12.

Alves-Foss J. "The Architecture of Secure Systems"; IEEE, 1998 pp. 1-10.

* cited by examiner

PHYSICAL VIEW

LOGICAL VIEW

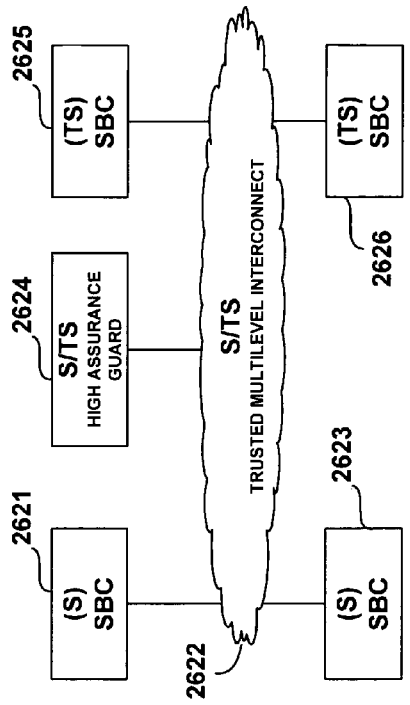
FIG. 5B
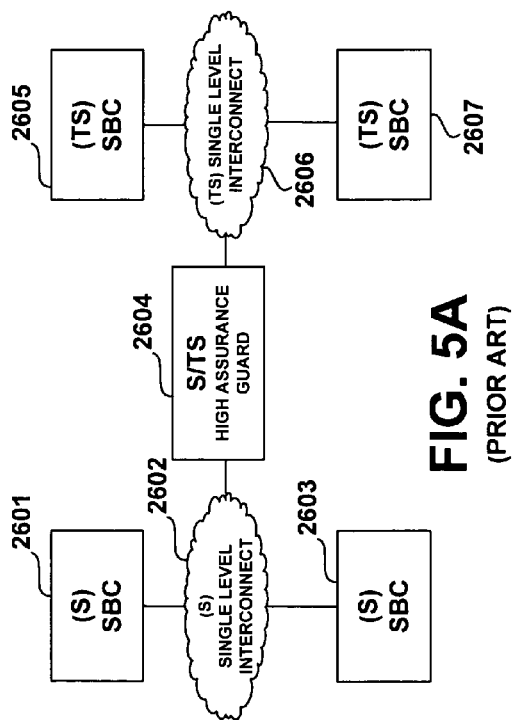
FIG. 5A (PRIOR ART)
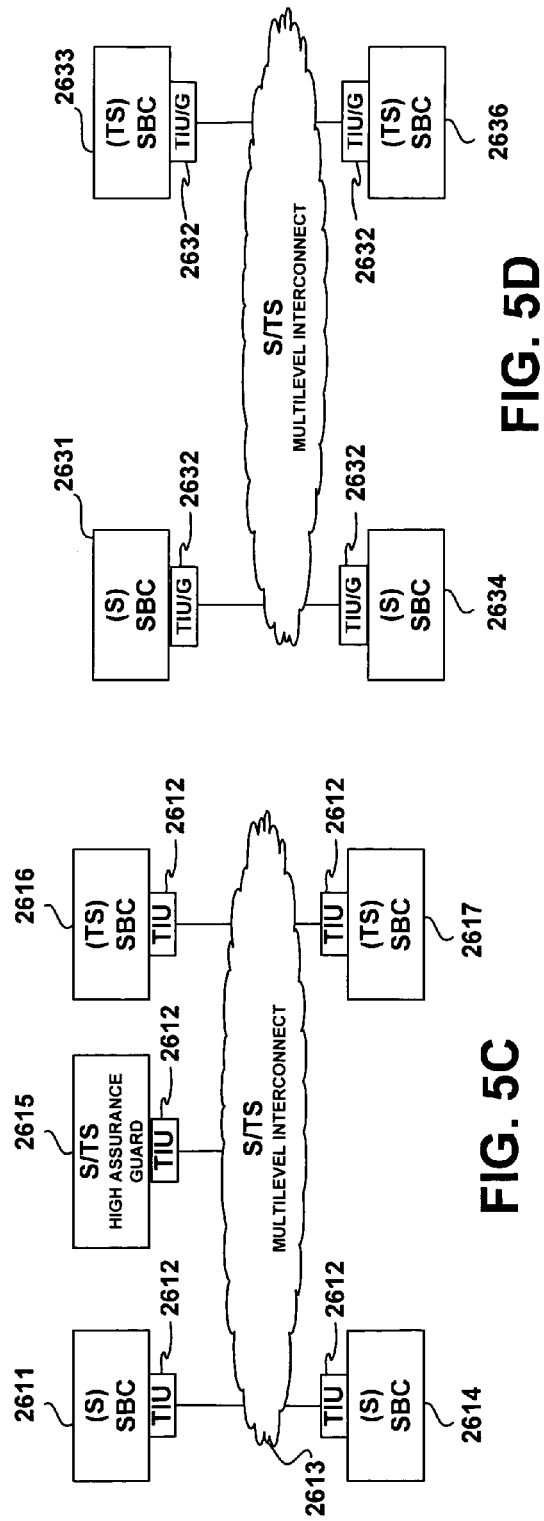
FIG. 5D
FIG. 5C

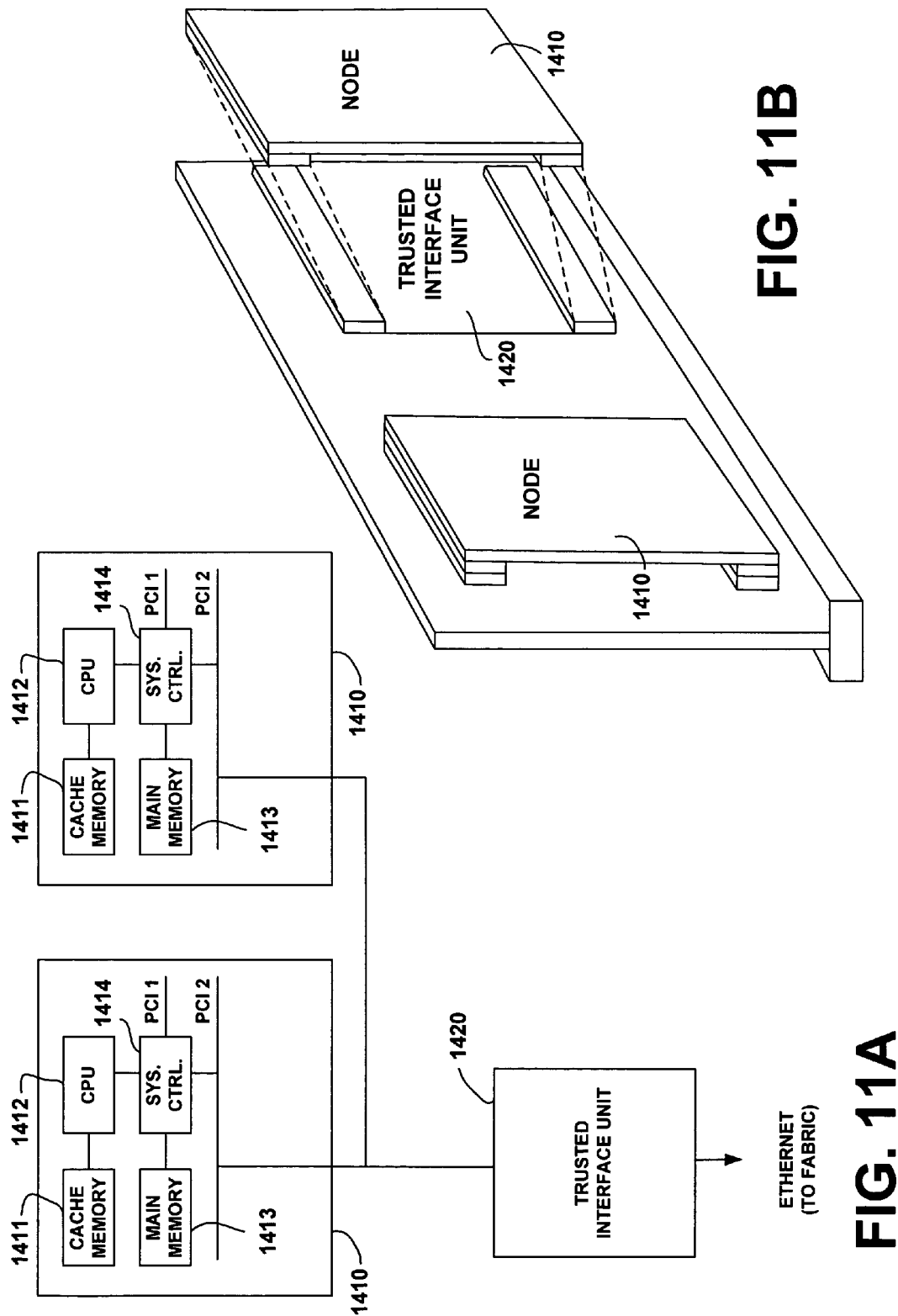

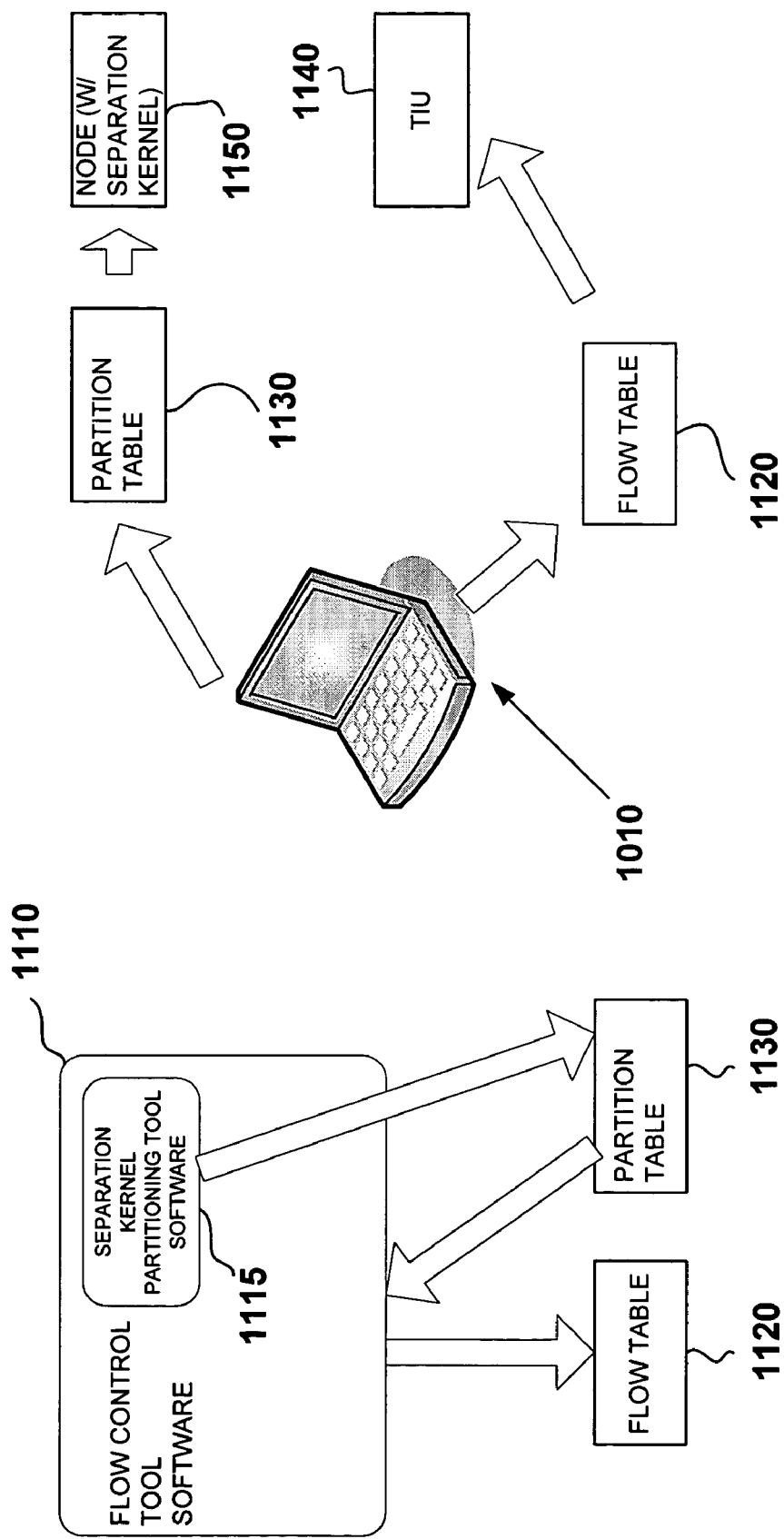

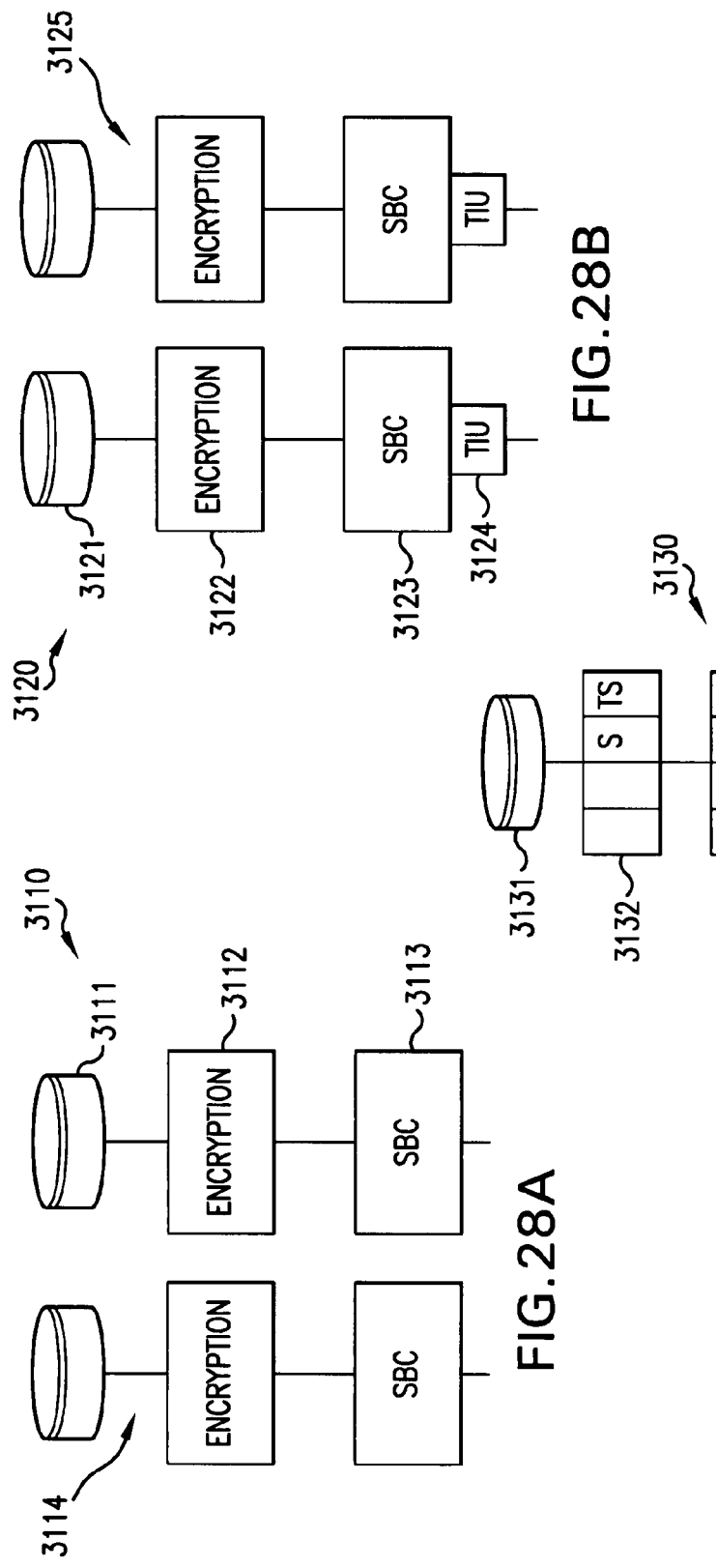

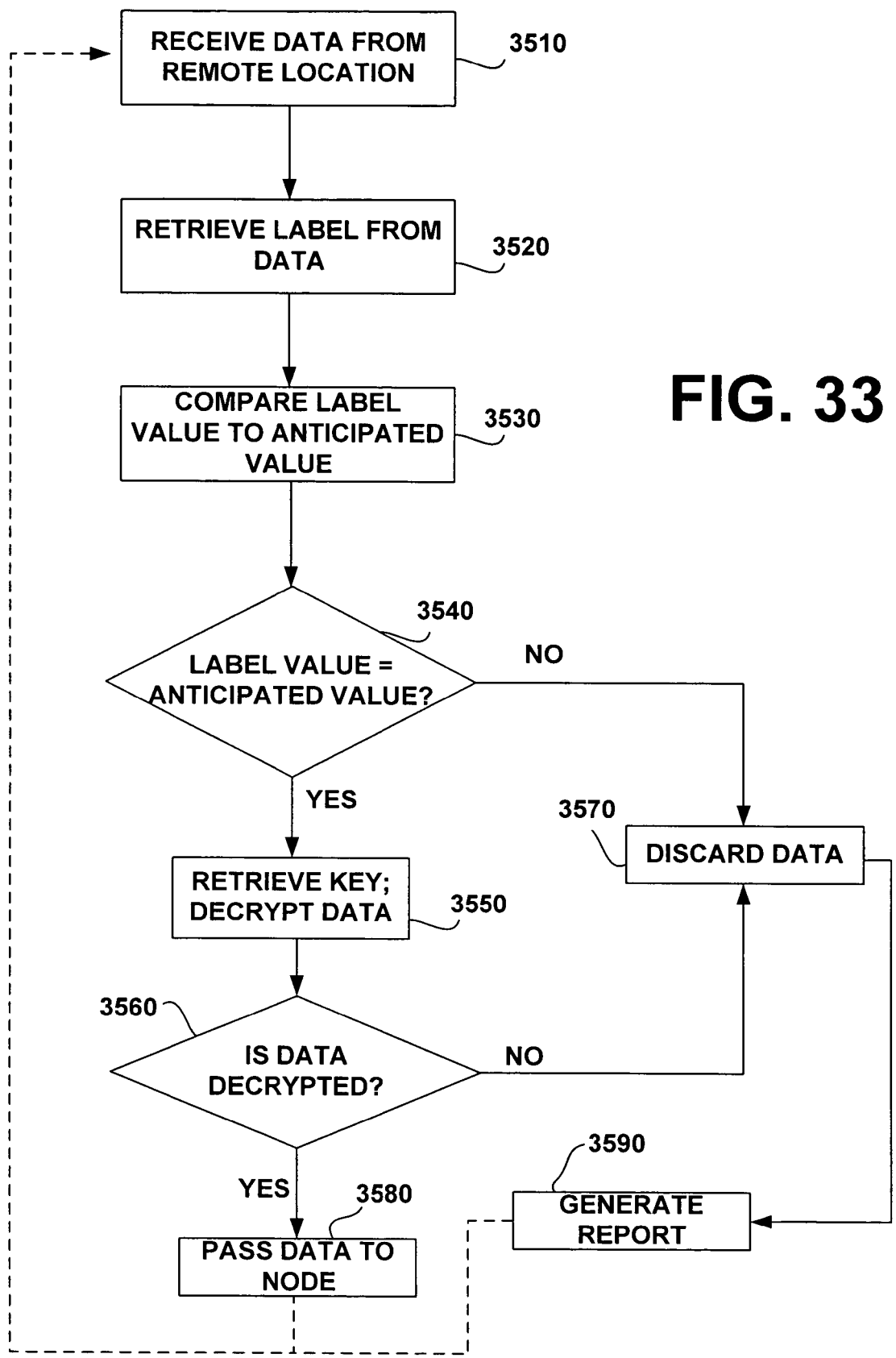

TRUSTED INTERFACE UNIT (TIU) AND METHOD OF MAKING AND USING THE SAME

CROSS REFERENCE TO RELATED APPLICATIONS

The present application is a non-provisional application based on U.S. provisional application No. 60/496,706,filed Aug. 19, 2003,entitled "Trusted Interface Unit", which is hereby incorporated by reference in its entirety.

FIELD OF THE INVENTION

The present invention relates generally to systems and methods for establishing trust on networks. More particularly, the present invention relates generally to a system and method for establishing trust on a network that is configured to transmit data having at least one sensitivity level associated with the data.

BACKGROUND OF THE INVENTION

The exchange of information across modern networks requires software and hardware that meet increasing stringent security measures. For example, in today's military networks, there is an increasing reliance on global information transfer to all tactical posts. To support this transfer of information, platforms may be expected to operate as nodes in a network-centric tactical environment. This network-centric environment may need to be configured to exhibit varying degrees of autonomy. Such network configurations, however, have safety and security implications for the entire computing infrastructure. This infrastructure may include, for example, real-time processing elements.

Of particular practical concern in the transmission of data that may have a predetermined sensitivity level is how these network-centric systems handle information at different sensitivity levels. In order to transmit information having a predetermined sensitivity level, a certain level of trust may need to be maintained. For example, embedded items within the network (e.g., data storage, processors etc.) may need to be trusted to maintain separation of processes running at different sensitivity levels. Furthermore, such embedded elements may be configured to ensure that access to classified objects (which may refer to passive entities that contain or receive information such as, for example, records, blocks, pages, segments, files, directories, etc.) is limited to appropriately classified subjects. Such classified subjects may include, for example, an entity that causes information to flow. In addition to these features, the embedded elements may be required to manage end-to-end information flow. This is sometimes referred to as data isolation and information flow policy within the network. The information flow policy may be created and/or manipulated by, for example, a network designer.

General requirements in secure networks such as, for example, military networks or intelligence agency networks, or any private secure network configured to transmit data having a plurality of predetermined sensitivities may be, for example: (1) the functions to restrict access and separate data based on predetermined sensitivities should be invoked by the embedded elements on the network; (2) the embedded elements should be configured so as to prevent bypassing; (3) the functions should not be tampered with, and may be, in a word, tamper-proof; and (4) they should have the ability to be evaluated so that they correctly function.

In the past, these general requirements have been met by keeping a variety of physically separate networks, such that the various nodes that are interconnected with one another are configured to handle information of only one sensitivity. By way of example, a number of embedded elements may be coupled together over a network for the transmission of classified information. These embedded elements may, however, only transmit and receive information of one predetermined sensitivity. In other words, all transmission pathways on the network handle data of one and only one predetermined sensitivity of data. Thus, for the transmission of data having a number of predetermined sensitivities, there may need to be a number of different networks having a number of predetermined sensitivities. These sensitivity levels may be, for example, classification levels associated with government-related or non-government-related classifications of information. Sensitivity levels may include classification levels, but may be more broad to include, for example, information that is restricted to certain parties such as between executives and employees within a corporation, for example.

Exemplary of this problem is that a plurality of embedded elements may be configured to handle information classified as secret. This information may only be received by other embedded elements that are configured to properly handle information of this classification. These embedded elements may be used by people having the proper security clearances and "need to know". One traditional means for ensuring that the appropriate nodes receive information that they are entitled to receive is ensuring that only "secret" embedded elements (or embedded elements having the appropriate permissions to access secret information) are connected to the network. Likewise, information having a classification of "top secret" would be transmitted over a separate network. This is problematic because operators at the nodes on the network may need to have a plurality of computers, one for each of the plurality of classification levels of data that they may receive. For example, it is not unheard of for an operator to have four computers, one for the transmission of top secret information, one for the transmission of secret information, one for the transmission of classified information, and finally, another for the transmission of unclassified information. This example assumes, of course, that the operator has the proper authorization to access such information. While specific references may be made herein to military networks, these problems may also exist in networks such as business-oriented networks such as, for example, wide-area networks (WANs), networks at universities, such as local area networks (LANs), or any network that is configured to handle classified or proprietary information.

An alternative solution to this problem has been to create a secure tunnel of information such that only computers on the tunnel can decrypt or communicate data over the network. This is known as a virtual private network (VPN) and is similar to a peer-to-peer (P2P) network connection where a given end point computer can only receive information of a given classification level. This network configuration and encryption, however, does not allow for the data on the network to have a number of different classifications. Once a computer or processor has entered or otherwise been added to the network, it may have permission to access information throughout the network. Thus, there is no means to properly segregate information based on classification of the data to prevent unauthorized access to the information.

Other traditional means of performing such tasks include the use of a separation kernel on single-processor elements that are configured to handle data having a plurality of predetermined sensitivity levels. Analogous to the separation of networks for the handling of classified information, a separation kernel may be employed to keep information of distinct sensitivities separate within a single processor. Thus, a separation kernel ensures that a processor's functions are associated with partitions that are designed to handle only one type of information. FIG. 1 shows an abstract view of a separation kernel that is known in the prior art for the separation of information within a single processor. As illustrated in FIG. 1, the separation kernel may be configured to ensure that only the information flows depicted by the arrows actually occur. Furthermore, the separation kernel may be configured to ensure that no critical task is bypassed. Finally, another purpose of the separation kernel is to ensure that each task's private data remains private, i.e., that other partitions cannot detect, even by deduction, that another partition is receiving or processing data. One partition should be configured such that it is not aware of the other partitions and it is, itself transparent to the other partitions.

As illustrated in FIG. 1, the separation kernel 100 may include a red protocol machine ("RPM") 110, which may be configured to receive unencrypted data (i.e., red data) from, for example, a partition within a processor or computer. The red protocol machine 110 may also receive information from the red verifier ("RV") 121, which is being sent into the processor or computer. When red data is received by the red protocol machine 110, it is transferred to a trusted red switch ("TRS") 120, which is trusted to receive red information and route that information to the proper encryption algorithm E1, E2, or E3 130, 131, 132, respectively. In one configuration, the separation kernel 100 may include an encryption algorithm that is uniquely associated with the particular sensitivity of information. Furthermore, the trusted red switch 120 may be configured to route data of a particular sensitivity to the correct associated encryption algorithm. Once the appropriate encryption algorithm 130, 131, 132 has been applied to the data, the data may be output to the black verifier ("BV") 140, which may be configured to ensure that the data output from the encryption algorithms is properly encrypted. The black verifier 140 may then pass the data on to the black protocol machine ("BPM") 150. The black protocol machine 150 may be configured to receive encrypted data (i.e., black data) from both the black verifier 140 and from other locations within a processor or computer, such as, for example, a storage device. The black protocol machine 150 may receive this data and send it to a black switch ("BS") 140. The black switch 140 may be configured to receive encrypted data from the black protocol machine 150 and route that data to the appropriate decryption algorithm for further processing. The decryption algorithms (D1, D2, D3) 133, 134, 135 may be associated with particular types of classified data that may be utilized in the system. Furthermore, decryption algorithms 133, 134, and 135 may be configured to decrypt data that was encrypted with an associated encryption algorithm 130, 131, or 132. After the data has been decrypted by the decryption algorithms 133, 134, 135 it may be passed to the red verifier ("RV") 121, which may be configured to ensure that the data has been appropriately decrypted and to send the data into the red protocol machine 110 to be input into a proper partition within, for example, the processor, for further processing.

The separation kernel is one example of how information of different sensitivities may be permitted to flow within a given processor. Using a separation kernel, an operating system may be configured to be trusted to ensure that the information flow within the processor can be trusted not to improperly allow access to classified information. The separation kernel, however, has been traditionally limited to single-processor systems. The prior art has failed to prove that the same level of trust may be maintained when the information is flowing on a common network between computers having different permissions and which may be configured to have access to predetermined sensitivities or classifications of information.

Thus, there is a need for a network that can support nodes operating at different security levels while being physically connected together over the same network fabric. There is also a need for a hardware and/or software configuration that can be trusted to ensure that security violations do not occur when multiple nodes operating at various sensitivity or classification levels are networked together over the same network fabric. These and other objects, separately and/or in combination are some of the exemplary objects of the present invention.

SUMMARY OF THE INVENTION

The present invention includes a trusted interface unit and a method of making and using the same. According to one embodiment of the present invention, a method of transmitting data on a network may include receiving data from a partition within a node on the network. This node may be configured to transmit data associated with a number of sensitivity levels. According to one embodiment of the invention, these sensitivity levels may be classification levels. One method of transmission of data may include determining the identity of the partition that originated the data within the node. Furthermore, a label may be added to the data received from within the node and the data may be encrypted with a key that may be uniquely associated with the label on the data. After encryption, the data may be transmitted on the network.

According to another embodiment of the present invention, a method of transmitting data over a network may include receiving data to be transmitted over the network from a node. According to one aspect of the present invention, the node may be configured to handle data having a sensitivity level. After the data is received, a label may be added to the data. This label may be associated with the sensitivity level of the node. The data may be encrypted as well. This may occur either before or after the label has been added. According to one aspect of the present invention, the label may be added to the header of a packet to be transmitted over the network and may be unencrypted. The encryption of the data may include the use of a key associated with the sensitivity level of the node. After encryption of the data, the data may be transmitted over the network.

According to another aspect of the present invention, a method of receiving data over a network may include receiving data from a remote location. This data may be encoded with a label. Based on this label, a cryptographic key may be retrieved. This key may be associated with the label encoded on the received data. The label may be compared to an anticipated value. The data may be decrypted using the key. If the data is decrypted, the data may be passed into an appropriate partition within the local node based on the label. If the data is not decrypted, the data may be discarded. According to another aspect of the present invention, a report may be generated indicating that the data was discarded.

According to yet another embodiment of the present invention, a method of receiving data over a network may include receiving data at a local node from a remote location. This data may be encoded with a label and the local node may be associated with a sensitivity level. A cryptographic key may be retrieved based on the sensitivity level of the local node. A value associated with the label may be compared with an anticipated value. When the value associated with the data does not match the anticipated value, the data may be discarded. If the value associated with the data does match the anticipated value, the data may be input into the node. Additionally, if the cryptographic key fails to decrypt the data, then the data may be discarded. If the cryptographic key properly decrypts the data, then the data may be input into the node.

According to another aspect of the present invention, a method of transmitting and receiving data over a network may include receiving data from a partition within a first node on the network. This first node may be configured to handle data associated with a number of sensitivity levels. The identify of the partition may be determined. This partition may be associated with a sensitivity level from the number of sensitivity levels. A label may be added to the data received from the partition. The data may be encrypted with a cryptographic key that is uniquely associated with the label added to the data. This data may then be transmitted over the network. This data may be received from the first node and may include the label added at the first node. A cryptographic key may be retrieved based on the label. The data may be decrypted using the retrieved cryptographic key. A value associated with the label may be compared with an anticipated value. When the value associated with the data does not match the anticipated value, the data may be discarded. If the value associated with the data does match the anticipated value, the data may be input into the node. Additionally, if the cryptographic key fails to decrypt the data, then the data may be discarded. If the cryptographic key properly decrypts the data, then the data may be input into the node.

A trusted interface unit (TIU) according to an embodiment of the present invention may include, for example, a data processing element, the data processing element being configured to run application software and to receive data from a data interface. The TIU may also include an encryption/decryption element, the encryption/decryption element being configured to receive cryptographic keys and being configured to decrypt data received from a network interface. Finally, TIU may also include a network interface processing element. This network interface processing element may be configured to add a label to data being output on to the network and being configured to identify a label added to data received from a remote location on the network.

The present invention may be embodied as either a software configuration or a software and hardware configuration as will be described in further detail. As will be understood by one of skill in the art, the software and hardware/software configurations of the present invention may include processor-readable code stored on a computer-readable medium. Furthermore, while specific embodiments of the invention may include method steps being performed by software and/or hardware, one of skill in the art will be able to implement the methods and apparatus of the present invention using numerous different combinations thereof.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, wherein:

FIG. 5A shows a network using enclaves according to a conventional network without the use of labels or a TIU;

FIGS. 5B, 5C, and 5D shows various representations of networks according to various embodiments of the present invention;

FIGS. 11A and 11B show a functional view and a physical view of a TIU installed at a node on a network, respectively, according to yet another embodiment of the invention;

FIG. 13A shows an integrated flow control tool according to an exemplary embodiment of the present invention;

FIG. 13B shows the loading of a flow table into a TIU according to an exemplary embodiment of the invention;

FIGS. 28A-C show examples of how storage devices may be utilized in connection with TIU according to one embodiment of the invention;

FIG. 33 shows a flow chart of a method of receiving data according to one embodiment of the present invention.

DETAILED DESCRIPTION OF THE INVENTION

The present disclosure will now be described more fully with reference to the Figures in which various embodiments of the present invention are shown. The subject matter of this disclosure may, however, be embodied in many different forms and should not be construed as being limited to the embodiments set forth herein.

Figure 2A:
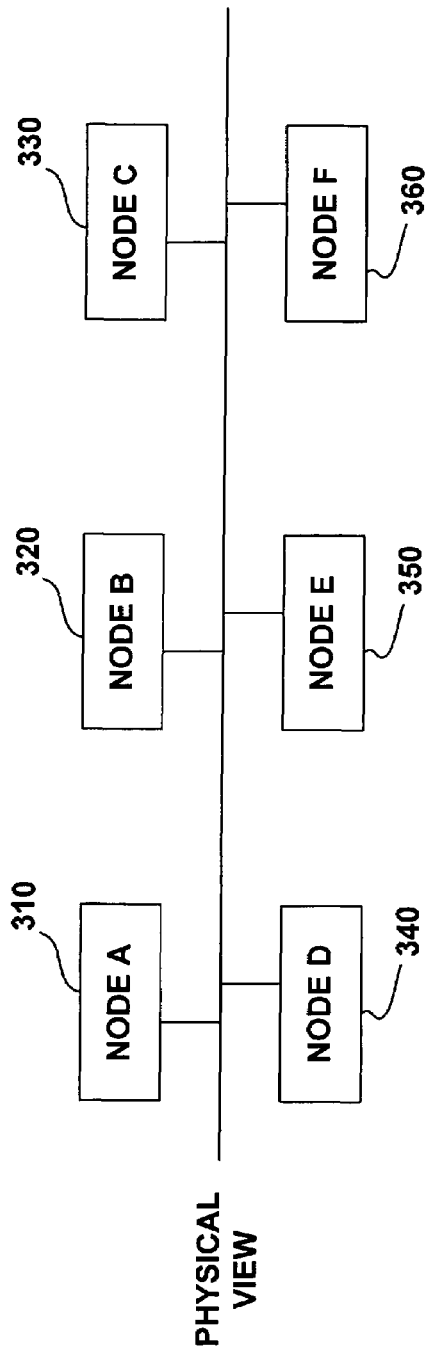
FIGS. 2A and 2B show a physical view of a network and a logical view of the same network utilizing flow labels according to one aspect of the present invention, respectively.
Figure 2B:
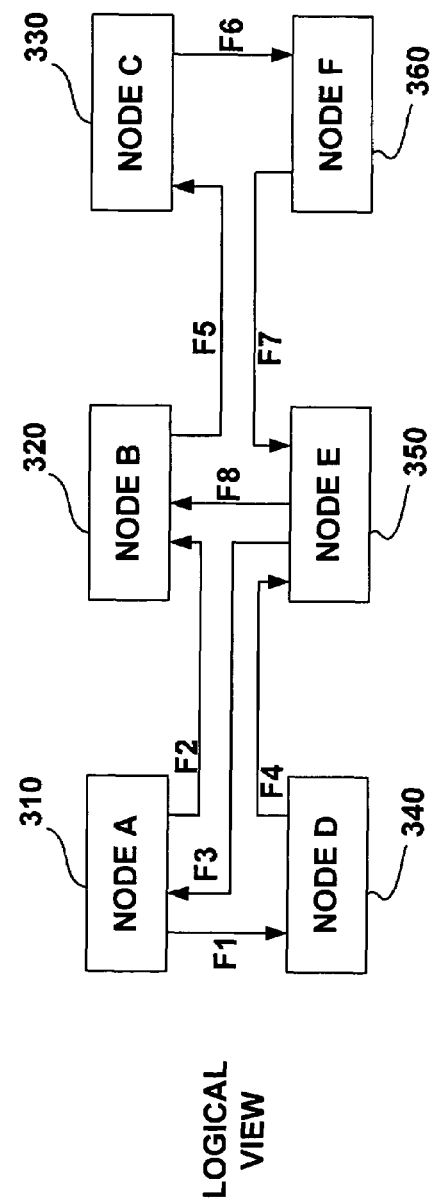

FIGS. 2A and 2B show a physical view of a network and a logical view of the same network utilizing flow labels according to one aspect of the present invention, respectively. Specifically, as illustrated in FIG. 2A, Node A 310 is physically coupled to Node B 320, Node C 330, Node D 340, Node E 350, and Node F 360. Thus, in a traditional simple network configuration, Node A may be configured to communicate with any of the other nodes B-F on the network. This, however, may not be permissible for some applications where the information to be transmitted is of a secure nature. The common network may be utilized, however, using flow labels to restrict the flow of data between nodes.

For example, FIG. 2B shows the use of exemplary flow labels to restrict the flow of information between different nodes on the network shown in FIG. 2A. As shown in FIG. 2B, Node A 310 may be configured to output data to Node D 340 and Node B 320. Node A 310 may also be configured to receive information from Node E 350. Node A 310 may be configured to encode packets of data with a flow label F1 to send the data to Node D 340. Alternatively, Node A 310 may be configured to encode packets of data leaving Node A 310 with a flow label F2 to indicate that the packet should be sent to Node B 320. These flow labels may be located, for example, in the packet header, which may be either encrypted or unencrypted depending on the security specifications provided by the network designer.

As shown in FIG. 2B, Node B 320 may be configured to transmit data to Node C 330 only. Furthermore, Node B 320 may be configured to receive information from Node A 310, as described above, and Node E 350. Node B may be configured to encode packets leaving the node with a flow label F5 indicating that the packets of data from Node B 320 can flow to Node C 330. Node C 330 may be configured to receive packets of data from Node B 320 and may transmit packets of data to Node F 360. Node C 330 may be configured to encode packets of data leaving the node with a flow label F6 such that the packets may be appropriately routed to Node F 360. It should be understood that the data flows shown in FIG. 2B are merely exemplary and that many different data flows are possible.

Node F 360 may be configured to receive packets of data from Node C 330. Furthermore, Node F 360 may be configured to output packets of data only to Node E 350, as shown in FIG. 2B. Node F 360 may be configured to encode the data packets leaving Node F 360 with a flow label (F7) that mandates that the packets be routed to Node E 350. As shown in FIG. 2B, Node F 360 may be configured such that the only node that it may transmit packets of data to is Node E 350. Node E 350 may be configured to receive packets from Node F 360 and Node D 340. Furthermore, Node E 350 may be configured to transmit packets of data to either or both Node A 310 and Node B 320. Node E 350 may be configured to encode the packets leaving the node for Node B 320 with a flow label F8, indicating that the data packets are to be routed to Node B 320. Furthermore, Node E 350 may be configured to encode data packets that are being sent to Node A 310 with a flow label F3 such that the packets of data are routed properly between Node E 350 and Node A 310. Finally, Node D 340 may be configured to receive data from Node A 310, as discussed in detail above. Node D 340 may also be configured to transmit data to Node E 350. Node D 340 may be configured to encode packets of data with a flow label F4 such that the packets are appropriately routed between Node D 340 and Node E 350. In the exemplary embodiment illustrated in FIG. 2B, the foregoing data flows are the only permissible data flows in the network, despite the physical interconnectivity of the nodes on the network as shown in FIG. 2A.

The exemplary network illustrated in FIG. 2B may be implemented using a trusted interface unit (TIU) at the network side of each of the nodes. According to one embodiment of the invention, the TIU may be configured to simply route the data either into the node or reject the data based on any number of factors such as, for example, a classification or sensitivity level associated with the data. Various exemplary implementations of the TIU will be discussed in more detail below. The sensitivity levels may be, for example, classification levels associated with government-related or non-government-related classifications of information. Sensitivity levels may include classification levels, but may be more broad to include, for example, information that is restricted to certain parties such as between executives and employees within a corporation, for example.

Figure 3A:
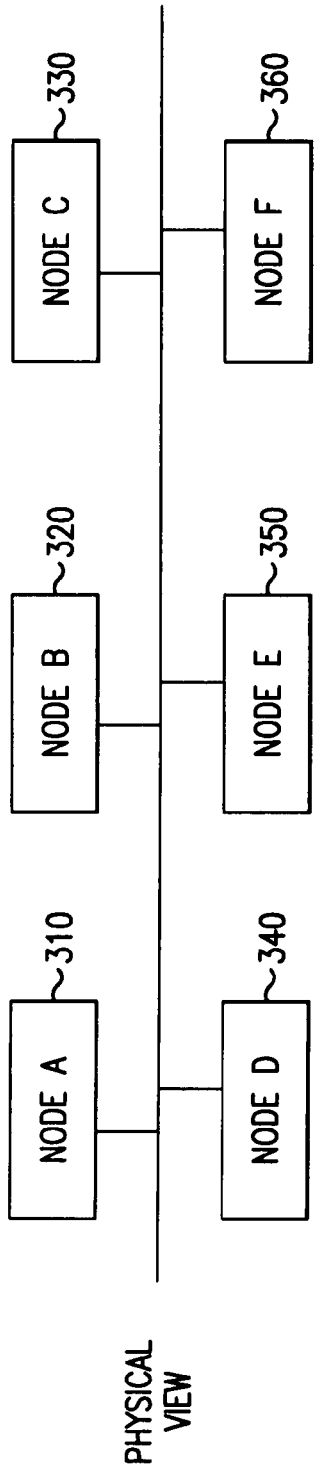
FIGS. 3A and 3B show a physical view of a network having classified enclaves and a logical view of a network having classified enclaves, respectively.
Figure 3B:
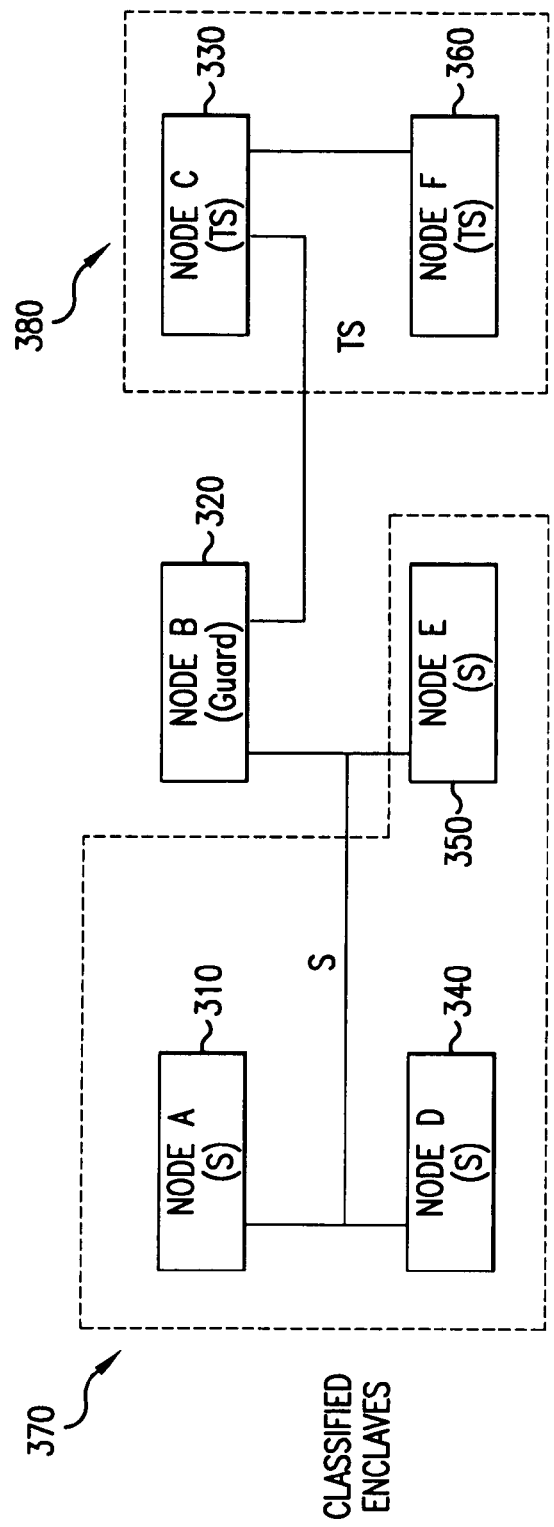

FIGS. 3A and 3B show a physical view of a network having classified enclaves and a logical view of a network having classified enclaves, respectively. Specifically, FIG. 3A is similar to FIG. 2A in that it illustrates a number of nodes A-F, 310, 320, 330, 340, 350, and 360, which are physically connected together. In the illustrated exemplary embodiment, the nodes A-F are configured to handle information associated with at least one sensitivity level. In one embodiment, the network may be configured to handle data having a first sensitivity level and a second sensitivity level. In the network shown in FIG. 2A, nodes 310, 320 and 350 may be configured to process or otherwise handle secret data, and nodes 330 and 360 may be configured to process or otherwise handle top secret data. Any number of classification levels may be associated with the data to be transmitted on a network employing the present invention. For example, the information may be classified as classified, secret, or top secret. Various other sensitivities of information may be possible depending on the application for which the network is being used. Thus, it is not necessary that the information be classified using the government classification system set forth by executive order. All that may be required is that the information have different levels of sensitivity, or that different classes of users may be permitted access to a set or subset of data traveling on the network.

FIG. 3B shows the network illustrated in FIG. 3A as a number of classified enclaves. The dashed lines in FIG. 3B show that there are two enclaves, a secret ("S") enclave 370 and a top secret ("TS") enclave 380. The secret enclave 370 may include, for example, Node A 310, Node D 340 and Node E 350, each of which may be configured to process or otherwise handle information that is classified as, for example, secret. Additionally, the top secret enclave 380 may include Node C 330 and Node F 360, each of which may be configured to process or otherwise handle top secret information. Node B 320 is a guard node. Node B 320, the guard node, may be configured to allow the transfer of information from the secret enclave to the top secret enclave. Because the system illustrated in FIG. 3B uses classification levels, this ensures that the secret information remains confined to the secret enclave 370, as well as the guard node 320, while top secret information is confined to the top secret enclave 380 and the guard Node B 320. Data may be transmitted within the secret enclave using the appropriate classification label associated with the secret information being transmitted. Likewise top secret information may be transmitted in top secret enclave 380 if the appropriate classification label designates that the information being transmitted is top secret. Classification labels are similar to flow labels. According to one aspect of the present invention, flow labels may be configured to provide the data to all nodes on the network that are configured to process or otherwise handle a predetermined classification or classifications of data, while flow labels may be configured to provide the data to specific nodes that may be configured to process or otherwise handle a predetermined classification or classifications of data. In other words, the use of flow labels may permit the nodes to transmit data with a higher level of granularity than classification labels. Depending on the application either flow labels, classification labels or both may be used in connection with the present invention.

The exemplary network illustrated in FIGS. 3A and 3B may be deployed as a multi-level secure ("MLS") network. Such MLS systems may require that data at different security levels be kept separate from each other. In an MLS system, as shown in FIG. 3B, the communication paths between security enclaves may be via a specifically trusted device, such as, for example, a guard node, Node B 320. The guard (Node B 320) may be configured to ensure that all such inter-enclave communication is in conformance with the system security policy, which may be established prior to deployment of the network, for example. This policy may be subject to revision over time by a network designer or administrator.

In some embodiments, each of the nodes may include a processor running an operating system with a separation kernel. The separation kernel, however, may not be needed if a processor is assigned to a single security enclave because the processor will not need to partition the operations based on the sensitivity of the information being processed. In one embodiment of the invention, as will be discussed in more detail below, separate security enclaves may be defined on common physical equipment, such as processors, data storage devices, and interconnect paths, and the like. As discussed above, this separation may be performed, in part using a separation kernel. The separation kernel may be configured to maintain the security enclave boundaries within a single processor i.e., rather than physical enclaves, the separation kernel may establish virtual enclaves. However, according to one aspect of the present invention, security labels, or flow labels may be used to maintain enclave boundaries while using a common data link.

Figure 4:
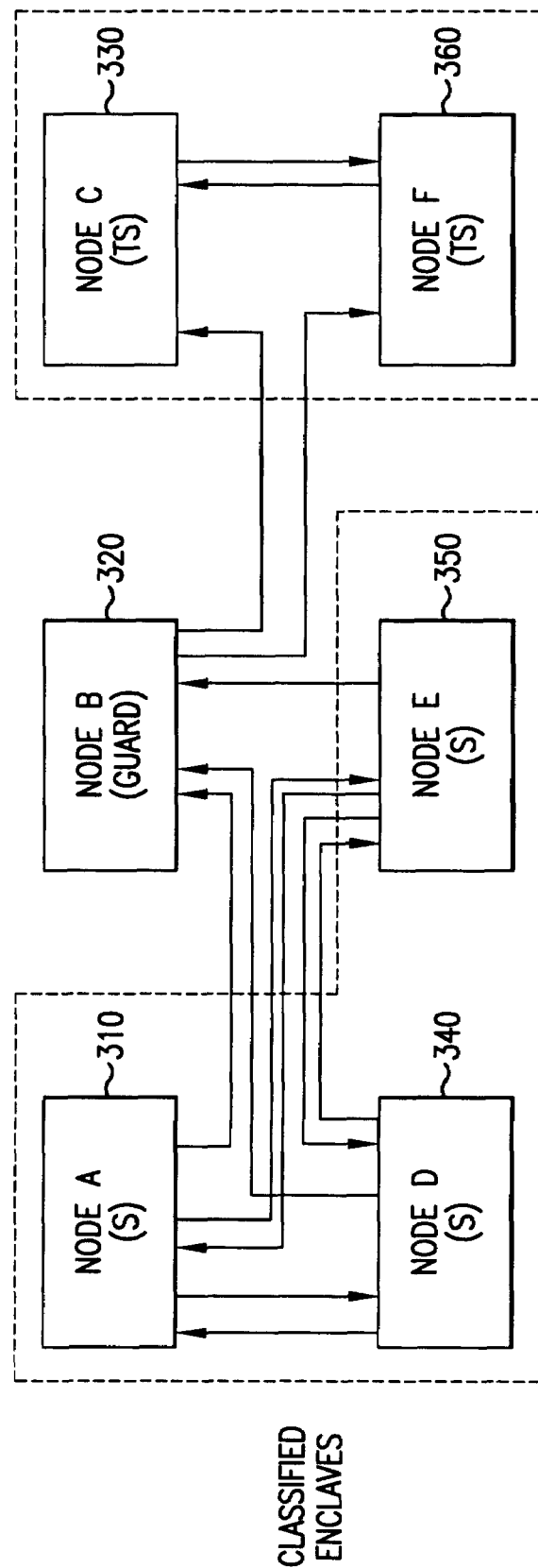
FIG. 4 shows a logical view of a network having classified enclaves and the use of flow labels to direct network traffic according to another aspect of the present invention.

A classification-based virtual security architecture including classification-based security enclaves may be implemented with flow labels rather than classification labels. FIG. 4 shows a logical view of a network having classified enclaves and utilizing flow labels according to another aspect of the present invention. As shown in FIG. 4, a network 400 may include nodes A-F, 310, 320, 330, 340, 350, and 360, each of which may be connected physically to each of the other nodes, as shown in FIGS. 2A and 3A, discussed above. As shown in FIG. 4, Node A 310, Node D 340, and Node E 350, may engage in bidirectional communication with one another, i.e., they may transmit and receive information to and from one another. Furthermore, Node A 310, Node D 340, and Node E 350 may be configured to transmit data to the guard Node B 320 for transmission into the top secret enclave. Node A 310, Node D 340, and Node E 350 may not, however, be configured to receive any information from the guard node, Node B 320. Node C 330 and Node F 360 may be configured to engage in bidirectional communications with one another. Node C 330 and Node F 360 may also be configured to receive data from the guard node, Node B 320. In the exemplary embodiment illustrated in FIG. 4, the top secret nodes, which form a top secret enclave, are not configured to transmit data to the guard node, Node B 320. There may be a network configuration, however, in which transmission of, for example, top secret data from the top secret nodes, Node C 330 and Node F 360 may be required to communicate with other top secret nodes on the network through a guard unit to ensure that the data is properly routed to another top secret node.

FIGS. 5A, 5B, 5C, and 5D are various examples of networks according to various embodiments of the present invention. FIG. 5A shows another representation of a system architecture using secure enclaves, as was described in detail with respect to FIGS. 3A and 3B. FIG. 5A shows a network having separate security enclaves for the handling of secret and top secret information. One enclave has been defined as the secret enclave and includes a first single board computer ("SBC") 2601 that is configured to process or to otherwise handle secret information and a second SBC 2603 that is also configured to process or otherwise handle secret information. The first SBC 2601 and the second SBC 2603 may be connected to one another via a network, which is represented by cloud 2602. The network fabric 2602 may include, for example, a single-level interconnect, and may be configured to handle information of one classification level.

FIG. 5A shows a network configuration that is used in current practice. The single level interconnect network fabric 2602 may connect SBCs handling secret information. Additionally, the network illustrated in FIG. 5A may also include two additional SBCs, a third SBC 2605, the third SBC 2605 being configured to process or otherwise handle secret information and a fourth SBC 2607. This fourth SBC 2607 may be configured to process or otherwise handle top secret information. The third SBC 2605 and the fourth SBC 2607 may be connected to one another via a network fabric, which is represented by cloud 2606. As conventionally used, the network fabric 2606 may be configured to route top secret information from SBC 2605 to SBC 2607. The network fabric 2606 must be a single-level interconnect, which is configured to handle information that has a predetermined sensitivity, in this instance, top secret information. Thus, the conventional system fails to meet the needs that the present invention meets, such as, for example, providing one infrastructure that may be shared by nodes that have different associated sensitivity levels.

Conventionally, there may be very few restrictions on the hardware and software that populate the different security enclaves. In the embodiment depicted in FIG. 5A, the only way for information to flow from one security enclave to the other security enclave is through a secret/top secret ("S/TS") high assurance guard node 2604. Therefore, there are simply no paths for data to be transmitted from one security enclave to another, except for through the pathway that requires the data to pass through the guard node 2604. This approach does not permit sharing of network infrastructure or allow nodes to process or share data at more than one level.

FIG. 5B shows a system architecture having a common trusted system interconnect connecting two security enclaves and having a guard node. For example, the network configuration may include four SBCs. A first SBC 2621 and a second SBC 2623 may be configured to process or otherwise handle secret information. The third SBC 2625 and the fourth SBC 2626 may be configured to process or otherwise handle top secret information. The first SBC 2621, the second SBC 2623, the third SBC 2625 and the fourth SBC 2626 may be interconnected to one another over a S/TS trusted multilevel interconnect 2622, which defines the network fabric. Various implementations of this configuration will be discussed in detail with respect to FIGS. 24-26, below. The multilevel nature of the interconnect lies in that the interconnect is configured to carry data that originates in processors that may be configured to handle data at different sensitivity levels from each other (e.g., processors running a separation kernel). According to one aspect of the present invention, the data may be encrypted prior to being transmitted over the network 2622.

In this embodiment of a network architecture that may utilize a TIU, any given processor may be configured to process data of a single security level. This may be essentially the same as the system architecture having isolated enclaves, as illustrated in FIG. 5A. The difference here is that all the processors on the network (e.g., the first SBC 2621, the second SBC 2623, the third SBC 2625, and the fourth SBC 2626) may be connected to one another via a common system interconnect regardless of the type of data that is being processed. To ensure that the data received at each of the SBCs is of the correct sensitivity, the interconnect may include a trusted fabric implemented by a number of TIUs being located at the routing interfaces within the network fabric to ensure that the packets of data are routed to the appropriate destinations. Additionally, the TIUs of the present invention may be configured to cooperate to ensure that the data is routed only as directed by, for example, a system designer.

In the example illustrated in FIG. 5B, to get from a secret processor (e.g., SBC 2621 or SBC 2623) to a top secret processor (e.g., SBC 2625 or SBC 2626), the data may be routed through a high assurance guard 2624. The process is essentially the same as for the embodiment illustrated in FIG. 5A, and discussed above. The substantial difference in system architecture is that in the architecture illustrated in FIG. 5B, the non-bypassability of the guard may not necessarily be performed by physical cabling, but by the TIUs in the switching fabric, for example.

Because of the important function that the TIUs serve in this exemplary architecture, it may be necessary that all attachments to the system interconnect be done using a TIU, as will be described herein. If there is a device that does not lend itself to the incorporation of a TIU, it may be connected through another device that directly or indirectly interfaces with the network fabric via a TIU, as will be described in detail below. That intermediate device may be configured to act on behalf of the device that is not connected to the network directly. Additionally, the attached device may only be configured to process information of a single security level, unless a separation kernel is used at the node. Additionally, it should be understood that a peripheral device that is configured to receive information of a first predetermined classification, such as, for example, secret information, should not be interconnected with a device that is configured to receive information of a second predetermined classification, such as, for example, classified information because this may lead to improper access and/or denial of access to information.

FIG. 5C shows a network architecture in which the first SBC 2611, a second SBC 2614, a third SBC 2616, and a fourth SBC 2617 may be interconnected to each other over an insecure network fabric (i.e., the network may not be "trusted" within the meaning of the present. invention). Each of the SBCs 2611, 2614, 2616, and 2617 may be associated with a respective TIU 2612, which may be located at the input into the SBC, such as, for example, at an Ethernet card. In this embodiment, the network interconnect 2613 need not be a trusted fabric because the TIUs may be located at each node in the network to ensure the proper routing of information through the network fabric. As in the exemplary network architecture illustrated in FIG. 5B, the data flow to the guard 2615 when the data is exchanged between a secret SBC (e.g., 2611 or 2614) to a top secret node (e.g., 2616 or 2617) may be ensured by the TIUs 2612.

FIG. 5D shows an exemplary network architecture in which each TIU element 2632 may include the functionality of a high-assurance guard. The functions of the TIU/guard (TIU/G) unit 2632 may be the same as the TIU and the guard separately, however, the packaging and the software may merely be integrated with one another. The primary difference in the configuration illustrated in FIG. 5D from that illustrated in FIG. 5C is that each attached processor has a local guard function, so it may not be necessary for the inter-sensitivity-level data to make a stop at a central guard function and thus the transmission rate of data across the network may be improved.

Figure 1:
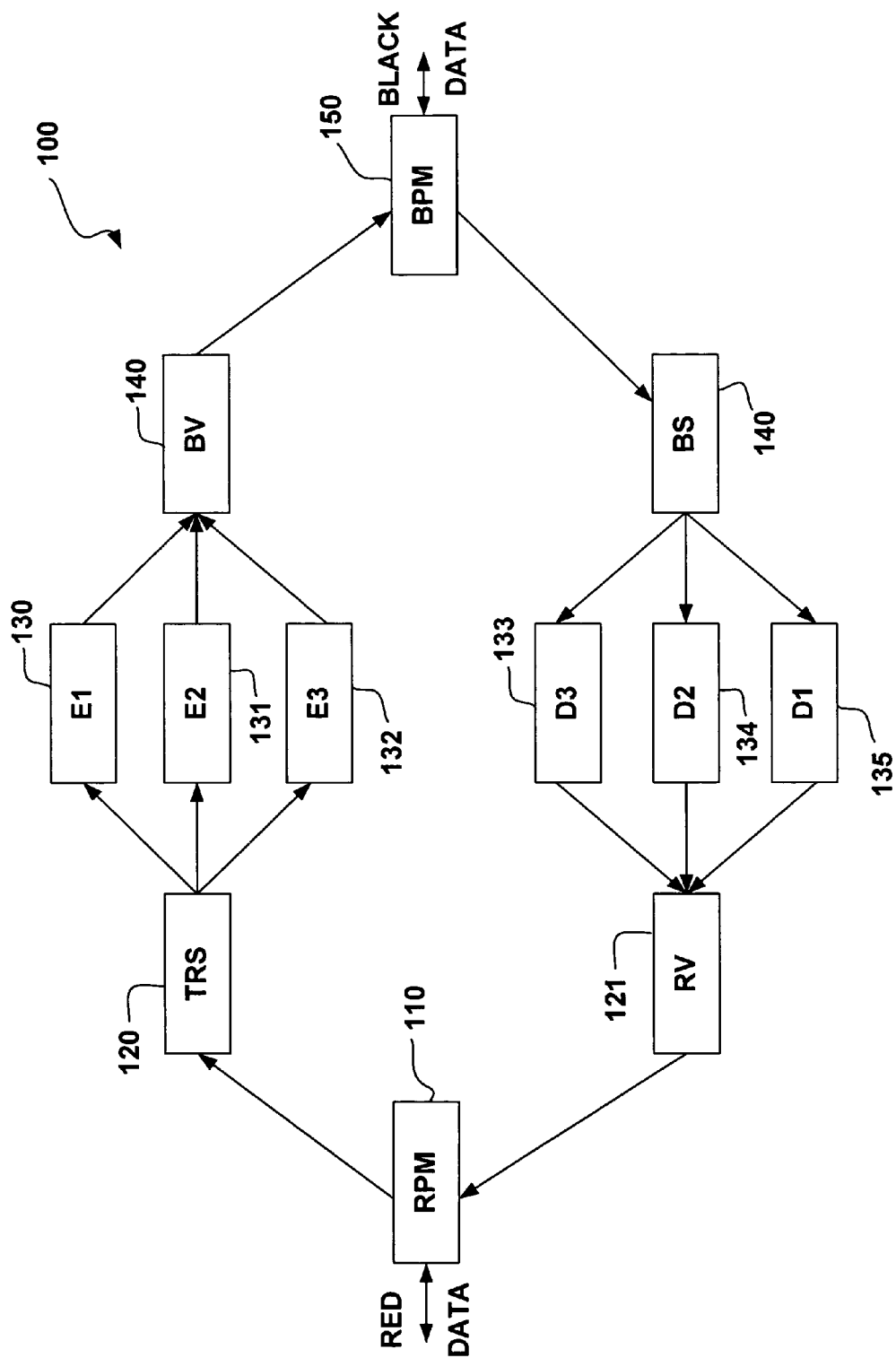
FIG. 1 shows an abstract view of a separation kernel that is known in the prior art for the separation of information within a single processor.
Figure 6:
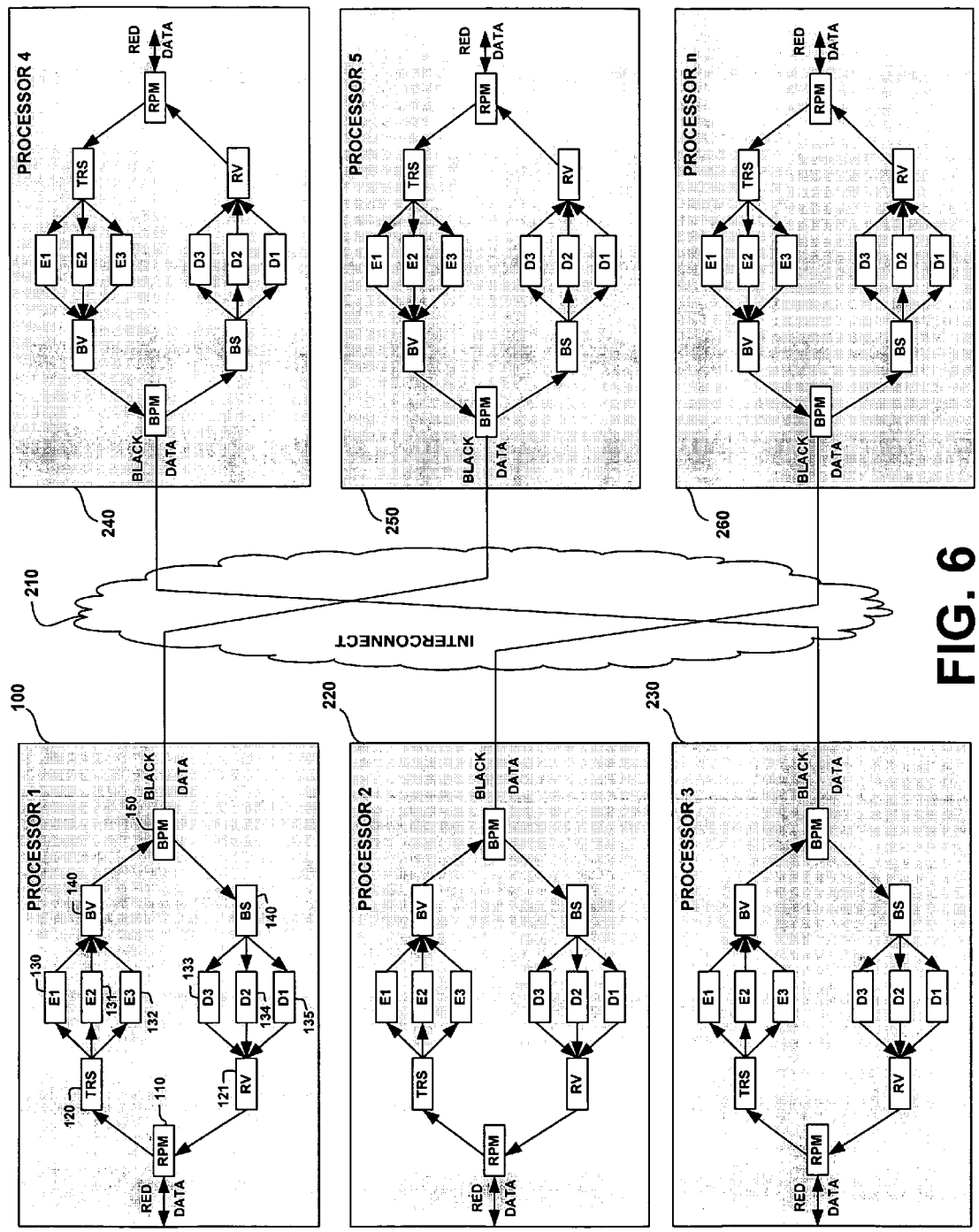
FIG. 6 shows a network representation of an exemplary network structure according to one embodiment of the present invention.

FIG. 6 shows a network representation of an exemplary network structure according to one embodiment of the present invention. FIG. 6 illustrates a network architecture in which multiple processors (processors 1 to n), 100, 220, 230, 240, 250, and 260 are interconnected via a network interconnect 210. Each of the processors 100, 220, 230, 240, 250, and 260 are shown to be using separation kernels, which were described with respect to FIG. 1.

As illustrated in FIG. 6, processor 1 100 may be configured to transmit and/or receive data from processor 5 250 via the interconnect 210. Furthermore, processor 2 may be configured to transmit and/or receive data from processor n 260 over the network. Finally, processor 3 230 may be configured to transmit and/or receive data from processor 4 240 via interconnect 210. While the processors 100, 220, 230, 240, 250, and 260 may be physically connected to each other via the interconnect 210, as shown, for example, in FIGS. 2A and 3A, flow labels and/or sensitivity labels may be used to regulate the flow of information throughout the network. The use of these labels may dictate the flow in the network, so it should be understood that the transmission and reception of data over the network interconnect 210 in FIG. 6 is merely exemplary.

Figure 7A:
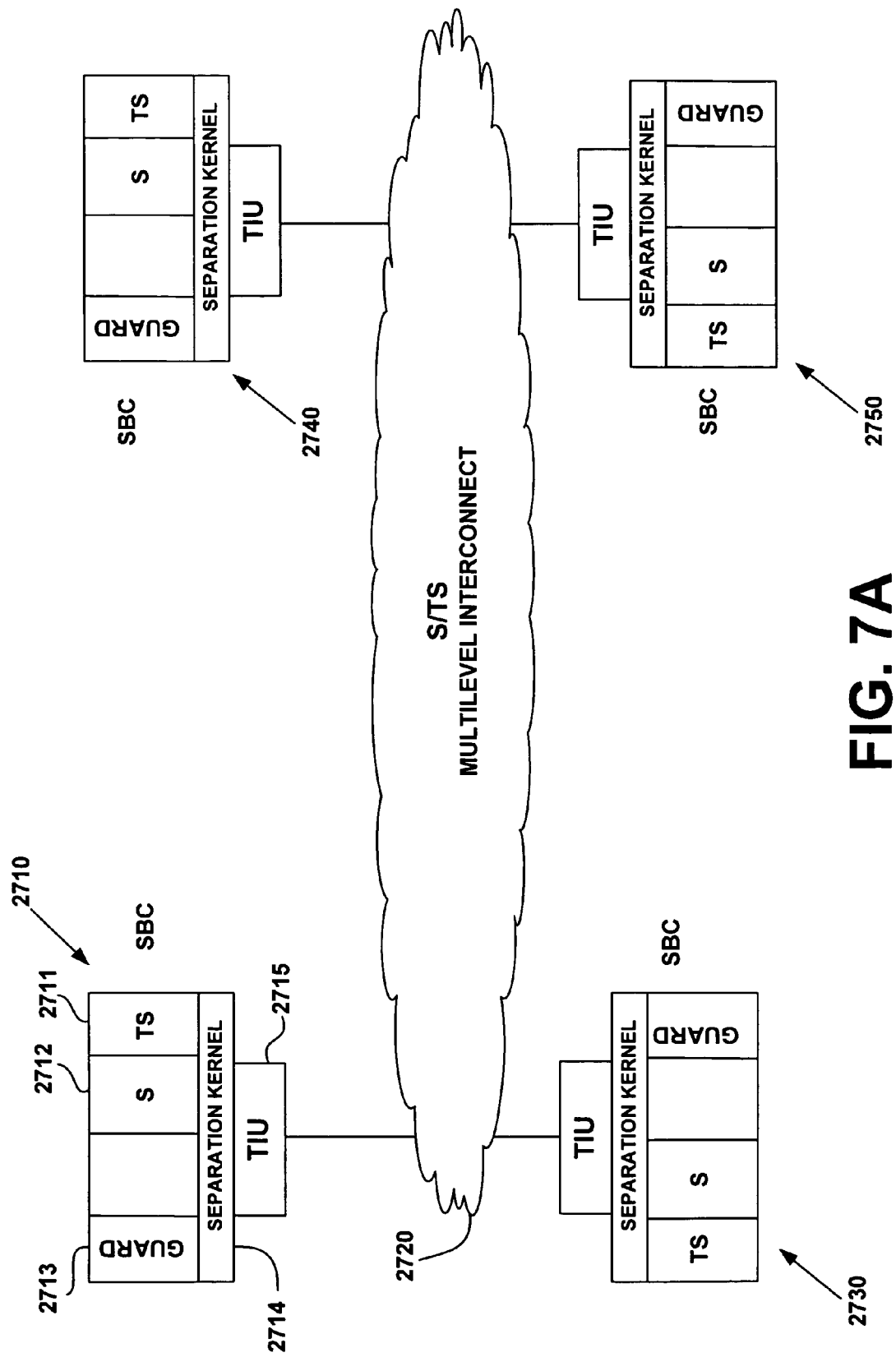
FIG. 7A shows a network configuration according to another aspect of the present invention.

FIG. 7A shows a network configuration according to another aspect of the present invention. The architecture illustrated in FIG. 7A enables any processor on the network to process data at more than one sensitivity level. Thus, the enclave approach, which has been described above may not be applicable, because data of multiple sensitivities may be input into different processors distributed at various nodes in the network. While the enclave approach may be used in connection with the network architectures illustrated in FIGS. 5A-D, for example, in which the nodes are configured to process or otherwise handle information of a single sensitivity level, it may be generally ineffective because the separation kernel would need to operate at only a single classification level, thus mooting the reason for using a separation kernel at all.

The function of the TIU is similar as in pervious embodiments of the invention. There are, however, a number of differences. In the architectures discussed thus far, the classification of data on the processor side was associated with one classification level (i.e., the TIU function only needed to identify what level that was). In the current architecture, however, the SBCs 2710, 2730, 2740, and 2750 may be configured to process or otherwise handle data having multiple sensitivity levels. Therefore, the TIU function must coordinate with the separation kernel, for example, separation kernel 2714, to ensure that the data separation guarantees of the separation kernel are not violated. In addition to its previous function, the TIU may be assumed to extend the separation, non-bypassability, and always-invoked properties that the separation kernel exhibits, according to various embodiments of the present invention.

The network shown in FIG. 7A includes a number of SBCs, 2710, 2730, 2740, and 2750 each of which may include an operating system running a separation kernel. The separation kernel may be configured to handle, for example, secret ("S") and top secret ("TS") information. The SBCs 2710, 2730, 2740 and 2750 may be coupled to one another via a multilevel interconnect 2720. This multilevel interconnect may be part of an insecure network, for example. Each SBC such as, for example, SBC 2710 may include a separation kernel 2714, which may permit the SBC to handle multiple classes of data within the same processor as has been described above in detail. The separation kernel may be configured to ensure that data received into the SBC is sent to the correct partition based on a predetermined classification of the data. For example, SBC 2710 may include partitions for handling secret information 2712 and top secret information 2711. Furthermore, the guard 2713 may be embodied within one or more of the partitions within the SBC.

When data is received from the network 2720 at the SBC 2710, the data is received into the TIU. The TIU may identify the sensitivity of the data by looking at, for example, a flow label or a sensitivity label. If the data is recognized as properly being received by SBC 2710 by the TIU 2715, the TIU may be configured to allow the data to be input into the separation kernel 2714, which is embodied as a part of the operating system. The separation kernel may be configured to identify the predetermined sensitivity associated with the received data and may be configured to send the received data into the guard 2713. The guard may be configured to ensure that only permitted data flows occur within the SBC 2710. If the data received into SBC 2710 is secret information, the separation kernel 2714 may direct that data into the secret partition 2712 for further processing or handling. Alternatively, if the separation kernel 2714 determines that the data is, for example, top secret information, the data may be input into the partition that is configured to process or otherwise handle top secret information 2711. Similar configurations may be employed at other nodes at the network, such as, for example, SBC 2730, SBC 2740, and SBC 2750.

Figure 7B:
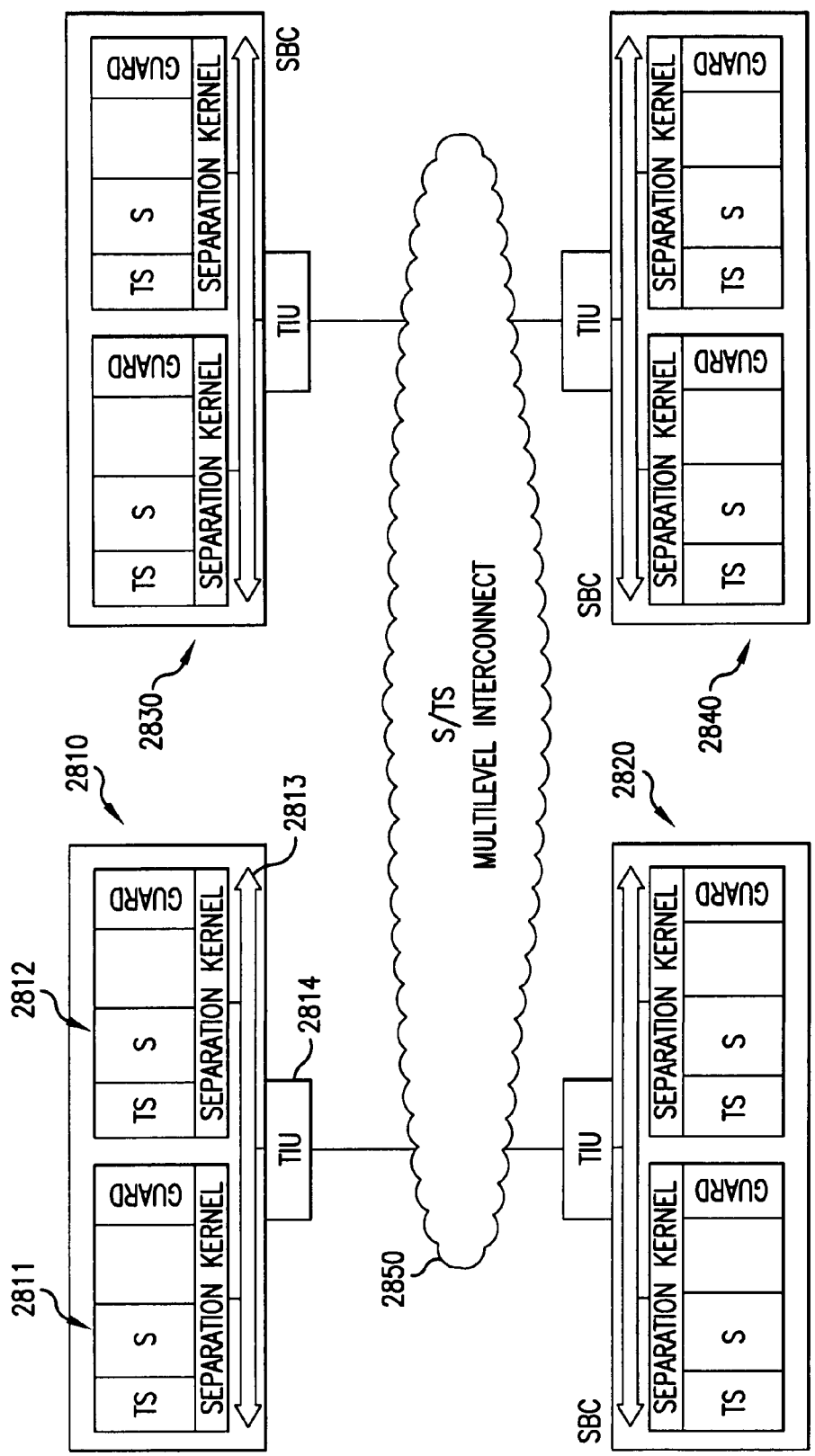
FIG. 7B show a network configuration where multiple processors are coupled to a single TIU at each node according to yet another embodiment of the present invention.

FIG. 7B show a network configuration where multiple processors are coupled to a single TIU at each node according to yet another embodiment of the present invention. The exemplary network structure illustrated in FIG. 7B is similar to that illustrated with respect to FIG. 7A with the exception that the nodes 2810, 2820, 2830, and 2840 are configured with multiple processors, the multiple processors each having operating systems including separation kernels. Thus, each node may include two or more processors coupled to a bus, which is, in turn, coupled to a network interconnect 2850.

As illustrated in FIG. 7B, a node, for example node 2810, may include a first processor 2811 and a second processor 2812. The first processor 2811 may be configured to have an operating system that includes a separation kernel. The separation kernel may be configured to separate incoming data into a number of partitions. The partitions may include, for example, a partition for each sensitivity level that the processor is configured to handle. Alternatively, the partitions may include a partition for each of the classification levels that the processor is configured to handle or otherwise process in addition to at least one partition for a software implementation of a guard, as described above with respect to FIG. 7A. The second processor 2812 may also be configured to utilize a separation kernel in a similar manner that the first processor 2811 employed.

The operation of an exemplary node using a multi-processor system will now be described with respect to FIG. 7B. Packets of data may be received from the network 2850 into the trusted interface unit (TIU) 2814. The TIU 2814 may be configured to ensure that the data being received from the network 2850 is intended for receipt in the node 2810. If the TIU 2814 determines that the data is intended for receipt into the node, the data may be passed along to the separation kernel for processing as was described with respect to FIG. 7A. This data may be distributed to one or both of the processors coupled to bus 2813. Thus, the processors 2811 and 2812 located upstream or behind the TIU 2814 may be configured to share information with one another as mediated by their separation kernels. In another embodiment of the present invention, the information may be directed to one of the two processors 2811 or 2812 for further processing or handling.

Figure 8:
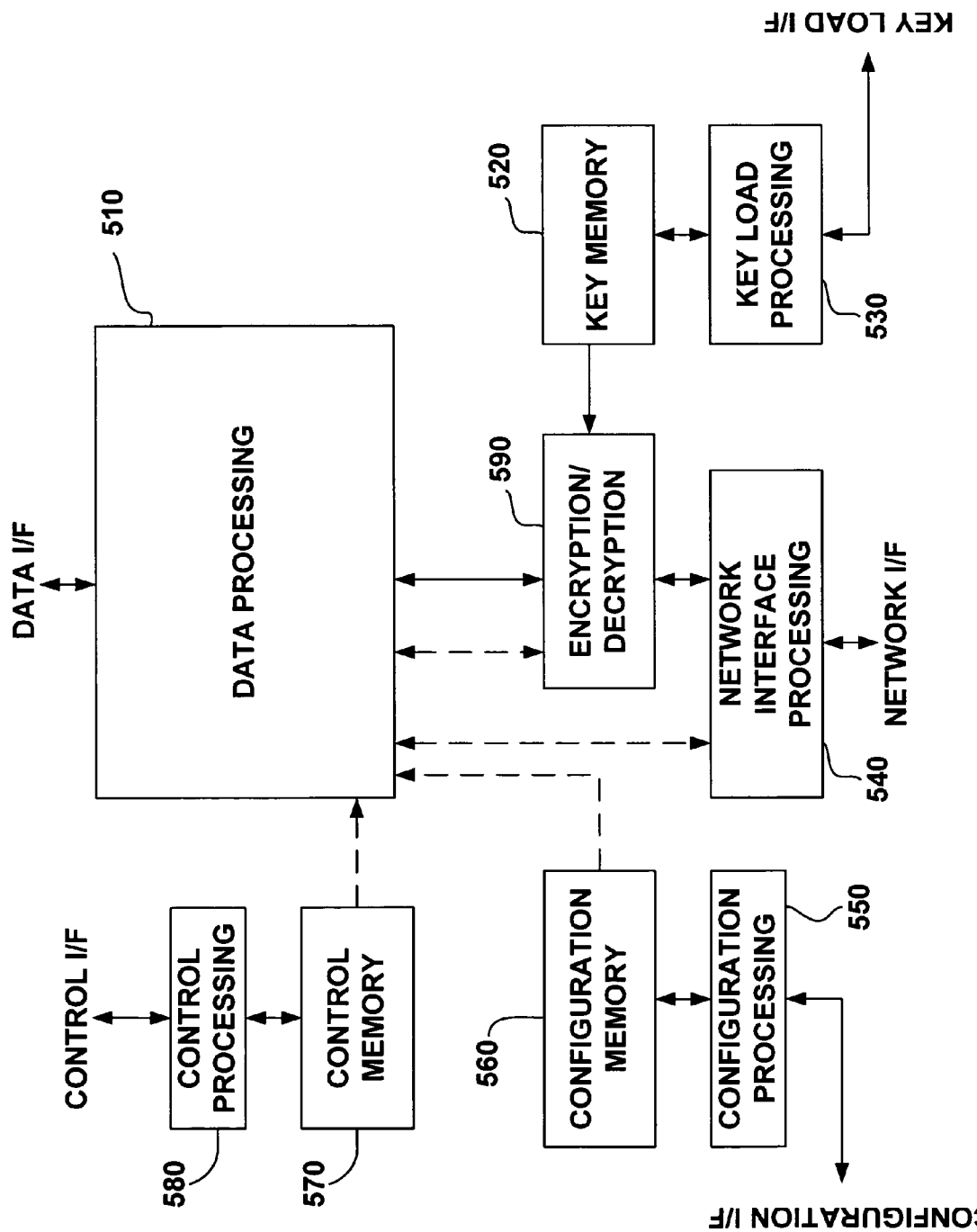
FIG. 8 shows a high-level functional view of a trusted interface unit according to an exemplary embodiment of the present invention.

FIG. 8 shows a high-level functional view of a trusted interface unit according to an exemplary embodiment of the present invention. The trusted interface unit ("TIU") may be configured as a network interface unit ("NIU") that may be specifically designed and analyzed so that it may be trusted to handle data flowing through it only in the manner that it was intended to. In other words, the TIU may be configured and trusted to handle data in accordance with a data isolation and information flow policy. This policy may be predetermined by a system designer prior to deployment of the network or may be employed by way of a network upgrade. The TIU may be used to securely attach labels to the data on its way out of the TIU. Likewise, on the way into the TIU, the TIU may be configured to check the security of the labels associated with the incoming data and determine the allowable memory locations (if any) into which this data may be placed.

The TIU according to the present invention may employ encryption to provide separation of data as it moves through a commercial off the shelf (COTS) fabric. The encryption may encompass the payload of the packets, including the label. In one embodiment of the invention, the packet header may be unencrypted since the COTS fabric may need access to the header information to ensure that the information reaches its intended destination node on the network. The requirements of an encryption algorithm may differ depending on the nature of the application. For example, for military applications, the encryption algorithm and management of keys may be defined by a government, whereas for private networks having classes of users, the encryption may be relatively weaker. Encryption such as, for example, IPsec may be used in connection with the present invention. Furthermore, the TIU may be configured to manage the keys associated with the encryption algorithm or algorithms selected for use in connection with the present invention.

One feature of the TIU of the present invention is that the TIU may be configured to make bypassing the TIU as difficult as possible. This need may be met via physical means. This TIU may be embodied as a physically separate component of the node of which it is a part. Furthermore, the TIU may be configured to have the only physical path from the node to the fabric. This configuration prevents subversive use of alternative information pathways to access or remove data from the node.

In another embodiment of the present invention, the TIU may be embodied as a software component. In this case, the processor on the node may be configured to run a separation kernel. The software embodiment of the TIU may be stored and run within one or more of the partitions within the node. In this embodiment, the non-bypassability of the TIU may be enforced by the separation kernel.

In an embodiment of the invention in which overall system security is the goal, each external port on the fabric may be configured to connect to a TIU. It is the cooperation between TIUs that makes the fabric secure. The cooperation between the TIU may include the creation and attachment of labels on packets entering the fabric and verifying these labels on the packets exiting the fabric. In yet another embodiment of the present invention, the ports within the fabric may be connected to other switch ports within the fabric, which do not include a TIU function. Physical security may be utilized to ensure that these connection rules cannot be violated.

The TIU according to an exemplary embodiment of the invention may include a number of interfaces, including, for example, a control interface, which is configured to interface with the control processing 580 of the TIU; a configuration interface, which is configured to interface with the configuration processing 550; the network interface, which is configured to interface with the network interface processing 540; a key load interface, which is configured to interface with the key load processing 530 of the TIU; and the data interface, which is configured to interface with the data processing 510 of the TIU. These interfaces may be direct with the functional components described herein. Alternatively, these interfaces may be made by way of intervening functional components if additional functionality is needed to perform various encryption/decryption or data handling operations within the TIU.

The main flow of data received from, for example, a node or other trusted source may be, for example, along a bidirectional path, which takes the data in via the data interface into the TIU and sends it into the data processing functional element 510. The data may be processed and then input into the encryption/decryption functional element 590. Once the data has been encrypted, the data may be sent into the network interface processing functional element 540 and transmitted onto the network via the network interface. The configuration memory 560 may be, for example, a non-volatile memory device and may be configured to contain security-related information. This security-related information may be determined by the system designer, for example. This data may be stored in a volatile or non-volatile memory. Alternatively, this data may be broadcast to the nodes on the network when the nodes are powered-up. In one embodiment, the TIU may be configured to query the network to obtain information related to the nodes and other TIUs on the network to ensure that the TIUs can function together to ensure the proper transmission and reception of data over the network fabric. The data that may be stored, for example, in the TIU may include, for example, flow tables, which include intended flow labels for directing the flow of information within the network. Additional information that may be stored in the configuration memory 560 may include, for example, the sensitivity level of the associated node or sensitivity level of each partition that may be involved in network input or output. Furthermore, the configuration memory 560 may also be configured to include information relating the memory buffer locations to partitions, etc.

The information required to be stored in the configuration memory 560 may depend on the application in which the TIU is being used. For example, the data stored in the configuration memory 560 may depend on whether flow labels or sensitivity labels are being used to direct information on the network, or whether the node is running system high or with multiple partitions at multiple classification levels etc. The labels may be attached using cryptographically secure means, for example, calculating a secure hash function on a combination of a raw label and the data to produce a transmitted label. The configuration processing element 550 may be configured to provide a configuration interface which may be configured to permit a network developer to access the configuration memory.

The key memory 520 which may be coupled to the key load interface via the key load processing functionality 530 may be configured as, for example, a non-volatile memory. The key memory 520 may be configured to contain the cryptographic keys as may be required for operation of the TIU. In one embodiment of the invention, the key memory 520 may be configured to store multiple cryptographic keys. The key load processing element 530 may be configured to provide the key load interface to the key memory 520.

In one embodiment of the present invention, the encryption/decryption element 590 may be configured to provide cryptographic services that may be required by the TIU. In so doing, the encryption/decryption element 590 may be configured to access the key memory 520 to obtain the appropriate cryptographic keys. In an alternative embodiment of the invention, the keys may be stored within a local memory associated with the SBC or other node elements and the TIU may be configured to access a local key half to obtain the appropriate cryptographic keys. Other encryption/decryption configurations may be useable in connection with the present invention.

The network interface processing element 540 may be configured to provide access to the attached network via the network interface. As indicated by the dashed lines in FIG. 8, control information may pass between the network interface processing element 540 and the data processing element 510. This line represents the flow of information that may be required for the network interface processing element 540 to perform its required tasks, and is not intended to be a bypass for the information to be input or out to or from the TIU.

The transfer of data between the node and the TIU may occur at the data interface. The data processing element 510 may be the control controlling element for all data transfers. The data processing element 510 may be configured to utilize control instructions from Control Memory 570 and the configuration memory 560 to ensure that all data flows within the TUI are in conformance with the information provided by the system designer. Thus, the TIU may be trusted to behave in the manner in which it was instructed. According to one embodiment of the invention, this may include ensuring that the outgoing data flows in conformance with the system designer's instructions. This may include creating an appropriate label and attaching it to the data. This label may be attached in the packet header associated with the data. For incoming data, ensuring that the data flows in the manner that the system designer intended it to may include validating the label that was affixed to the data from a peer TIU. In addition to maintaining quality control over the information flow into and out of the TIU, the TIU may be configured to control which cryptographic keys the encryption/decryption element uses for various cryptographic operations.

While one of the purposes of the TIU according to the present invention is to make an interconnect fabric secure, the physical location of the TIU need not be within the boundaries of what the ordinarily skilled artisan would recognize as the fabric itself, although it may be located within the fabric. While the present invention is described with respect to an Ethernet fabric, it will be readily apparent to those skilled in the art that the TIU of the present invention may be used in connection with any other type of interconnect, such as, for example, a fiber channel interconnect. Any type of interconnect may be used in connection with the present invention.

Figure 9B:
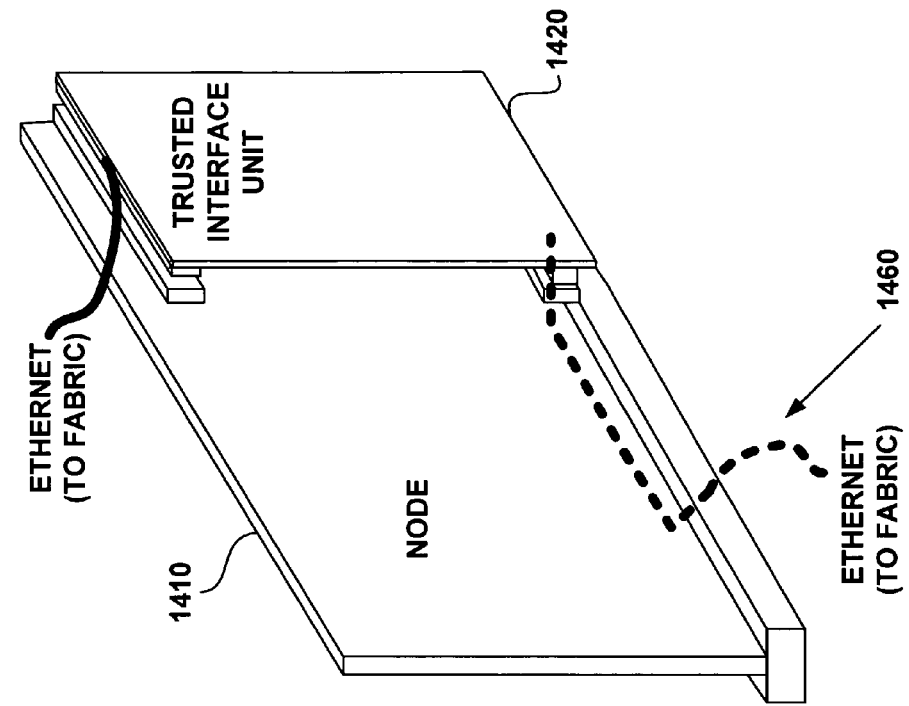
FIGS. 9A and 9B show a functional view and a physical view of a TIU installed at a node on a network, respectively, according to an exemplary embodiment of the invention.
Figure 9A:
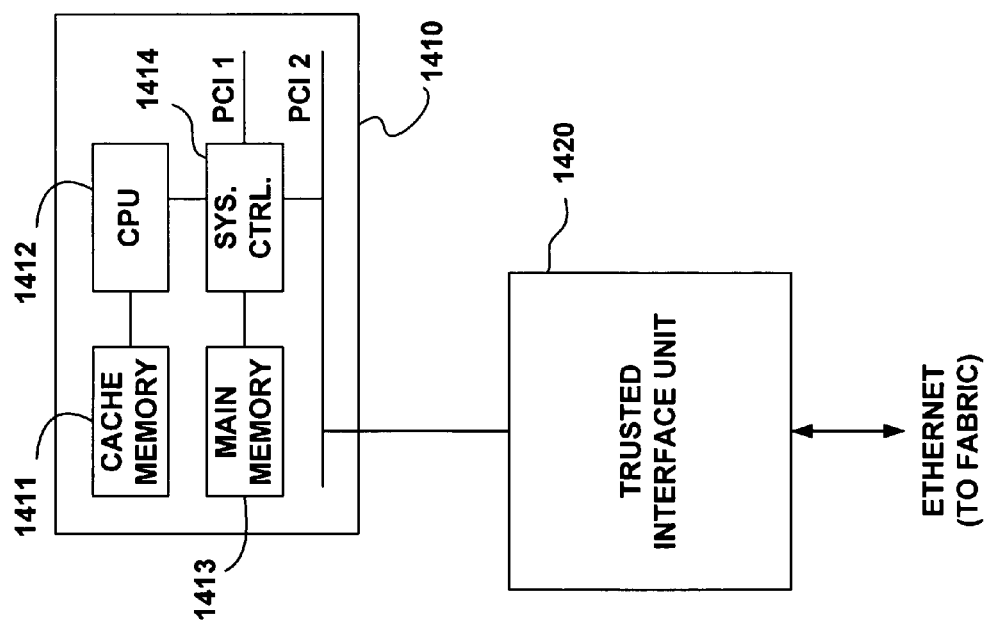

FIGS. 9A and 9B show a functional view and a physical view of a TIU 1420 installed at a node 1410 on a network, respectively, according to an exemplary embodiment of the invention. As illustrated in FIG. 9A, the trusted interface unit 1420 may be operatively coupled to the node 1410. In the embodiment shown in the function view in FIG. 9A, the node 1410 may include a cache memory 1411, a CPU 1412, a main memory 1413 and a system controller 1414. Furthermore, the node 1410 may also include a number of internal interfaces PCI 1 and PCI 2, which may be configured to permit the coupling of additional SBCs or other peripheral devices, such as, for example, storage devices or radios, as will be described in detail below. As shown in FIG. 9A, the only physical path for data to travel into and out of the node 1410 is through the TIU 1420.

FIG. 9B shows a functional view of a trusted interface unit 1420 and an associated node 1410 according to one embodiment of the present invention. As shown in FIG. 9B, the TIU may be embodied as, for example, a Peripheral Component Interconnect ("PCI") Mezzanine Card ("PMC"), which may be mounted directly onto a host processor card 1410 and may be configured to contain the node functionalities. Even thought the TIU 1420 is physically associated with the node 1410, the TIU 1420 may be in an appropriate functional relationship with, for example, the Ethernet fabric such that the TIU 1420 may secure the Ethernet fabric to create a trusted Ethernet fabric. In this exemplary embodiment of the present invention, the TIU 1420 may be configured to perform the functions that a tradition network interface card ("NIC") would be configured to perform in addition to the TIU functions that have been described herein. In the embodiment illustrated in FIG. 9B, the binding between a TIU 1420 and the node 1410 that represents to its peer TIUs (not shown) may be assured by installing the TIU into the PMC slot on the host processor card 1410. The TIU 1420 may have an input/output interface that is connected to, for example, the Ethernet via, for example, a Category-5 (CAT-5) cable. Additionally or in the alternative, the data may be input through a designated path through the node, designated by the dashed line 1460. This path is a direct link to the TIU and directs all data that is input over this bus 1460 directly into the TIU through the node 1410.

Figure 10B:
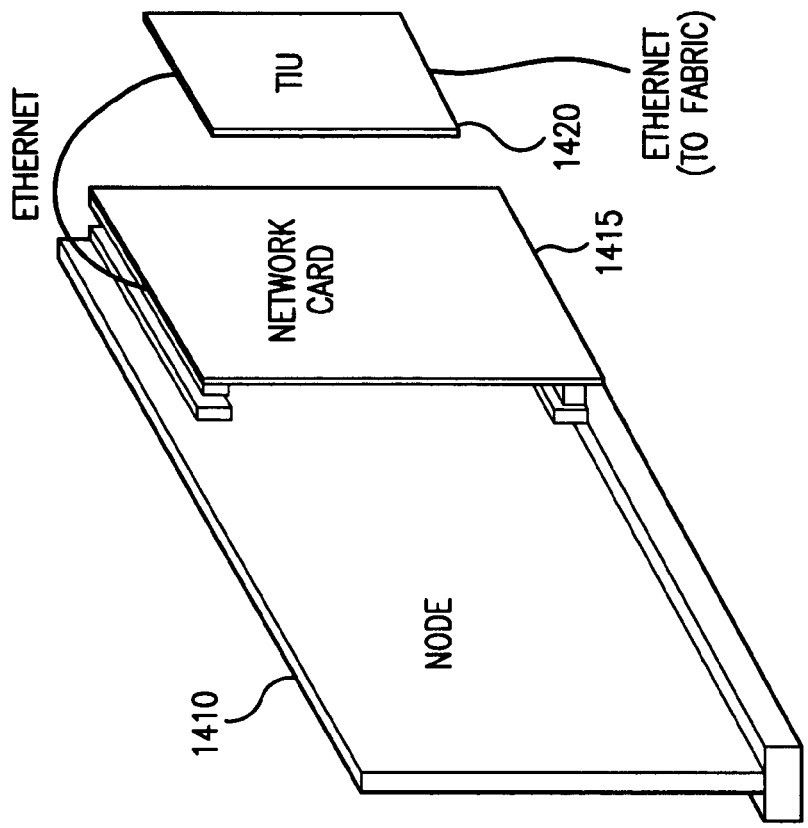
FIGS. 10A and 10B show a functional view and a physical view of a TIU installed at a node on a network, respectively, according to yet another embodiment of the invention.
Figure 10A:
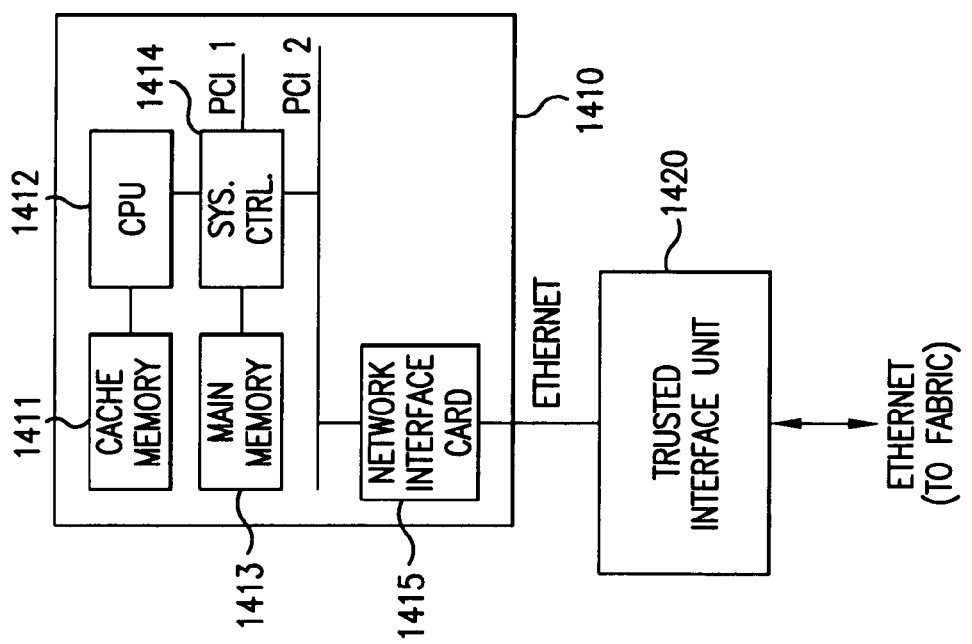

FIGS. 10A and 10B show a functional view and a physical view of a TIU 1420 installed at a node on a network, respectively, according to another embodiment of the invention. The functional view of the TIU 1420 installed at a node 1410 on the network according to another aspect of the present invention is similar to the functional view illustrated in FIG. 9A, discussed above. The difference between the functional view in FIG. 10A and that shown in FIG. 9A is that the TIU 1420 shown in FIG. 10A does not need to perform all of the functions of the Network Interface Card (NIC) 1415, because the node 1410 includes a NIC 1415, which may be mounted to the host processor card (shown in FIG. 10B). The node may include similar features so that shown in FIG. 9A, including cache memory 1411, a CPU 1412, a main memory 1413, a system controller 1414, and two internal ports PCI 1 and PCI 2. As mentioned above, the node 1410 may also include a NIC 1415. The trusted interface unit (TIU) may be configured to interface with the NIC 1415.

As shown in FIG. 10B, the NIC may take the form of a mezzanine card (i.e., a PMC), and may be directly interfaced with a processor card 1410, which performs the function of the node. The TIU 1420 may include a physical connection to the NIC 1415 such that the only path for data to enter the node from the network is through the trusted interface unit 1420. Thus, the TIU 1420 as shown in FIG. 10B has two Ethernet interfaces: one is to connect to the NIC 1415 and the other is to connect to the network. Data may be received from the Ethernet and may be input into the NIC 1415 for further processing within the node 1410. Furthermore, data may be output from the node 1410 via the NIC 1415 and into the TIU, which will ensure that the data is securely transmitted to other locations within the network as may have been determined by, for example, a system designer.

The embodiment illustrated in FIGS. 10A and 10B may be used in situations in which it is desired to provide standard Ethernet connections external to a physically secure embedded system; but still maintain the internal security of the embedded system. In this example, the binding between the TIU 1420 and the node 1410 that it represents to its peer TIUs may be assured by physically ensuring that the Ethernet connection between the two is not compromised. Because the TIU 1420 may be logically remote from the node 1410, this implementation may not necessarily be appropriate for a node in which a separation kernel is used to provide separate partitions that are visible outside the node 1410.

FIGS. 11A and 11B show a functional view and a physical view of a TIU 1420 installed at a node on a network, respectively, according to yet another embodiment of the invention.

As shown in FIG. 11A, the system may include a series of nodes 1410 coupled to a single TIU 1420. As discussed above, each TIU 1420 may include a cache memory 1411, main memory 1413, a CPU 1412, a system controller 1414 and a first internal port PCI 1 and a second internal port PCI 2. While two nodes 1410 are shown as being connected to the TIU 1420, any number of nodes 1410 may be coupled to the TIU 1420 of the present invention.

FIG. 11B shows a physical view of a TIU 1420 configured to interface with multiple nodes 1410. FIG. 11B shows the reversal of the physical roles from FIGS. 9B and 10B. In the embodiment illustrated in FIG. 11B, the TIU function may be incorporated into the base card, and the processing functions may be contained on the mezzanine cards that represent the individual nodes 1410. Here, the binding between the TIU and the node that it represents to its peer TIUs on the network may be assured by the physical act of installing the mezzanine node cards onto the base card.

Figure 12:
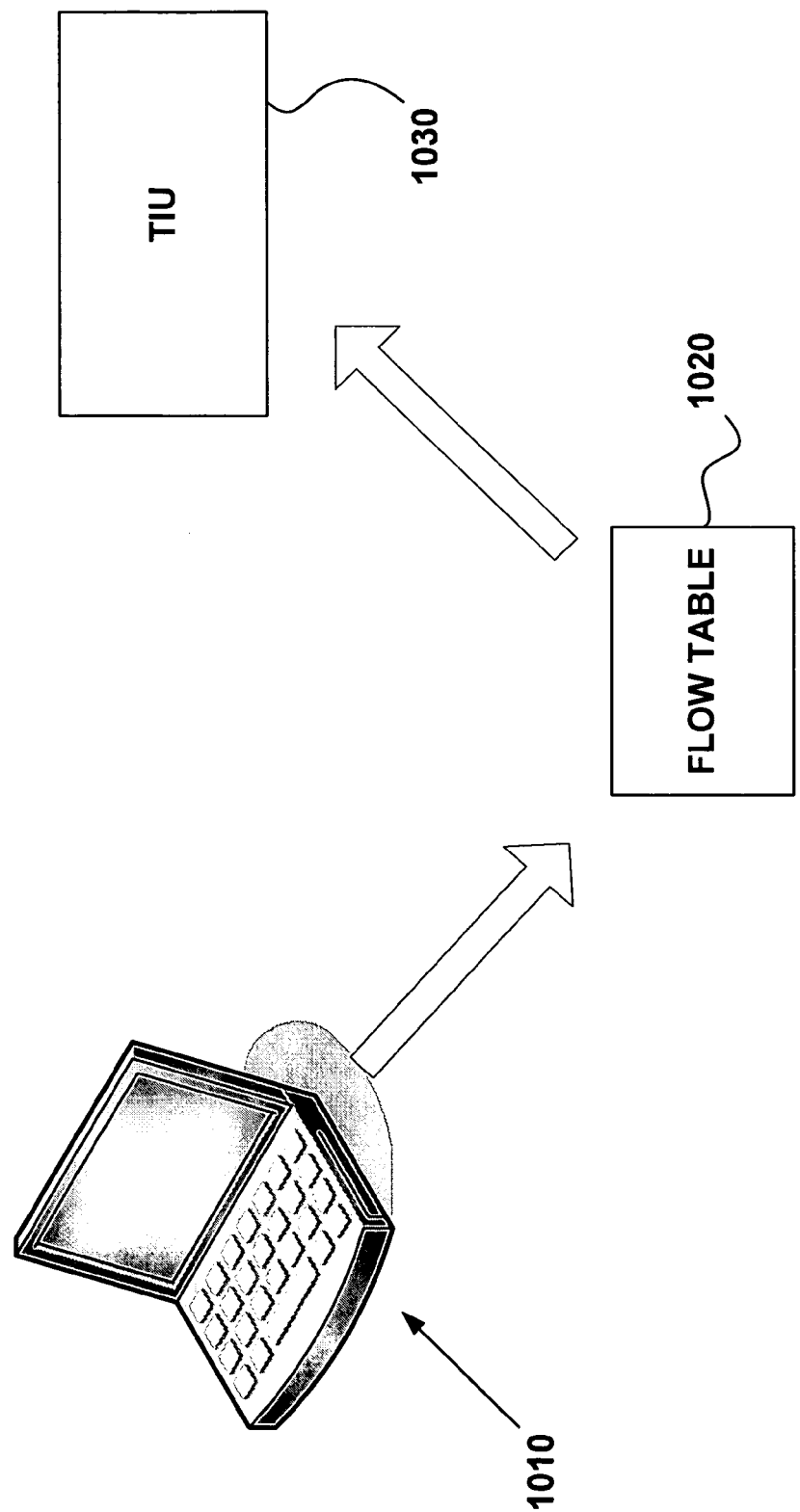
FIG. 12 shows a functional diagram showing the generation of flow tables according to one embodiment of the present invention.

FIG. 12 shows a functional diagram showing the generation of flow tables according to one embodiment of the present invention. As shown in FIG. 12, the system programmer can use a computer 1010 or other workstation to input data into a flow table 1020. After the flow table 1020 is complete, the data may be uploaded into the TIU 1030.

As discussed above, a TIU that is configured to implement flow labels may need to have available to it some information related to the allowed information flows on the network. In one embodiment of the present invention, the information may be generated off-line using a tool designed for the creation of flow labels. The embodiment of the present invention illustrated in FIG. 12 may be used in the case in which separation kernels are not being run at the local nodes that the TIUs are associated with. The absence of a separation kernel is relevant because that implies that the entire node is one entity form the standpoint of flow control. Thus, it may not be necessary for more detailed information to be provided regarding the separation of the node into smaller partitions.

As part of the task of configuring a TIU for use in a particular system design, the system designer may use, for example, a flow table software tool to designate what flows are permitted within the network. This information may then be transferred to the TIU and stored in, for example, a non-volatile memory device. This generation and transfer operation may be performed in such a manner to ensure the integrity of the information form the system designer's intent to the installation into the TIU.

When a flow label is used in connection with a node that is running a separation kernel, the flow table may need to be configured to incorporate information related to the separate partitions within the node. Some separation kernels may be implemented with their own associated tools for defining partitions within the node and defining allowed communication paths among the partitions within the node and defining allowed communication paths among the partitions. For ease of use, a flow control tool for use with in connection with the present invention may be created such that it will provide an integrated mechanism for the system designer to use the extend the partitioning tool software capability to generate the flow table information that may be required by the TIU. This is illustrated in FIG. 13A, which shows an integrated flow control tool according to an exemplary embodiment of the present invention. Specifically, FIG. 13A shows the integration of flow control tool software with separation kernel partitioning tool software 1115 to achieve an integrated package that may be utilized by system designers. This integrated development software 1110 may permit the system designer to define appropriate flow tables 1120 and partition tables 1130 for use in connection with the present invention.

FIG. 13B shows the loading of a flow table into a TIU according to an exemplary embodiment of the invention. The system designer may use the computer or workstation 1010 to develop a partition table 1130 for use in connection with a separation kernel in accordance with the present invention as well as the creation of a flow table 1120 for use in connection with a TIU according to the present invention. The partition table 1130 may be configured to be loaded into the node running the separation kernel 1150. Furthermore, the flow table may be configured to be loaded into the trusted interface unit (TIU) 1140, as discussed with respect to FIG. 8, above.

Figure 14A:
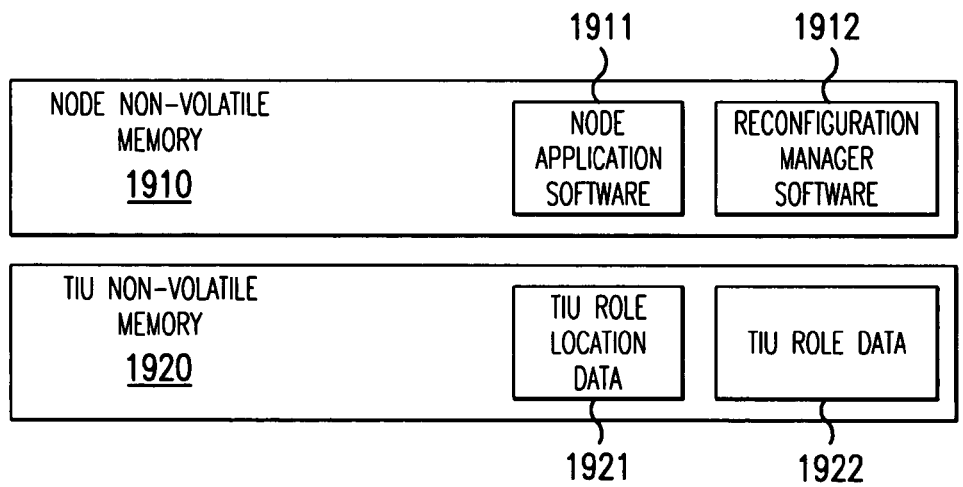
FIG. 14A shows examples of security-related objects that may be stored on a TIU or a node.

FIG. 14A shows examples of security-related objects that may be stored on a TIU or a node according to one aspect of the present invention. Various cryptographic keys may be used in connection with the present invention as has been described herein. Such keys may include a RoleAccessKey, a ReconfigMgrKey, and a RoleKey. Because it is used by the TIUs to ensure that the TIU role data and the node application software are authentic and have not been modified, the public RoleAccessKey may be available at each TIU on the network. This key may be stored in, for example, a non-volatile memory. This non-volatile memory may be located, for example, within the TIU. In an alternative embodiment of the invention, the non-volatile memory may be remote from the TIU. In yet another embodiment of the invention, the memory may be an electrically erasable programmable read-only memory (EEPROM) memory device. In yet another embodiment, a volatile memory device may be used and the key uploaded upon power up of the system or retained within the TIU by means of an auxiliary power source, such as, for example, a battery. The private RoleAccessKey may be used by the system development environment to protect the TIU Role Data and the node application software. There are various means of keeping this key secure, as will be apparent to one of skill in the art.

During a reconfiguration process, a TIU may receive a command form the reconfiguration manager that directs it to assume a role different form the one that it is currently playing. To ensure proper system configuration, the TIU may be configured to authenticate this command. The ReconfigMgrKey may be used for this purpose. To ensure that it is available when it is needed, every TIU may be configured to include a copy of the public portion of this key. This key may also be stored on a non-volatile memory within the TIU. In an alternative embodiment of the invention, the non-volatile memory may be remote from the TIU. In yet another embodiment of the invention, the memory may be an EEPROM memory device. In yet another embodiment, a volatile memory device may be used and the key uploaded upon power up of the system. The key may be stored locally in the TIU using an auxiliary power source, such as, for example, a battery. The private portion of the key may be used to encrypt commands form the reconfiguration manager software 1912. In one embodiment of the present invention, this key may only be required at nodes that are performing the reconfiguration manager role. According to one embodiment of the invention, this private key may not be available at any other nodes in the network other than the reconfiguration manager node. The ReconfigMgrKey may be stored in a non-volatile memory associated with the TIU that is associated with the node that is running the reconfiguration manager software.

Thus, as can be seen from the exemplary data structure shown in FIG. 14A, a node memory 1910, which may be, for example, a non-volatile memory, may be configured to store node application software 1911 and Reconfiguration manager software 1912. The reconfiguration manager software 1912 may be located within a designated reconfiguration node within the system and does not necessarily need to be available at all nodes in the system.

Figure 14B:
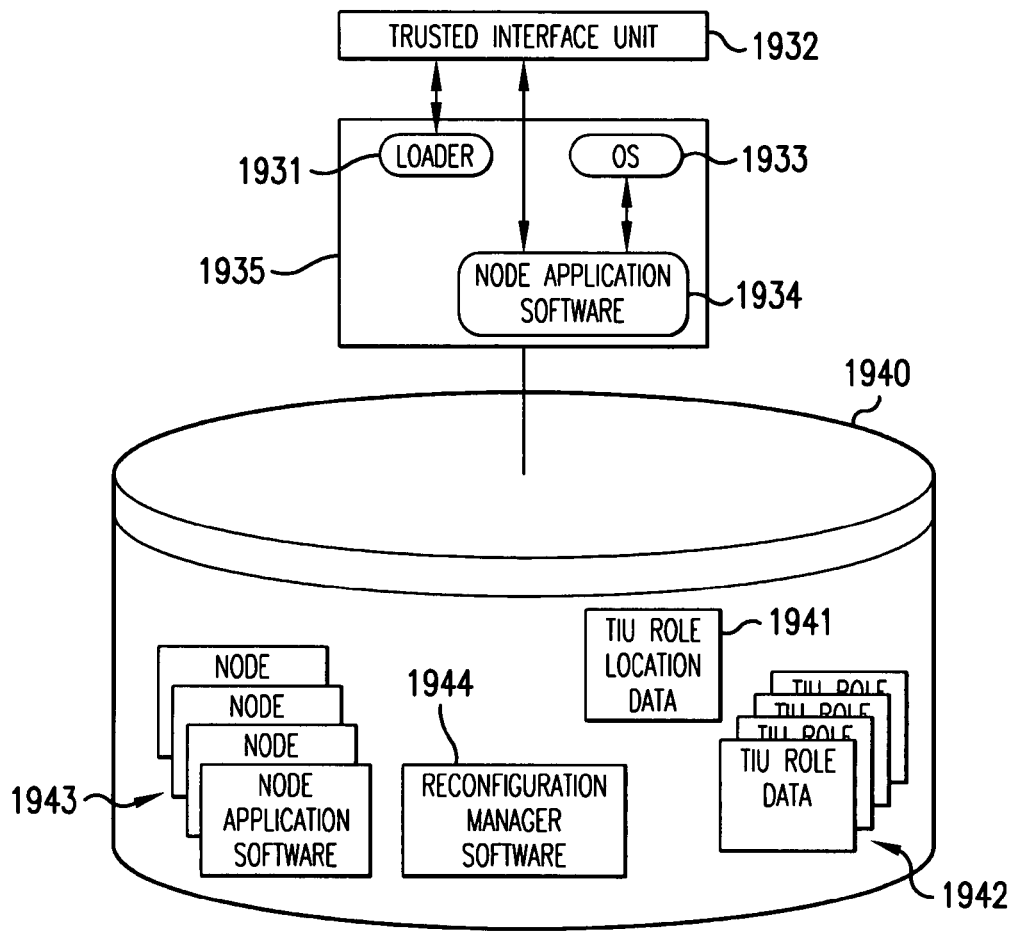
FIG. 14B shows examples of security-related objects that may be stored on, for example, a mass storage device.

FIG. 14B shows examples of security-related objects that may be stored on, for example, a mass storage device 1940 according to an exemplary embodiment of the present invention. As illustrated in FIG. 14B, the TIU 1932 may be configured to access a mass storage device 1940 via the node 1935. The node may include a designated loader 1931 interface that is configured to load the TIU software into the TIU. This software may also include the flow tables or other means of conveying flow labels and/or classification or sensitivity labels that are to be used in connection with the network. Furthermore, the node may include an operating system (OS) 1933 that is interfaced with the node application software 1934, which may be configured to perform the operations of the node. The mass storage device 1940 may be configured to hold a variety of data for use in connection with both the node 1935 and the TIU 1932. In the embodiment of the invention illustrated in FIG. 14B, the mass storage device may be configured to include node application software 1943 that is loaded into the operating system through the node application software function 1934. Furthermore, TIU role data 1942 may be stored in the mass storage device 1940. This data may instruct the TIU in the functions that it may need to perform. Additionally, according to one embodiment of the invention, the TIU role data 1942 may also include cryptographic keys. The TIU role location data 1941 may also be stored in the mass storage device. Finally, the mass storage device may also include reconfiguration manager software 1944. In one embodiment of the invention, the reconfiguration manager software 1944 may be stored on a mass storage device associated with a designated reconfiguration node, and need not be present on other nodes on the system.

Figure 15:
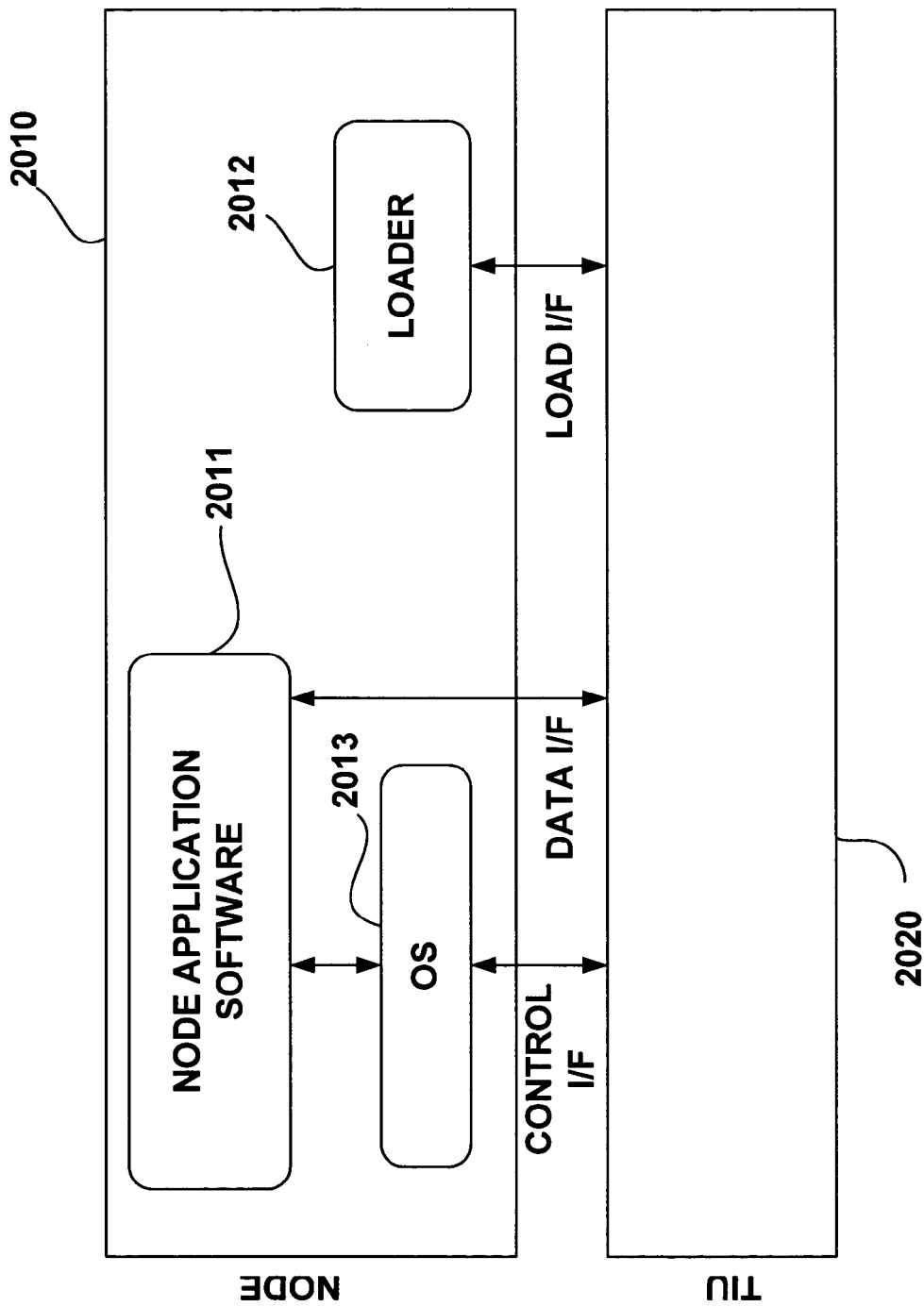
FIG. 15 shows a TIU node interface according to an exemplary embodiment of the present invention.

FIG. 15 shows a TIU load interface according to an exemplary embodiment of the present invention. FIG. 15 shows a TIU located at a node and shows how the TIU may interface with the node itself. For example, as described above with respect to FIG. 8, the TIU 2020 may include a control interface, a data interface, and a load interface. The control interface may permit the TIU 2020 to interface with the operating system (OS) 2013 on the node. The data interface may permit the TIU 2020 to interface with the node application software 2011 that may be running on the node. Finally, the load interface may permit the TIU 2020 to interface with the loader 2012. This interface between the TIU 2020 and the loader 2012 may permit the TIU 2020 to reliably instruct the node's loader function to load new node application software. This may enhance the capability of the TIU 2020 to play a central role in the reconfiguration process. Additionally, permitting the TIU 2020 to interface with the loader 2012 via the load interface may increase the certainty that the software running on the node 2010 is actually the software that the TIU may be asserting to its peers that it believes it to be.

Figure 16:
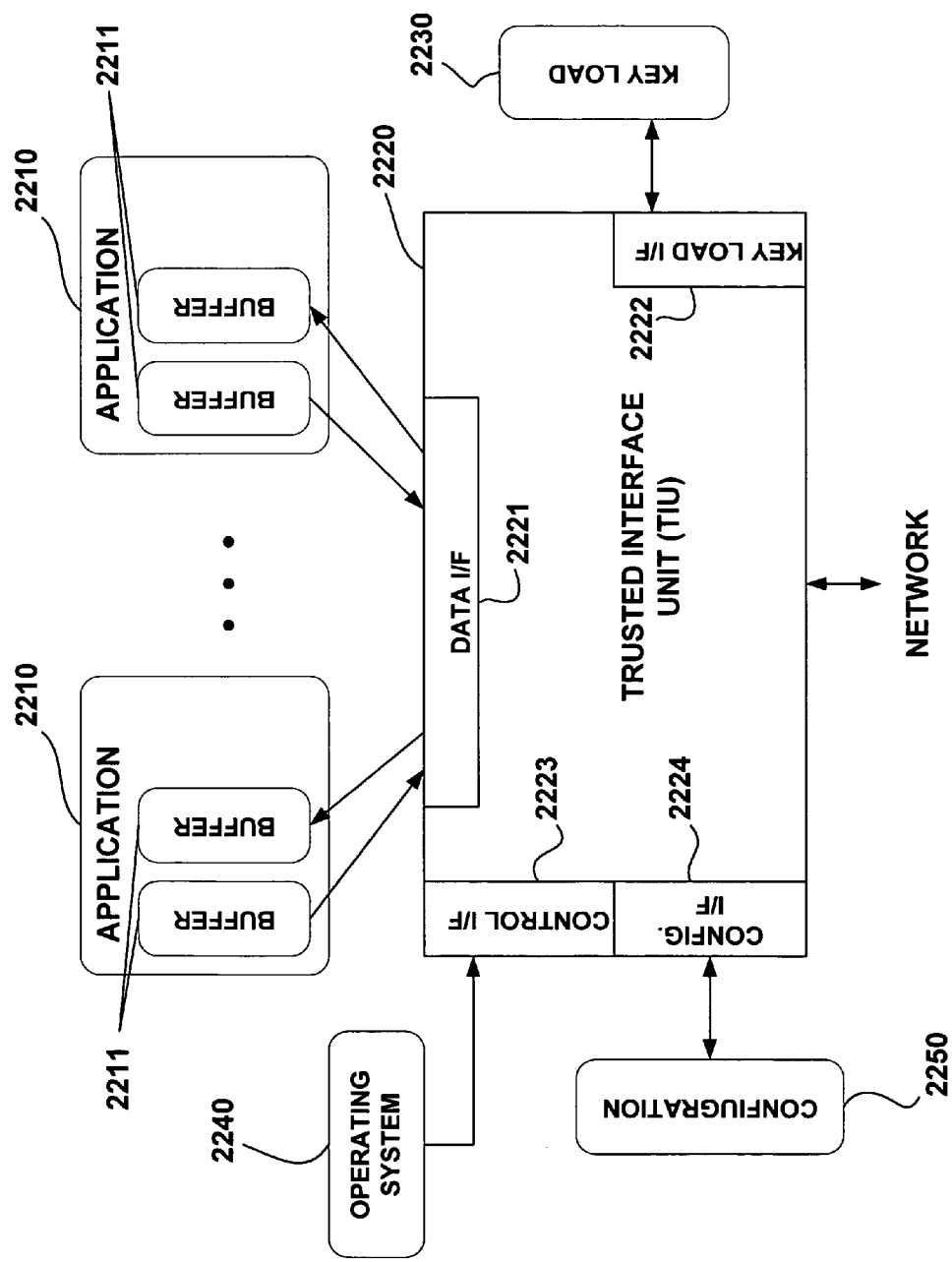
FIG. 16 shows an example of a TIU using zero copy protocols according to an exemplary embodiment of the present invention.

In the embodiment shown in FIG. 16, the TIU 2220 may be configured in a zero copy mode, which means that the data is only stored in one location and no copies of the information are subsequently made. FIG. 16 shows an example of a TIU 2220 using zero copy protocols according to an exemplary embodiment of the present invention. As shown in FIG. 16, a TIU 2220 of the present invention may be configured to interface with a number applications 2210 that may be stored and/or run from within the node. In the embodiment shown in FIG. 16, the TIU 2220 may be configured to interface with applications 2210 via the data interface 2221. The TTU 2220 may know the location of the data buffers 2211 based on information conveyed from the operating system 2240 to the TIU 2220 via the control interface 2223. Furthermore, configuration data 2250 may be loaded into the TIU 2220 via a configuration interface 2224 to permit the TIU 2220 to perform the necessary operations as may have been predetermined by, for example, a system designer. Data received from the network may be decrypted using a key obtained from the key load 2230 via the key load interface 2222. Thus, one advantage that may be provided by this embodiment of the invention is that there may be faster data processing and throughput and therefore the system may function more efficiently.

Figure 17:
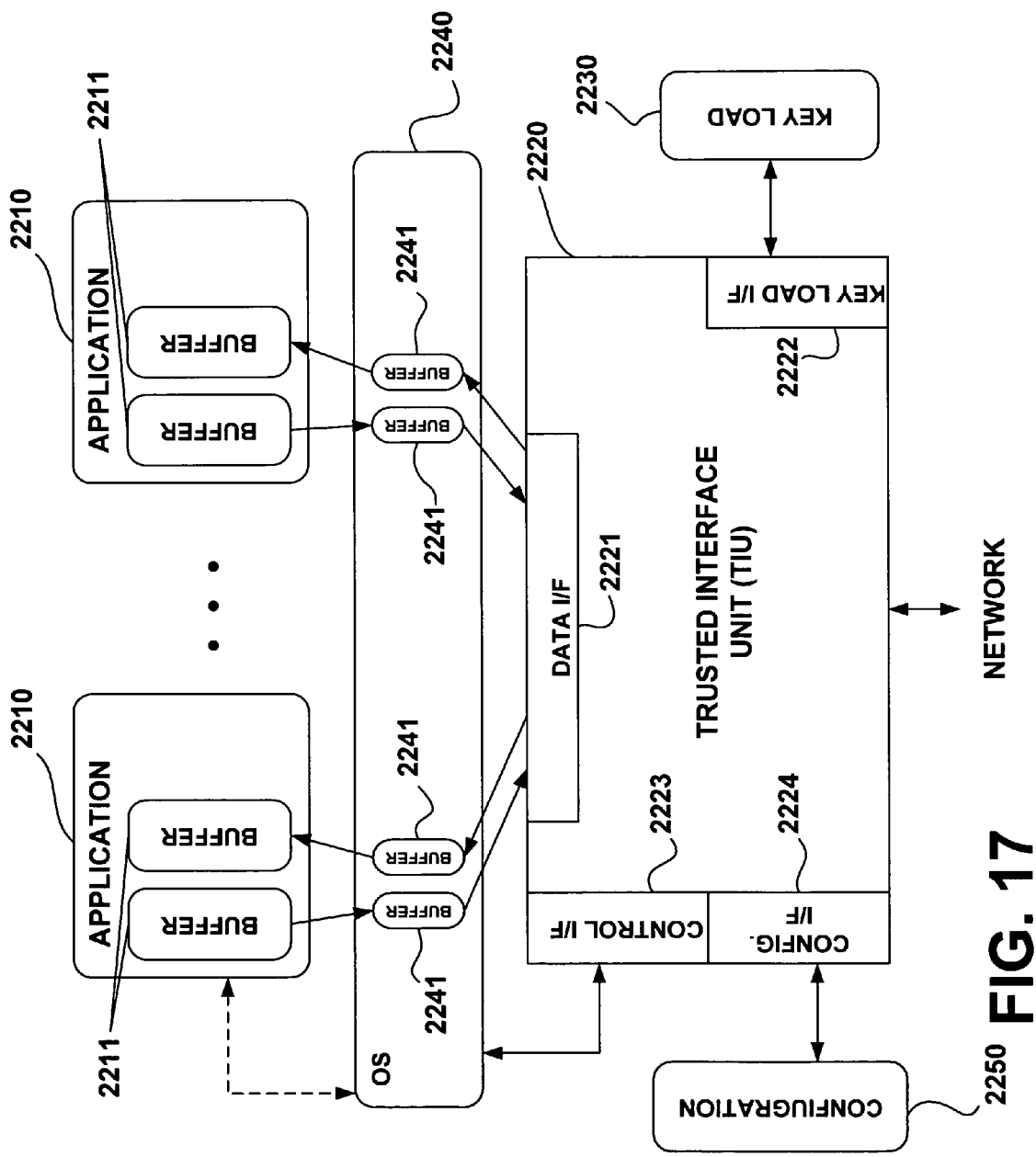
FIG. 17 shows an example of a TIU that is used in connection with an exemplary operating system mediated input/output interface according to an exemplary implementation of the present invention.

FIG. 17 shows an example of TIU 2220 that is used in connection with an exemplary operating system mediated input/output interface according to an exemplary implementation of the present invention. The TIU 2220 illustrated in FIG. 17 is similar to that shown in FIG. 16 except that in FIG. 17, the operating system (OS) 2240 is configured to double buffer, or provide a first buffer 2241 between the TIU 2220 and the applications 2210. Thus, the TIU 2220 may not know the locations of the buffers 2211 for the applications 2210 and therefore, an extra layer of security may be added. Thus, the OS 2240 may upload information pertaining to the buffers 2241 within the OS 2240 via the control interface 2223. Furthermore, configuration data 2250 may be loaded into the TIU via a configuration interface 2224 to permit the TIU to perform the necessary operations as may have been predetermined by, for example, a system designer. Data received from the network may be decrypted using a key obtained from the key load 2230 via the key load interface 2222.

Figure 18:
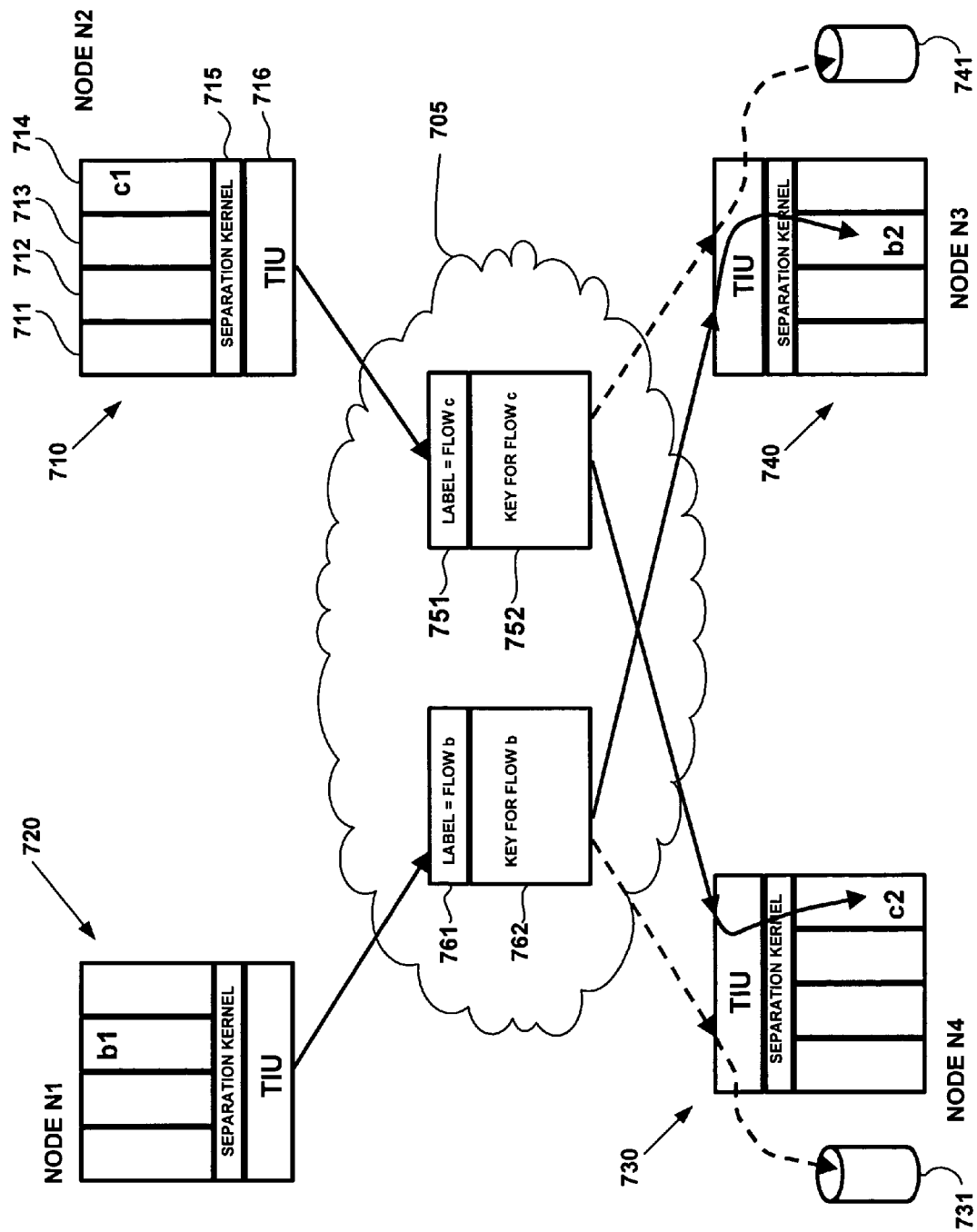
FIG. 18 shows a generic example of data flow on a network using a TIU at the node end points according to one exemplary embodiment of the present invention.

FIG. 18 shows a generic example of data flow on a network using a TIU according to one exemplary embodiment of the present invention. The embodiment illustrated in FIG. 18 includes a number of nodes distributed around a network, which is represented by cloud 705. The nodes may include: Node N1 720; Node N2 710; Node N3 740; and Node N4 730. Data, represented within the network as a packet of data including a label 761 and a data portion that may be encrypted using the appropriate key associated with flow b 762, may be transmitted from one node to another node over the network 705.

Within the network configuration shown in FIG. 18, the TIUs 716 function to permit only the flows that were intended by the system designer. The TIU does not need to be configured to know about classification or sensitivity levels in this approach—rather, it may be configured to determine what the allowed data flows are within the network. This is called herein a "flow-based approach". To implement the flow-based approach, a secure mechanism may be used to provide information to the TIU 716. The TIU 716 may be configured to store this information in a memory. This information may include, for example, information related to the memory mapping of local partitions at the node; the allowed data flows within the network; and cryptographic keys for data flow that originates in or is destined for the local node. Additionally, according to one aspect of the present invention, a secure mechanism may be implemented to inform the TIU 716 regarding the output on a packet-by-packet basis so as to identify the partition the packet is originating from. Additional information that may be stored on a memory device for use by a TIU 716 may include, for example, per-outbound-packet information (e.g., identity of the partition that originated the packet and the claimed flow label for the packet). Additionally, the TIU 716 may be configured to perform functions such as verifying that the originating partition is a source for the claimed flow, which may help in ensuring that the network is not being tampered with; attaching a flow label tot the packet; encryption of the packet with the appropriate cryptographic key or keys; and formatting the packet header and transmission of the packet to the network. For inbound packets, the TIU 716 may be configured to perform such tasks as: looking for the label in a flow table and obtain the appropriate key for the received packet and decrypt the packet using the key; if the decrypted flow label does not match the stored flow label, the TIU 716 may be configured to create a record regarding the incident and report this to the network administrator. Furthermore, the TIU may be configured to compare a value associated with the label, to an expected label value. If the label matches an anticipated or expected label value associated with the label on the received packet stored for use by the TIU 716, the TIU may be configured to look up the partition ID based on the flow label and may be configured to store the data in the destination partition.

The data flow through the network shown in FIG. 18 will now be described. Each node may include, for example, four partitions 711, 712, 713, and 714, each of which may be associated with a predetermined sensitivity of information, such as, for example, information of class c1. A separation kernel 715 may be used to maintain the separation of the information within the Node N1 (and all other nodes shown in FIG. 18 for that matter). Furthermore, each node may be associated with a respective TIU, which may be configured to assure appropriate data flows within the network and maintain security within the network. The TIUs may be configured to operate together to ensure that only appropriate nodes receive data transmitted on the network fabric.

Data may originate on the network from Node N1 720, and may be of a type b1. The TIU may encode the data with the appropriate flow label and encrypt the data using the appropriate cryptographic key and transmit it over the network interconnect 705. The data transmitted from Node N1 720 may include a flow label b, which may be part of the header information stored on the packet 761. Additionally, the packet may also include data 762 that has been encrypted using a cryptographic key associated with top secret data on the network. The solid line from Node N1 720 to Node N3 740 represents the intended data flow. When the data is received by Node N3 740, the data may be input into the Node via the TIU. In one embodiment of the invention, the TIU may be coupled to the only path to the network interconnect 705 from the node, and therefore, data flow may be forced to go through the TIU before entering the Node N3 740. Once the TIU receives the data, the TIU may retrieve the appropriate cryptographic keys associated with the originating node N1 720 on the network and may decrypt the data received from the Node N1. This data may be compared with allowable flows. In the embodiment illustrated in FIG. 18, the data flow from node N1 720 to Node N3 740 is a permissible flow for data, and therefore, the TIU may permit this data to pass into the node N3 740. The TIU may also be configured to inform the separation kernel that the data received is to be directed to a particular partition within the node. In the example illustrated in FIG. 18, the information from node N1 720 may be input into partition b2 in Node N3 740. In the event that the data from node N1 720 is directed to node N4 730, the TIU may receive this information and decrypt it using the appropriate key associated with the point of origin. The TIU may then be configured to determine that the data packet took an impermissible flow through the network and may discard the data into bit bucket 731. In a preferred embodiment of the invention, this data is not input into the separation kernel, thereby isolating the data and disposing the data prior to it being received within the node.

Additionally, as shown in FIG. 18, data of sensitivity level c1 may be output from the node N2 710 via the TIU 716. The TIU may be configured to output the data after encrypting it and adding appropriate flow labels on the data, as has been described above in detail. The packets of data that traverse the network interconnect may include a header 751 that is configured to include the label, such as, for example, a flow label. Alternatively, the label may be a classification or sensitivity label. Additionally, the packet of data may be encrypted with a cryptographic key associated with data flow c 752. Once the data is received by Node N4 730, the data may be decrypted by the Node N4 730 and the TIU may be configured to determine that the data flow was permissible. The TIU may also be configured to act in concert with the separation kernel and may determine what partition the received packet is intended to be fed in to. Based on this information, the separation kernel may be configured to deposit the data into the correct partition c2. Alternatively, if the data from Node N2 is received at the TIU at Node N3 740 the TIU may determine that the data has reached the incorrect node, and that the flow of the data through the network interconnect was impermissible, as indicated by the dashed line. Based on this knowledge, the TIU may dispose of the received packets of information in the bit bucket 741. In a preferred embodiment of the invention, this data is not input into the separation kernel, thereby isolating the data and disposing the data prior to it being received within the node.

Figure 19:
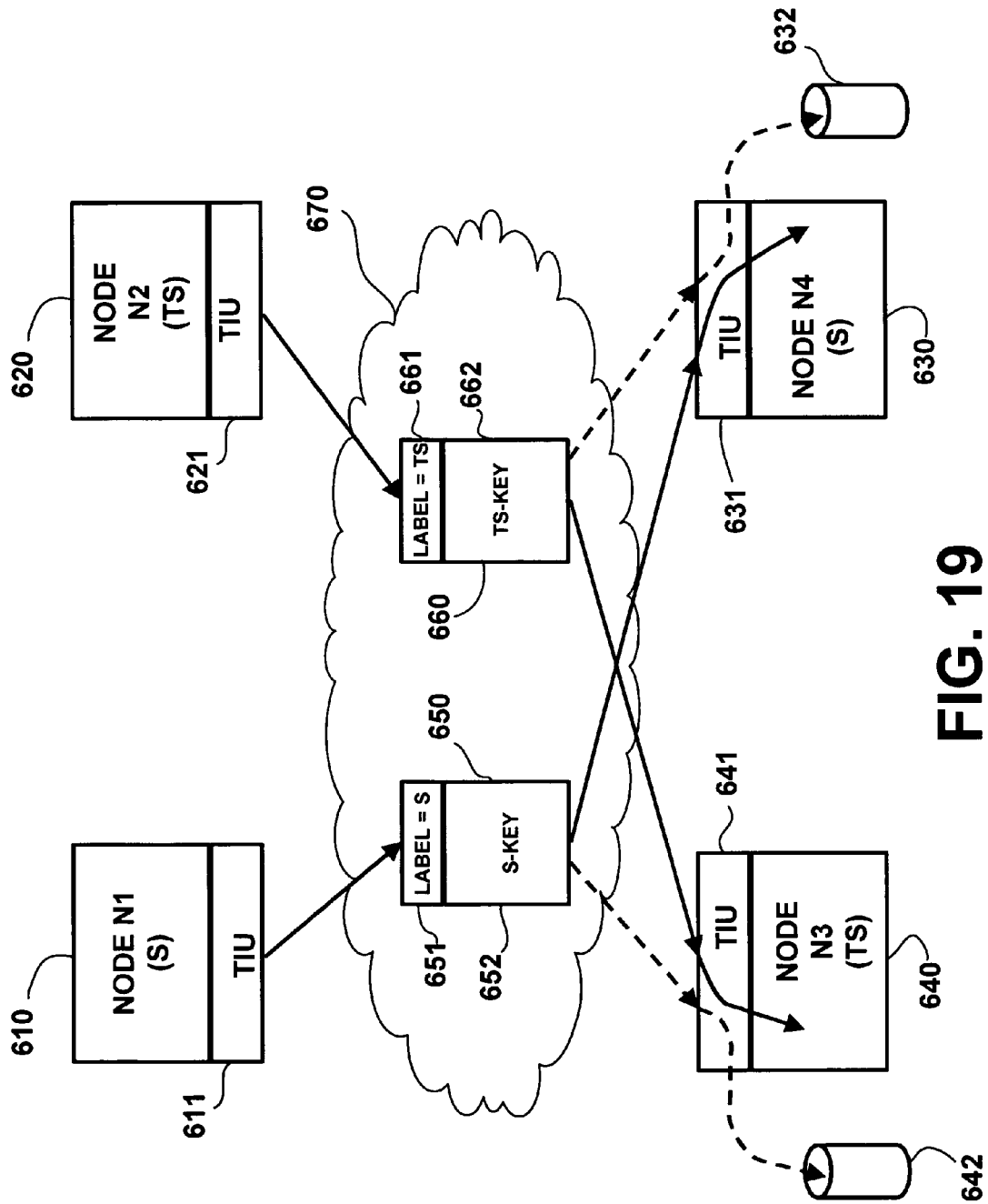
FIG. 19 shows an example of data flow on a network configured to handle secret information and top secret information according to one implementation of the present invention.

FIG. 19 shows an example of data flow on a network configured to handle secret information and top secret information. In the embodiment of the invention illustrated in FIG. 19, the TIU may be configured to handle the various responsibilities for regulating the flow of information on the network such as, for example, attaching labels associated with the classification or sensitivity level of the node that the TIU is associated with; encrypting using the key for local node classification or sensitivity level; and formatting the packet header and transmitting packets to the network. Additionally, the TIU may be configured to perform a number of functions on in-bound packets such as, for example, decrypting the packet using the local node sensitivity levels; if the decryption process is not completed correctly, the problem may be recorded, and if the decrypting process is completed, the TIU may be configured to forward the data to the node and store the data for use by one or more applications within the node.

As in FIG. 18, the solid arrows represent permissible data flows through the network, and the dashed lines represent impermissible data flows through the network. The network may include a number of nodes, Node N1 610, Node N2 620, Node N3 640, and Node N4 630. Nodes N1 610 and N4 630 may share the same sensitivity or classification. For example, in the exemplary embodiment of a network according to FIG. 19, the classification of nodes N1 610 and N4 630 may be secret ("S"). Furthermore, the classification associated with nodes N2 620 and N3 640 may be, for example, top secret. Each node N1 610, N2 620, N3 640, and N4 630 may be associated with a TIU 611, 621, 641, and 631, respectively.

The operation of the network shown in FIG. 19 will now be described. Node N1 610 may be configured to output data across the network interconnect, which is represented by cloud 670. The data 650 that is sent from the node N1 610 may include secret information that has a flow label "S" 651 and may also include data that has been encrypted with the appropriate key (Smkey) 652 associated with the transmission of the secret information on the network. If the data takes an impermissible flow and ends up at node N3 640, the TIU 641 may be configured to determine that a network flow violation has occurred, and may discard the packet of data in bit bucket 642. In the case where the information is received at node N4 630 the other secret-level node on the network, the data may be decrypted by the TIU 631 and may be stored in the node N4 630 for use by, for example, an application program.

Additionally, node N2 620 may be configured to output data onto the network. Information originating in Node N2 620 may be top secret information and therefore, should not be routed to a secret-level node. The data 660 transmitted by the TIU 621 and Node N2 620 may include a header 661 that includes a label indicating that the data is top secret information and may also include a label associated with a cryptographic key (TS-key) 662. In the event that the data is transmitted to node N4 630, the TIU 631 may be configured to recognize that the data has taken an improper flow through the network and may dispose of the data in bit bucket 632.

Figure 20:
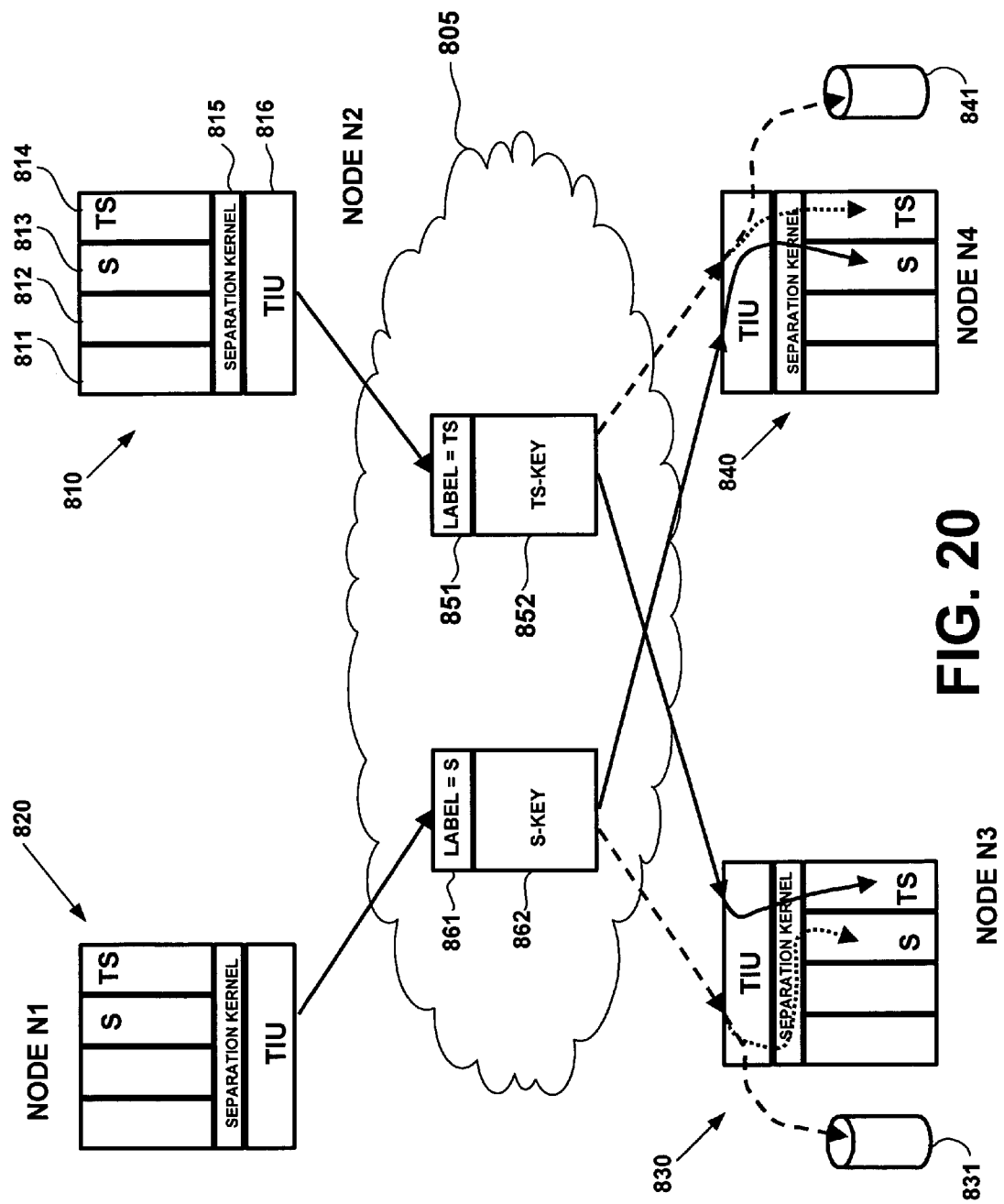
FIG. 20 shows an example of data flow on a network configured to handle secret information and top secret information where the nodes are configured with operating systems running a separation kernel.

FIG. 20 shows an example of data flow on a network configured to handle secret information and top secret information where the nodes are configured with operating systems running a separation kernel. In the embodiment illustrated in FIG. 20, a secure mechanism may be used to inform the TIU on an outbound packet-by-packet basis as to the identity of the partition from which the packet is originating. In the embodiment illustrated in FIG. 20, the TIUs may be configured to have access to the following information: (1) a memory mapping of the local partitions; (2) classification or sensitivity levels of the local partitions; (3) encryption keys associated with the local node classification or sensitivity levels, such as, for example, an S-key and a TS-key; (4) local partition vs. inbound network address information; and (5) identity of the partition that originated a given packet. In some embodiments of the present invention a subset of this information may be available to the TIU. Alternatively, all of this information may be available for access by the TIU. The TIU shown in FIG. 20 may also be configured to perform the following tasks: (1) attach a label to the packet in accordance with the classification or sensitivity level of the partition that originated the packet; (2) encrypt the packet with a key for the classification or sensitivity level of the originating partition; (3) format the packet header and transmit the packet on the network; (4) look up the partition ID from the network address for inbound packets; (5) look up the appropriate encryption key associated with the classification or sensitivity level of the partition; (6) decrypt the received packet using the key to determine the packet classification or sensitivity level; and (7) if this is unsuccessful, record the incident and sanitize the buffer, and if it is successful, determine if the classification or sensitivity level of the partition is less than the packet classification record and if so, record the incident, or store the data in the destination partition.

The flow of data represented in FIG. 20 will now be described. As in previous figures, the permissible data flows through the network are indicated by solid lines, while impermissible information flows are shown using dashed lines. The network may include nodes N1 820, N2 810, N3 830, and N4 840. These nodes may be interconnected to one another over a network interconnect, represented as a cloud 805. Each node 810, 820, 830, and 840 may be configured to run a separation kernel 815 and may have a number of partitions 811, 812, 813, 814 configured to handle data of multiple classifications within the node. Furthermore, each node 810, 820, 830, and 840 may be associated with a TIU 816.

Data may be input from a partition within N1 820 into the TIU. The TIU may be configured to attach a label associated with the classification level of the partition that originated the packet. For example, as shown in FIG. 20, the partition that originated the packet within node N1 820 is the secret partition ("S"). Therefore, the TIU may be configured to attach a label associated with the partition to the packet of data. This information, the data and the associated partition identification information 862 may then be encrypted using a key associated with the classification or sensitivity level of the originating partition. Finally, the TIU may be configured to format the packet header 861 and may attach an appropriate label to the data. In the example shown in FIG. 20, the label may be a label associated with the classification for secret data. This packet may then be transmitted over the network interconnect 805. The packet may be input into the TIU at node N3 830 (i.e., an improper data flow). The TIU may be configured to look up the partition ID from the network address and lookup the encryption key associated with the classification or sensitivity level of the originating partition. Once the appropriate key has been obtained, the packet may be decrypted and a packet classification or sensitivity level may be determined. If the decryption process fails to decrypt the packet, a report may be generated and the buffers may be sanitized. The packet may also be deposited into bit bucket 831. This may be the case when a packet from Node N1 820 is received in Node N3 830 according to FIG. 20. The split in the dashed line represents the second decision that the TIU may be configured to make. If, however, the data is transmitted from Node N1 820 to Node N4 840, the data may be input into the TIU and, after the TIU processes the data as described above, the data may be permitted to pass into the node and may be stored in the "S" partition.

In the example shown in FIG. 20, node N2 may also be configured to output packets of data into the network interconnect. The data may be sent from one of the partitions within the node 810 and may be output to the TIU via the separation kernel. The TIU may receive the packet of data from the separation kernel and may attach a label 851 per the classification level of the partition that originated the packet. In the example shown in FIG. 20, the top secret (TS) partition may have originated the packet, and therefore, the packet may be labeled a TS packet by the TIU. Next, the TIU may be configured to encrypt the data 852 with a key associated with the classification level of the originating partition. Then the TIU may be configured to output the packet to the network interconnect 805. If the packet is routed to node N4 840, the TIU may be configured to reject the packet or to store the packet in a partition having the same classification level as the originating node, as described above. Alternatively, the TIU may be configured to dump the packet in bit bucket 841 to dispose of the misrouted packet of data. If the packet is properly routed to node N3, the TIU may accept the data and store it in the appropriate partition within the node 830.

Figure 21:
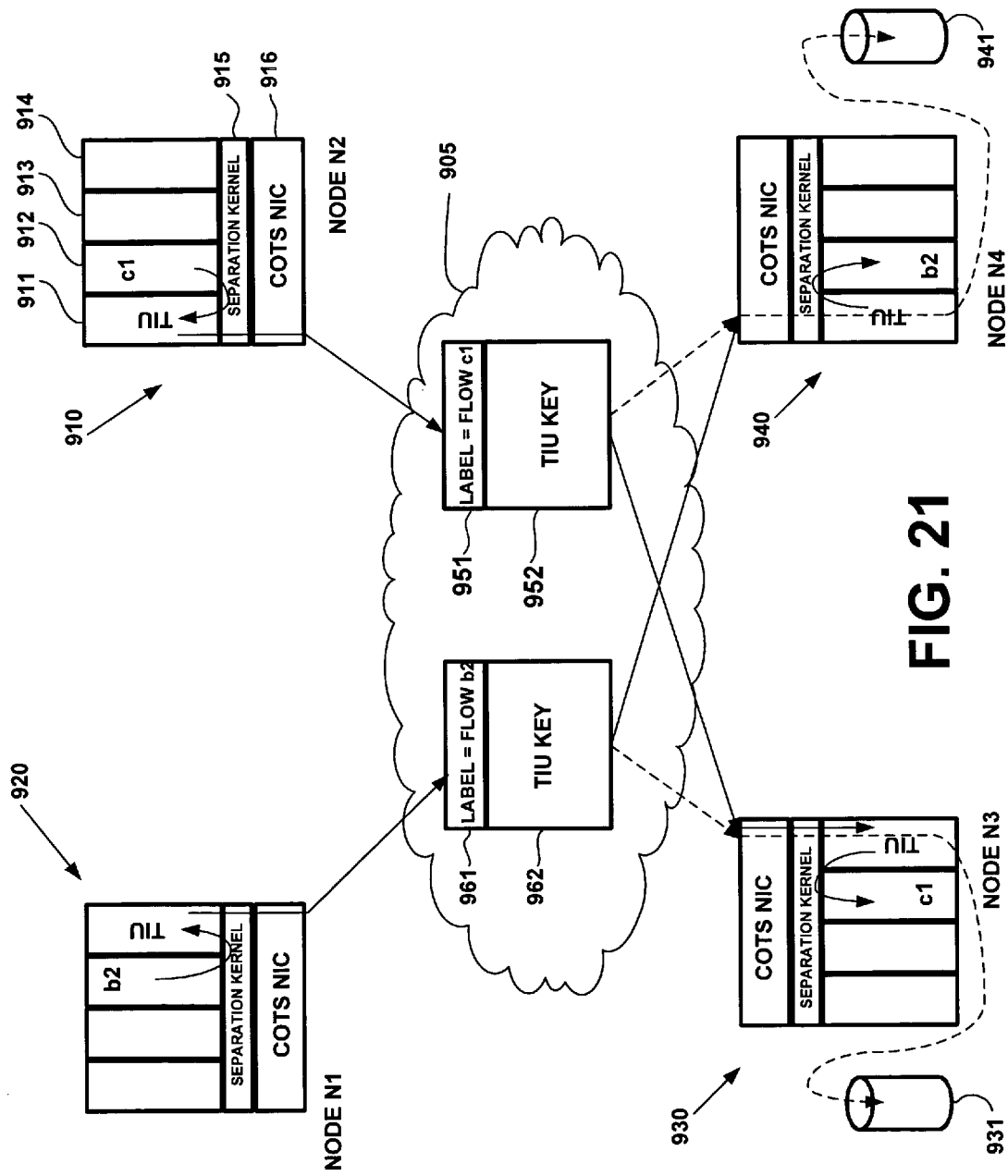
FIG. 21 shows a generic example of data flow on a network using a TIU embodied as software according to another embodiment of the invention.

FIG. 21 shows a generic example of data flow on a network using a TIU embodied as software according to another embodiment of the invention. As shown in FIG. 21, the TIU may be employed as software. The TIU may be located within a partition 911 and may be configured such that it is not bypassed by information entering or leaving the node 910. This TIU may utilize the facilities of a COTS NIC 916 to gain access to the system interconnect fabric 905. The TIU may be configured to utilize encryption to effect separation of data as it flows through the NIC and the fabric in a similar manner that the physical implementations of the TIU do. The encryption may be implemented in the TIU software and may cause expected performance degradation.

The transmission of data through a network using a software implementation of the TIU as described above will now be described. Node N1 920 may be configured to output data of classification or sensitivity level b2. The node N1 may include TIU-related information such as, for example: allowed data flows, including associated network addresses;

encryption keys for flows originating in, or destined for, local nodes, as well as the identity of partitions that originate the individual packets and the claimed flow label for the packets. The TIU in Node N1 920 may be configured to receive data from another partition within the processor in the node 920. The TIU may then be configured to verify that the originating partition is a source of the claimed flow. After performing the verification step, the TIU may be configured to encrypt the data with the appropriate key (i.e., a TIU key) associated with the designated flow, as is shown by the encrypted data 962 on the network 905. Finally, the TIU may be configured to format the packet header 961, including a destination network address, and send the packet to the network.

If the packet is received at node N3 930 the packet may be input into the node via the COTS NIC and may be sent by the separation kernel into the TIU. The separation kernel may be configured to direct all incoming packets into the TIU to determine whether the packets should be kept in the node or whether they were improperly routed to the node. In this case, the TIU may be configured to look up the flow label from the destination network address and may decrypt the packet. If the decrypted flow label does not match the stored label, the incident may be recorded and the packet may be discarded in the bit bucket 931. This will be the case here, because the flow label b2 will not match the flow label associated with the destination node N3 930. Therefore, as shown in FIG. 21, the packet may be discarded. If the packet is received at node N4, the packet may pass through the COTS NIC and may be routed via the separation kernel into the TIU. In this case, the TIU may be configured to look up the flow label from the destination network address and may decrypt the packet. If the decrypted flow label does not match the stored label, the incident may be recorded and the packet may be discarded in the bit bucket 941. In this example, however, the packet has been appropriately routed to the node N4 940 and may be directed by the TIU to the destination partition b2.

Similar to the transmission of data from node N1 920, Node N2 910 may also be configured to transmit data over the network fabric. The TIU partition 911 may be configured to receive data from a partition within the processing node. This originating partition may be, for example, partition 912. The TIU may then be configured to receive the data and verify that the originating partition is a source for the claimed flow. Furthermore, the TIU may be configured to attach a flow label 951 to the packet. This flow label may indicate to the network the intended destination node for the packet. The TIU may then encrypt the data 952 with a key (i.e., a TIU key) associated with the designated flow. After encryption, the TIU may be configured to format the packet header 951 including the destination network address and transmit the packet on the network fabric 905.

If the packet is received at node N4 940 the packet may be input into the node via the COTS NIC and may be sent by the separation kernel into the TIU. The separation kernel may be configured to direct all incoming packets into the TIU to determine whether the packets should be kept in the node or whether they were improperly routed to the node. In this case, the TIU may be configured to look up the flow label from the destination network address and may decrypt the packet. If the decrypted flow label does not match the stored label, the incident may be recorded and the packet may be discarded in the bit bucket 941. This will be the case here, because the flow label c1 will not match the flow label associated with the destination node N3 940. Therefore, as shown in FIG. 21, the packet will be discarded. If the packet is received at node N4, the packet may pass through the COTS NIC and may be routed via the separation kernel into the TIU. In this case, the TIU may be configured to look up the flow label from the destination network address and may decrypt the packet. If the decrypted flow label does not match the stored label, the incident may be recorded and the packet may be discarded in the byte bin 931. In this example, however, the packet has been appropriately routed to the node N3 930 and may be directed by the TIU to the destination partition c1.

It may be desirable to use commercial off the shelf (COTS) components to the extent possible in networks, including networks using the TIU. IPsec is a form of encryption that is commonly used in the internet to create and implement VPNs and may be used in connection with implementations of the present invention. An example that would be appropriate would be the design of replacement of a standard Network Interface Card (NIC) function with a TIU design that included a COTS IPsec component as part of the design. In this case, the entire TIU design, including the use of IPsec may be subject to evaluation for trust.

Figure 22:
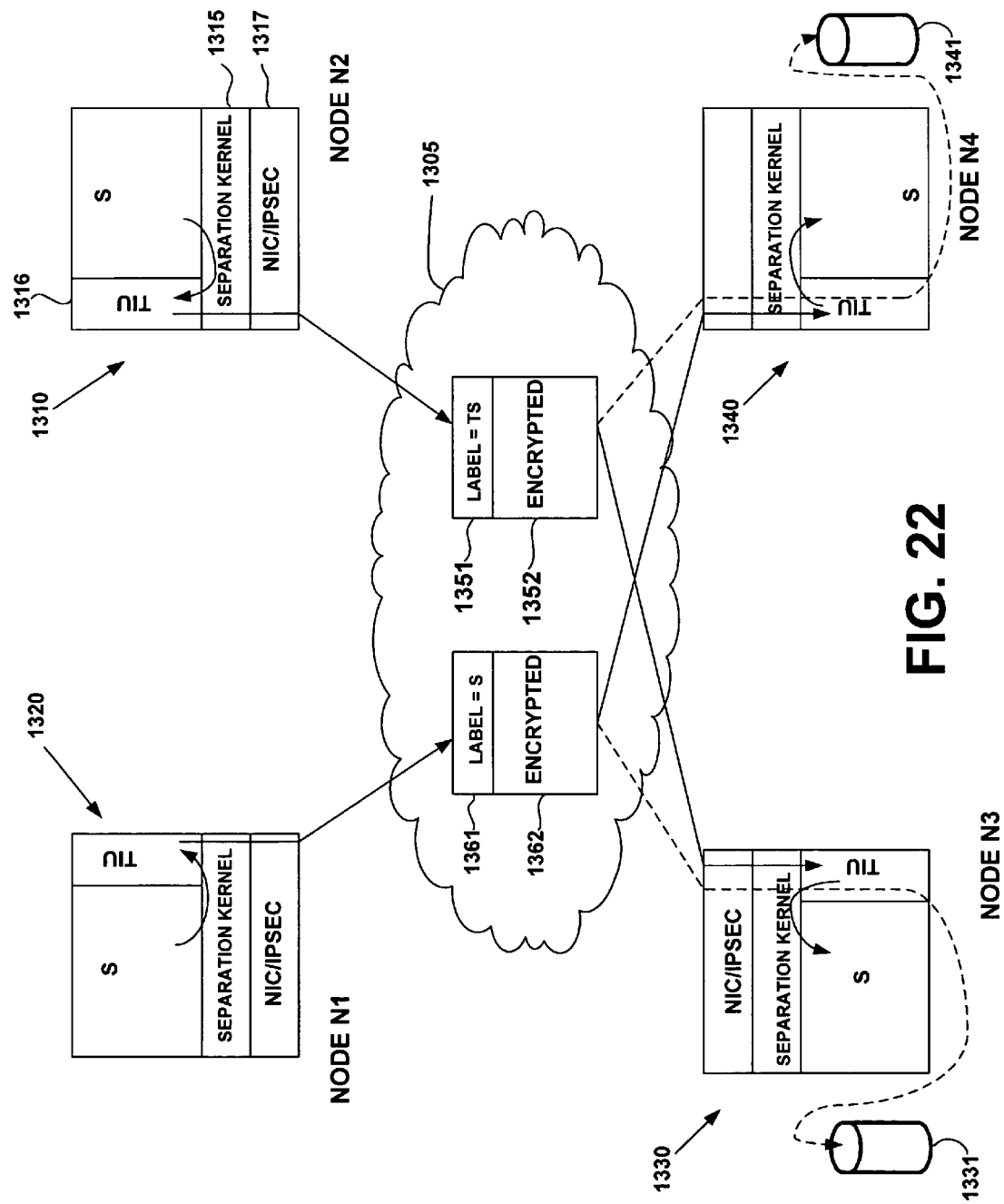
FIG. 22 shows an example of data flow on a network using a TIU embodied as software where the network is configured to handle both secret information and top secret information.

FIG. 22 shows an example of data flow on a network using a TIU embodied as software where the network is configured to handle both secret information and top secret information. The embodiment of the invention illustrated in FIG. 22 includes multiple nodes, N1 1320, N2 1310, N3 1330, and N4 1340. Each of these nodes may include, for example, a TIU that is run on one of the partitions 1316 on the node processor. The integrity of the partitions may be maintained using a separation kernel 1315, as discussed above in detail. Additionally, a COTS NIC 1317 may be configured to encrypt the data from the TIU using, for example, Ipsec. Other types of encryption are possible, however. As in previous embodiments, the TIU performs all the functions that have been associated with the TIU except for the encryption/decryption of packets, which has been reserved for the MC using, for example, Ipsec. Packets including encrypted information 1352, 1362 and header information, including, for example, labels 1351, 1361 may be transmitted over the network fabric 1305 to destination nodes. The TIUs at the destination nodes may be configured to determine if the data was received into the appropriate node and to discard the information if it was received at the incorrect node in bit bucket 1331, 1341.

Figure 23:
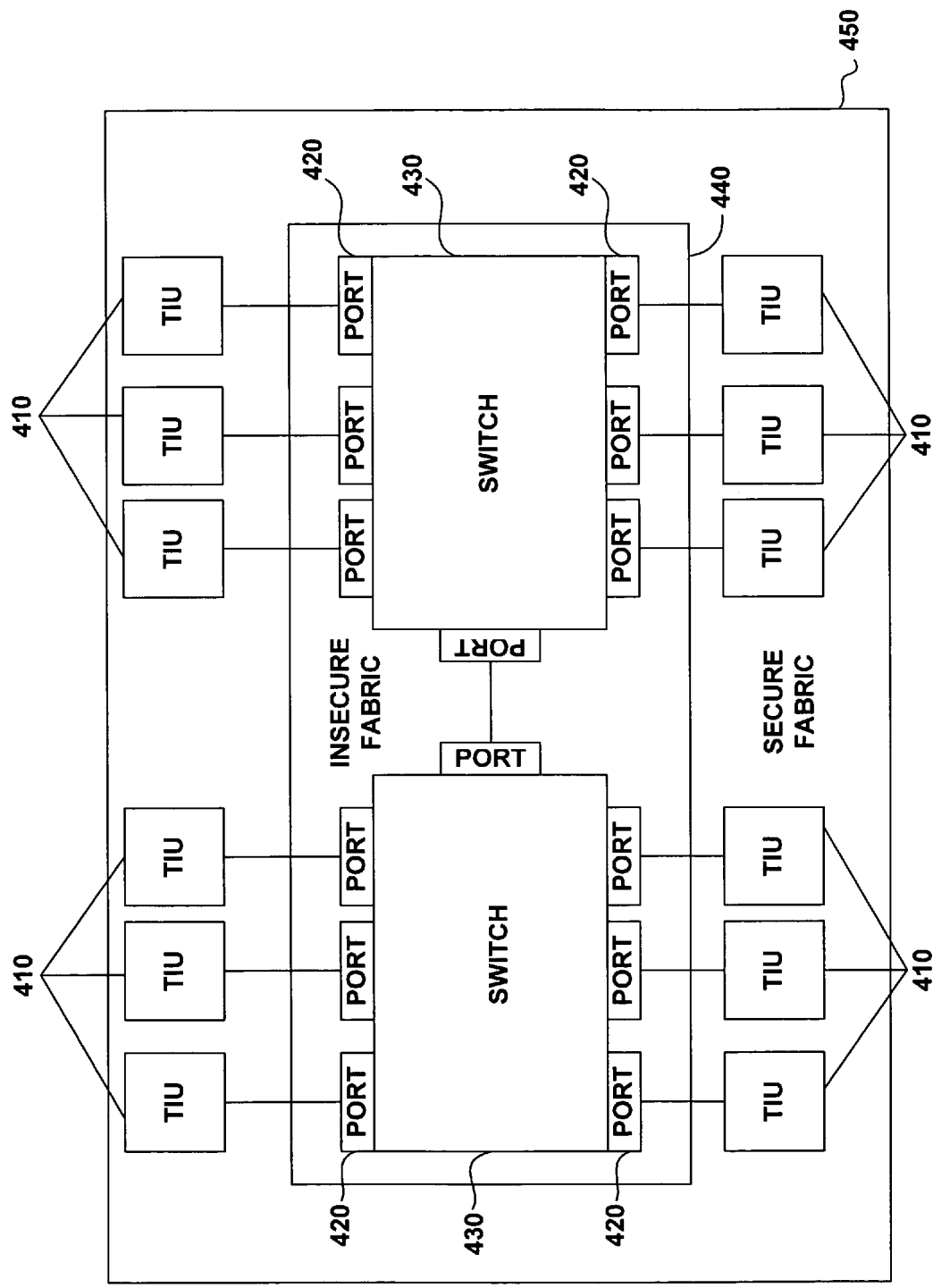
FIG. 23 shows an example of how the TIU may be utilized to receive information from an insecure network fabric into a secure network fabric.

FIG. 23 shows an example of how the TIU may be utilized to receive information from an insecure network fabric into a secure network fabric. The system configuration for achieving a secure fabric 450 may be configured such that each of the ports into the secure fabric 450 is coupled to a TIU 410. Thus, all of the data that is received via the insecure fabric 440 into the secure fabric 450 may be trusted. The insecure fabric 440 may include switches 430 that may have a number of ports 420 that are configured to exchange information. Each TIU 410 in the fabric may be configured to encrypt data as appropriate for routing to the appropriate node in the network.

Figure 24:
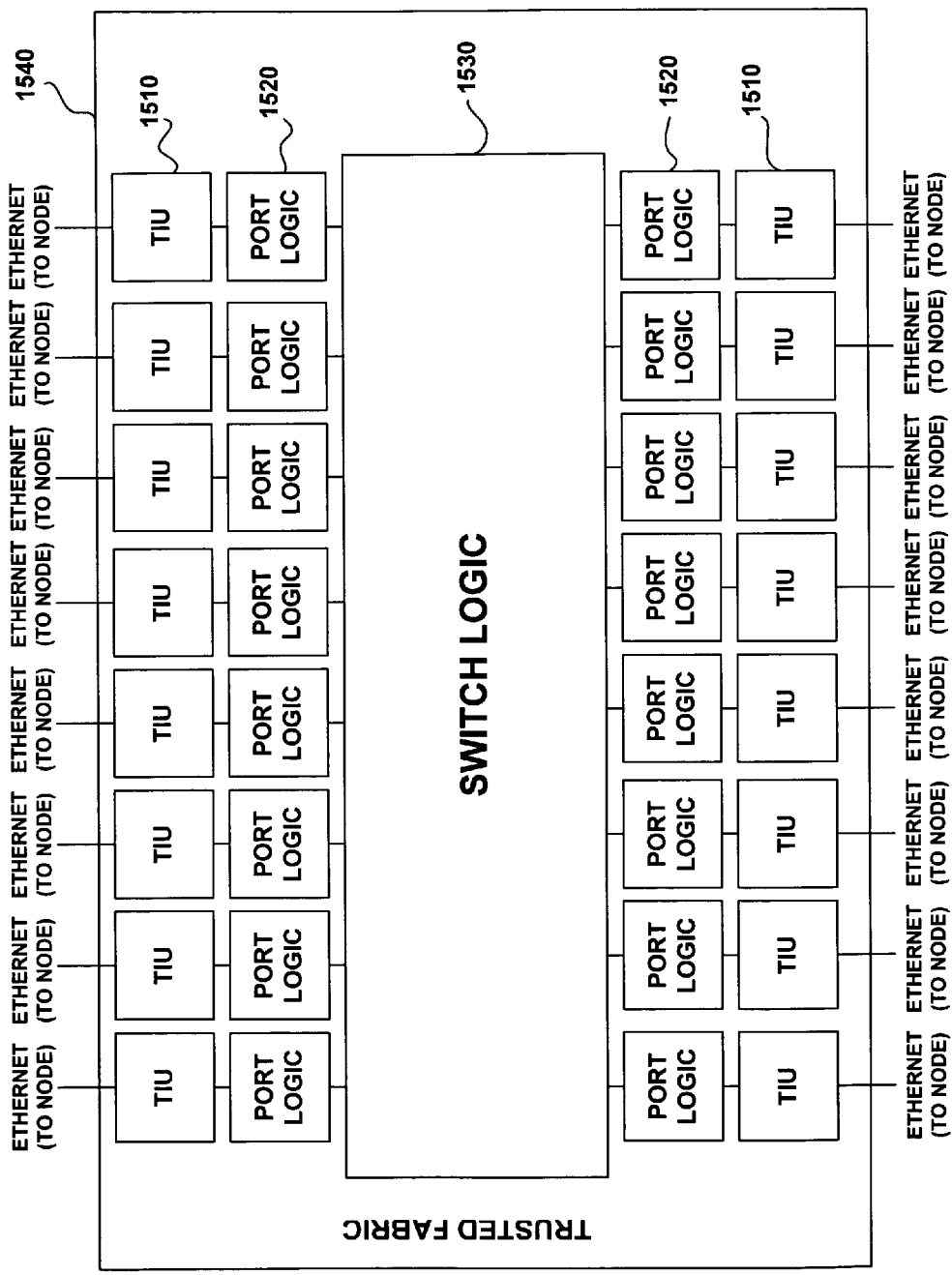
FIG. 24 shows logical view of how the TIU may be utilized to create a trusted network according to yet another embodiment of the present invention.

FIG. 24 shows logical view of how the TIU may be utilized to create a trusted network 1540 according to yet another embodiment of the present invention. In this embodiment, the functions of the TIUs 1510 may be embedded within the switch for which they provide security functions. In FIG. 24, the TIUs 1510 may be located just outside of the switch, such that the functionally, the TIU functions are performed before the data is processed using the port logic 1520. The port logic 1520 and the switch logic 1530 may cooperate to route the packets in the appropriate direction. The TIUs 1510 located at the switch may be configured to ensure that the data is not routed to the incorrect location and can therefore provide network security.

This embodiment of the invention may permit the use of general workstations or insecure computers because the TIUs 1510 may be configured to prevent information from reaching a given computer by error or as a result of tampering with the network. Thus, rather than having secure nodes, the switching fabric may itself be secure.

Figure 25:
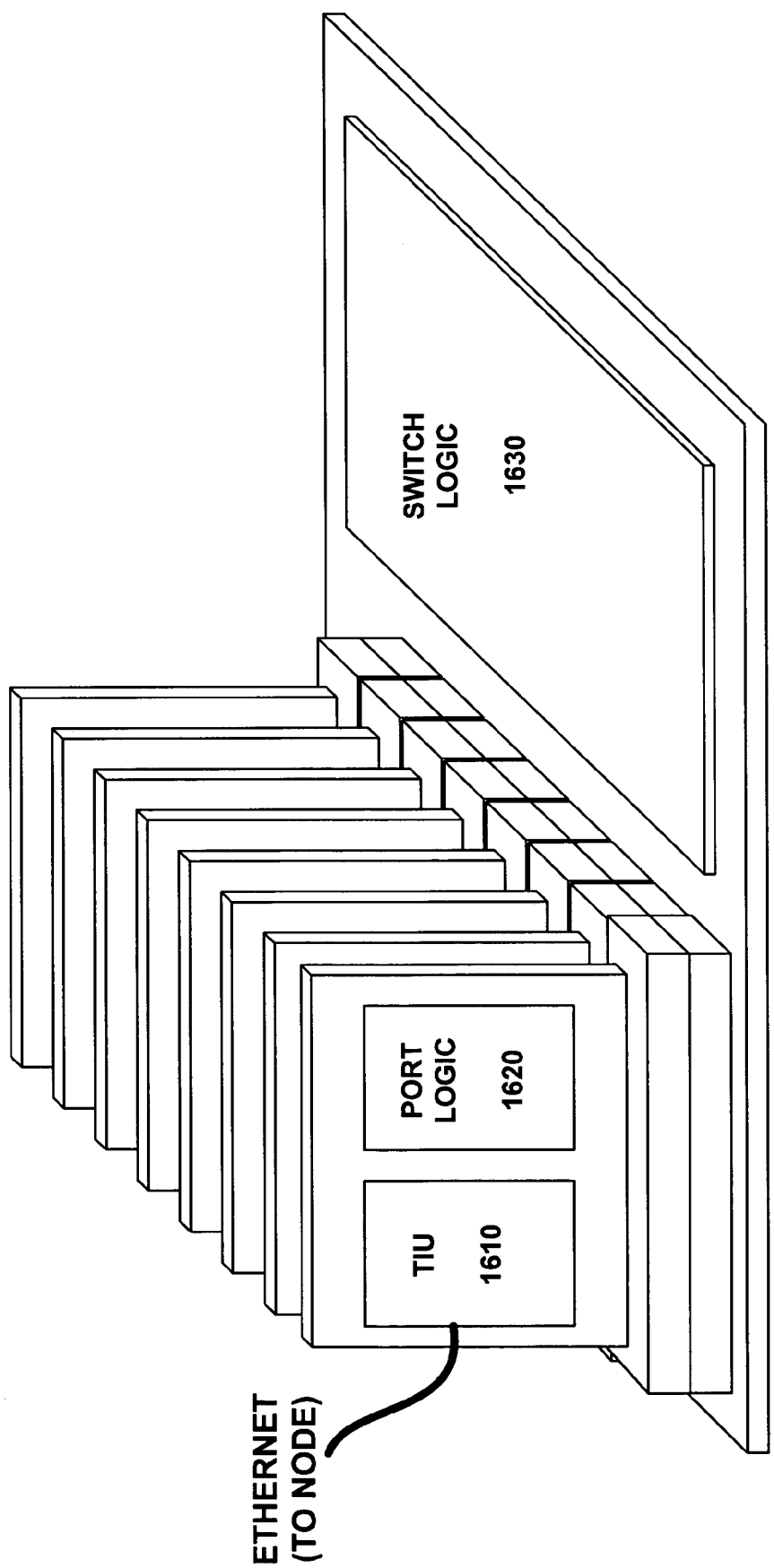
FIG. 25 shows a physical view of how the TIU may be utilized to create the trusted network according to the embodiment of the invention illustrated in FIG. 24.

FIG. 25 shows a physical view of how the TIU may be utilized to create a trusted network according to the embodiment of the invention illustrated in FIG. 24. As shown in FIG. 25, the TIU 1610 may be coupled to the port logic 1620, which in turn may be coupled to the switch logic 1630. The physical binding of the TIU 1610 to the switch logic 1630 may be ensured by physically providing that the Ethernet connection between the TIU and the Switch logic is not compromised.

Figure 26:
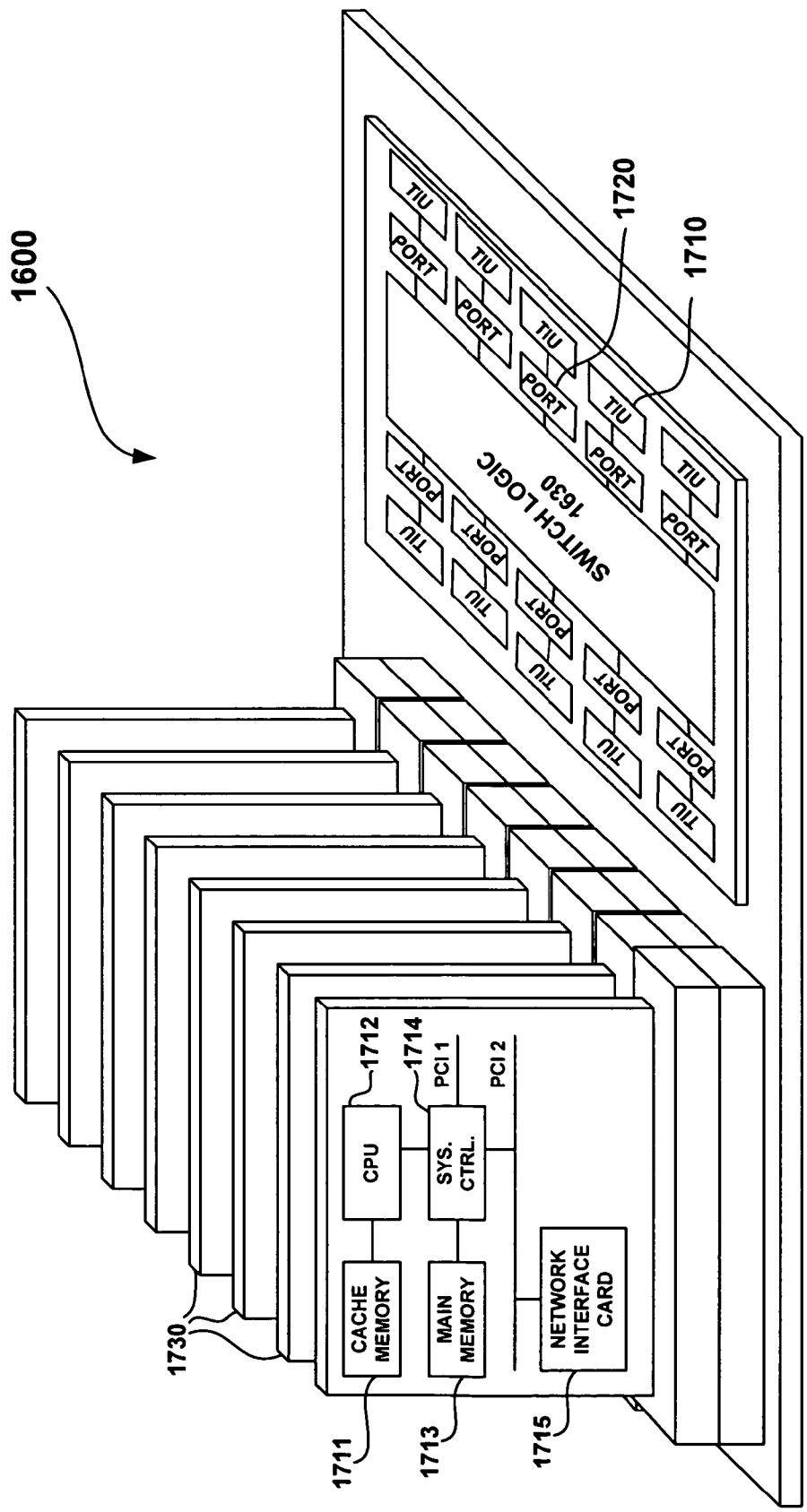
FIG. 26 shows a combined physical and logical view of how a trusted network may be implemented according to an exemplary embodiment of the present invention.

FIG. 26 shows a combined physical and logical view of how a trusted network may be implemented according to an exemplary embodiment of the present invention. As shown in FIG. 26, the secure fabric 1600 may be established as described above with respect to FIGs. 24 and 25, namely by installing the TIUs 1710 at the ports 1720 of the switching fabric, which may be governed by switch logic 1630. The individual nodes may be associated with the secure fabric. These nodes may include, for example a cache memory 1711, a main memory 1713, a CPU 1712, a system controller 1714, and two internal interface ports, PCI 1 and PCI 2. Furthermore, the processor nodes 1730 may be configured with a COTS network interface card (NIC) 1715 so that the processor nodes 1730, such as, for example, personal computers, can access the secure fabric without being equipped with a TIU or other security-maintaining device.

The virtualization of security enclaves may provide numerous benefits to the users in two cases: (1) at system design time, it allows the system designer to quickly configure existing assets into the required security enclaves without regard to physical enclosure boundaries; and (2) at system run time, it may permit a pool of redundant resources to be used to support multiple security enclaves, rather than requiring a separate set of redundant resources for each enclave.

Figure 27:
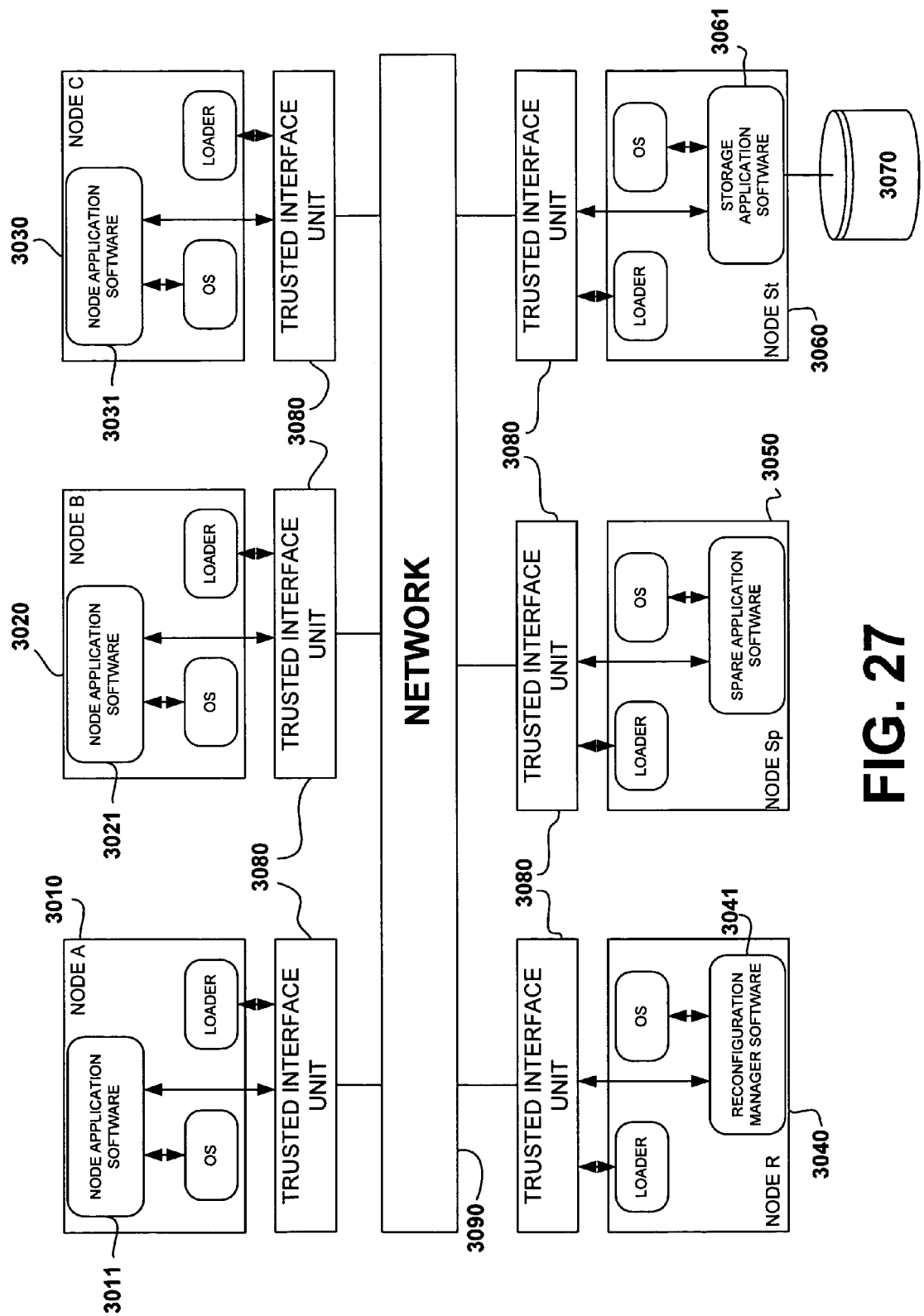
FIG. 27 shows a configuration of a system using a TIU according to one exemplary embodiment of the invention.

FIG. 27 shows a configuration of a system using a TIU according to one exemplary embodiment of the invention. Reconfiguration of a network 3090 using TIUs will be explained with respect to this system architecture. Nodes A, B and C 3010, 3020, 3030 may be configured to run application software 3011, 3021, and 3031 such that the nodes may accomplish the processes that they are assigned to perform. Node Sp 3050 need not be configured to run application software, but rather may be configured to run software that provides the reconfiguration manager software with system status information. In an alternative embodiment of the present invention, the Node Sp 3050 may be configured to run some application software whose functionality could by omitted from the system if the node resources were required to run an application having a higher priority as may be defined by the system designer.

Node St 3060 may be configured to run storage application software 3061, which may be configured to store data for the remainder of the system on storage device 3070. According to one embodiment of the present invention, Node St 3060 may be configured with a mass storage device 3070 coupled to the node. In one embodiment of the invention, the mass storage device may be coupled directly to the node 3060 via a bus. In an alternative embodiment of the present invention, the mass storage device may be coupled to the node St 3060 via some intermediate network 3090 components. Additionally, while only one mass storage device 3070 is shown in FIG. 27, one of skill in the art would realize that any number of mass storage devices may be coupled to the network 3090 for the purpose of, for example, providing redundancy or increasing storage capacity on the network 3090. Node R 3040 may be configured to run special application software called a reconfiguration manager 3041. Its role in the system will be described below. Because of its importance in maintaining the availability of the system to the users, most systems may be configured to implement redundant configuration managers 3041. Each TIU 3080/node pair may be configured to perform a unique role in the system. In order to perform unique roles, however, information must be provided to each TIU/node pair so as to permit the proper functioning of the system. Such information may include TIU role data, which may include, for example, flow or classification or sensitivity tables. Additionally, role location data, reconfiguration manager commands, node application software, and reconfiguration manager software may be provided to facilitate the operation of the network. During system operation, this information may be kept by the TIU in its local volatile or non-volatile memory. In order to allow for latency startup after application of power to the system, this information may be stored in a non-volatile memory on the TIU. To support the reconfiguration processes, it may also be kept in the mass storage unit where it may be accessed by a replacement TIU in case a TIU or a node fails.

To assist in the facilitation of movement of functions among the TIU/Node pairs during the reconfiguration processes, the addressing information in the TIU role data object may be in terms of Roles rather than routable addresses. The relationship of Roles to routable addresses may be maintained in a separate object that is called here in a Role Location data object. As for the TIU role data, the Role Location Data may be stored in a non-volatile memory on the TIU to enhance low latency startup, and may also be kept in the mass storage unit for access by all TIUs.

During a reconfiguration process, commands from the reconfiguration manager may direct the TIUs and nodes to take on new roles by changing the objects that reside in the TIU/node pairs. Since this information may be important to the security of the system, only the reconfiguration manager may be able to issue the commands to modify it according to one embodiment of the invention. Of course, there may be redundant reconfiguration managers within a given system, each running the reconfiguration manager software 3041. This may mean that when a TIU receives a command that is ostensibly from the reconfiguration manager, it should be configured to authenticate the command. The special ReconfigMgrKey may be identified for this purpose. Standard cryptographic techniques and protocols may be used to perform the authentication. The reconfiguration manager commands themselves need not be stored anywhere, they may simply come into existence when the reconfiguration manager determines that they are needed, and they may cease to exist when the target TIU has taken the requested action.

For each TIU/node pair in the system, there may be a software load that may be configured to personalize the pair for its role in the system. When new node application software may be loaded into a node as part of the reconfiguration process, there may be a need to ensure that what is loaded is what the system designer intended it to be. The same RoleAccessKey that was used for the TIU role data may be used here to provide authentication and integrity for the Node application software 3011, 3021, 3031. The node application software 3011, 3021, 3031 may be stored in non-volatile memory on the node in order to enhance latency during system startup. It may also be stored in the mass storage 3070 so that it is available to be loaded into any node during the reconfiguration process.

FIG. 28A shows the TIU applied to a mass storage device 3111 at a node 3110. As shown in FIG. 28A the storage device may include encryption 3112 to protect the stored data at rest. This mass storage illustrated in FIG. 28A may be applied using separate storage devices (nodes 3110, 3114) for data classified at different levels. However, once the data is encrypted, this may not be necessary and the data may be stored in a common system after the data has been encrypted. The nodes may include a SBC 3113, which may be configured to utilize the data in the storage devices 3111. As shown in FIG. 28B, a TIU 3124 may be incorporated into the system at the Ethernet side of SBC 3123. The node 3120 may still include the use of encryption 3122. The TIU may be used to protect and control access to the storage device 3121. Similar to FIG. 28A, separate storage devices (nodes 3120, 3125) may be used for data classified at different levels. FIG. 28C shows the use of a single node using a separation kernel 3134 for the handling of data of multiple classification levels, such as for example, secret and top secret data. The TIU may be used on the network to ensure that the node is receiving the correct data from the other nodes on the network through cooperation between the TIU at the node 3130 and the other TIUs on the system. As shown in FIG. 28C, the node may include a SBC 3133 configured to have an operating system running a separation kernel 3133 and configured to encrypt the data using encryption 3132 prior to storing the data in a storage device 3131.

Figure 29B:
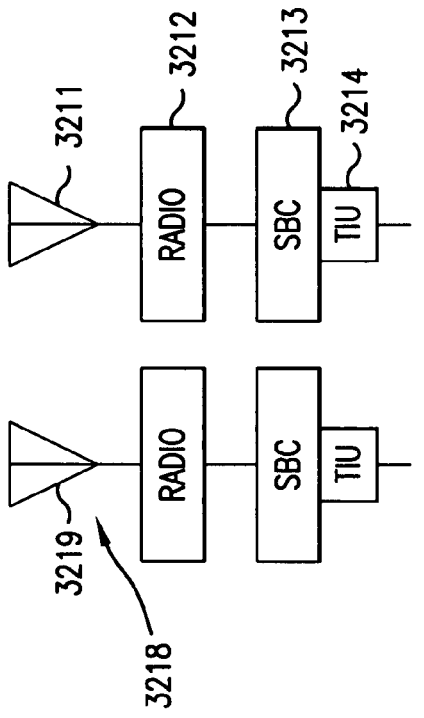
FIGS. 29A-C show how a radio may be used in connection with a TIU according to an exemplary embodiment of the invention.
Figure 29D:
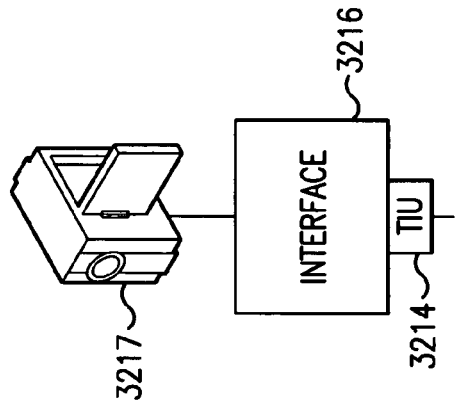
FIG. 29D shows how a camera may be used in connection with a TIU according to an exemplary application of a TIU according to yet another aspect of the present invention.
Figure 29A:
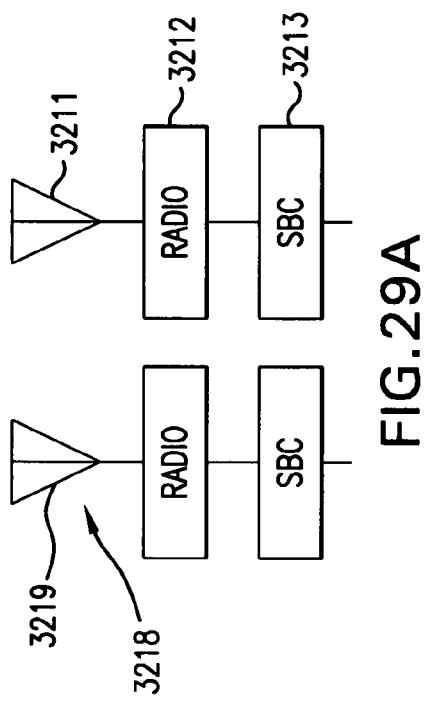
Figure 29C:
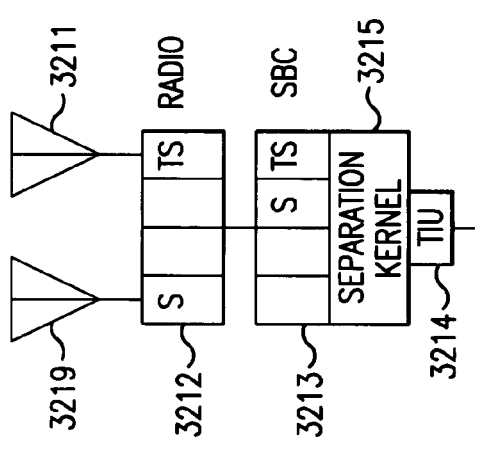

FIGS. 29A-C show radios that may be coupled to networks according to the present invention. As shown in FIG. 29A, a radio device 3212 may be coupled to an antenna 3211. The radio 3212 and antenna 3211 may be configured to transmit and receive classified information. This information may be input into a SBC 3213, which may output a digital form of the information over a network. A second system 3218 with antenna 3219 may be used to handle information having a different classification level, as shown in FIG. 29A. FIG. 29B shows a configuration that enables the radio 3212 and antenna 3211 to be configured to be coupled to a trusted network. Like reference numbers refer to like parts. A TIU 3214 may be coupled to the network side of the SBC to regulate the flow of information on the network. As shown in FIG. 29C, the system shown in FIGS. 29A-B may be employed as a single node using a separation kernel 3215 to keep information of different classifications separate, and may also use a TIU 3215 to maintain the trusted flow of information throughout the network.

FIG. 29D shows another example of a device that may be interfaced with a network employing TIUs according to the present invention. FIG. 29D shows a digital camcorder 3217 that is interfaced via interface 3216 to a network via TIU 3214. Using this means, data from the digital camcorder may be encrypted and routed to an appropriate destination for further processing in a secure and trusted manner.

Figure 30:
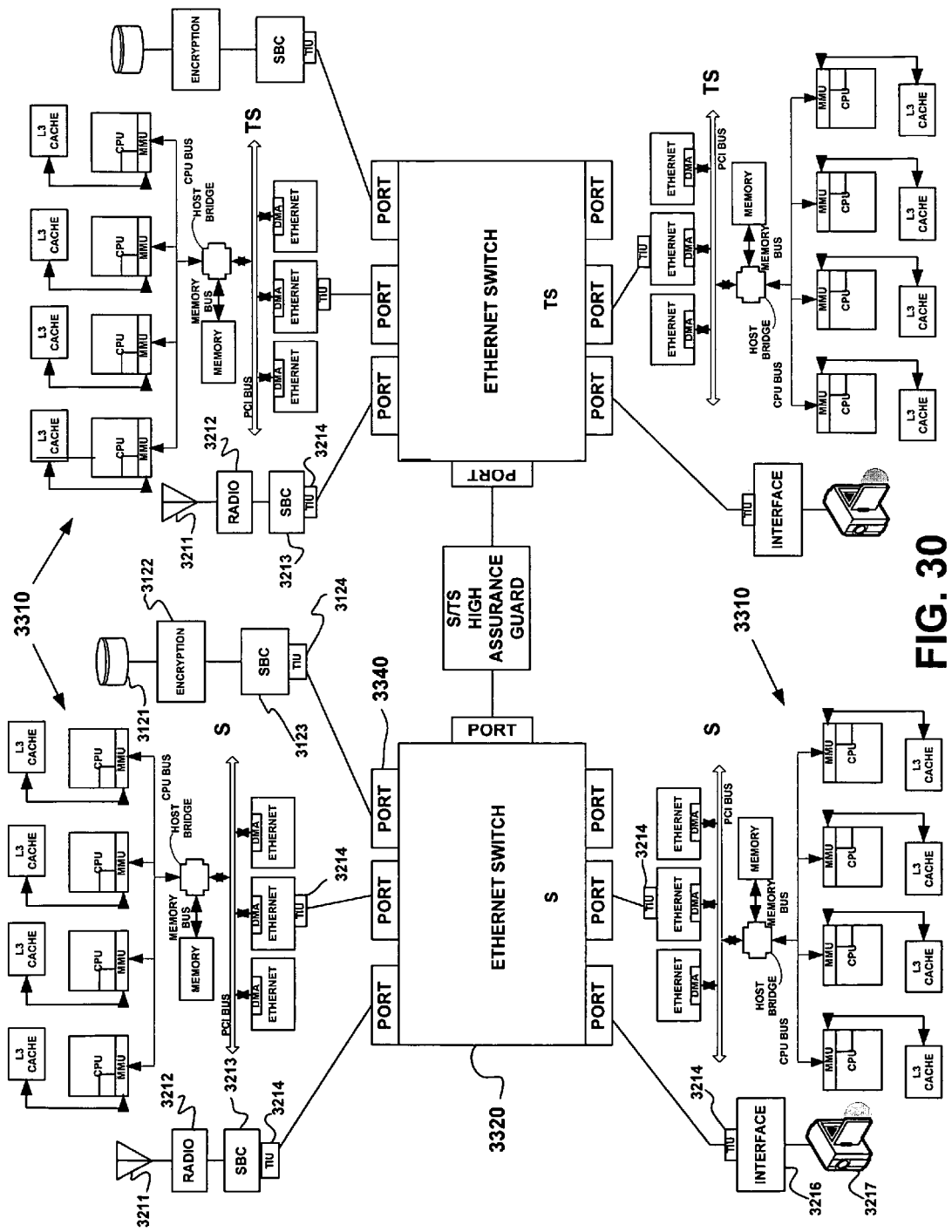
FIG. 30 shows a network architecture using a number of processors and a number of different peripheral devices according to an embodiment of the present invention.

FIG. 30 shows an example of a network architecture employing the concepts of the present invention. The network may include, for example, radios, such as those illustrated in FIGS. 29A-C. These radios may be interfaced with the network via TIUs, such as, for example, TIU 3214. Additionally, the network may include mass storage devices such as those shown in FIGS. 28A-C. Like the radio devices, these mass storage devices may be interfaced with the network via TIUs 3124. In addition to the radios, the network may also include additional peripheral devices, such as, for example, video camera 3217, which may be interfaced to the network via TIU 3214. As shown in FIG. 30, each node on the network is interfaced with network 3320 via ports 3340 which are protected using the trusted interface units (TIUs). These video cameras are only one example of devices that may not be configured to interface directly with a TIU, but FIG. 30 provides an example of how such devices may be coupled to a network including TIUs. Furthermore, entire local computer networks 3310 may be linked together over a PCI bus and may be configured to interface with the network switches via a single TIU. Computer network 3310 is a quad-processor unit that includes four processors that are interconnected via a single bus. As shown in FIG. 30, these processors may be upstream from a TIU, and therefore, data exchange between the different quad processor units 3310 may be trusted in accordance with the various aspects of the present invention.

Figure 31:
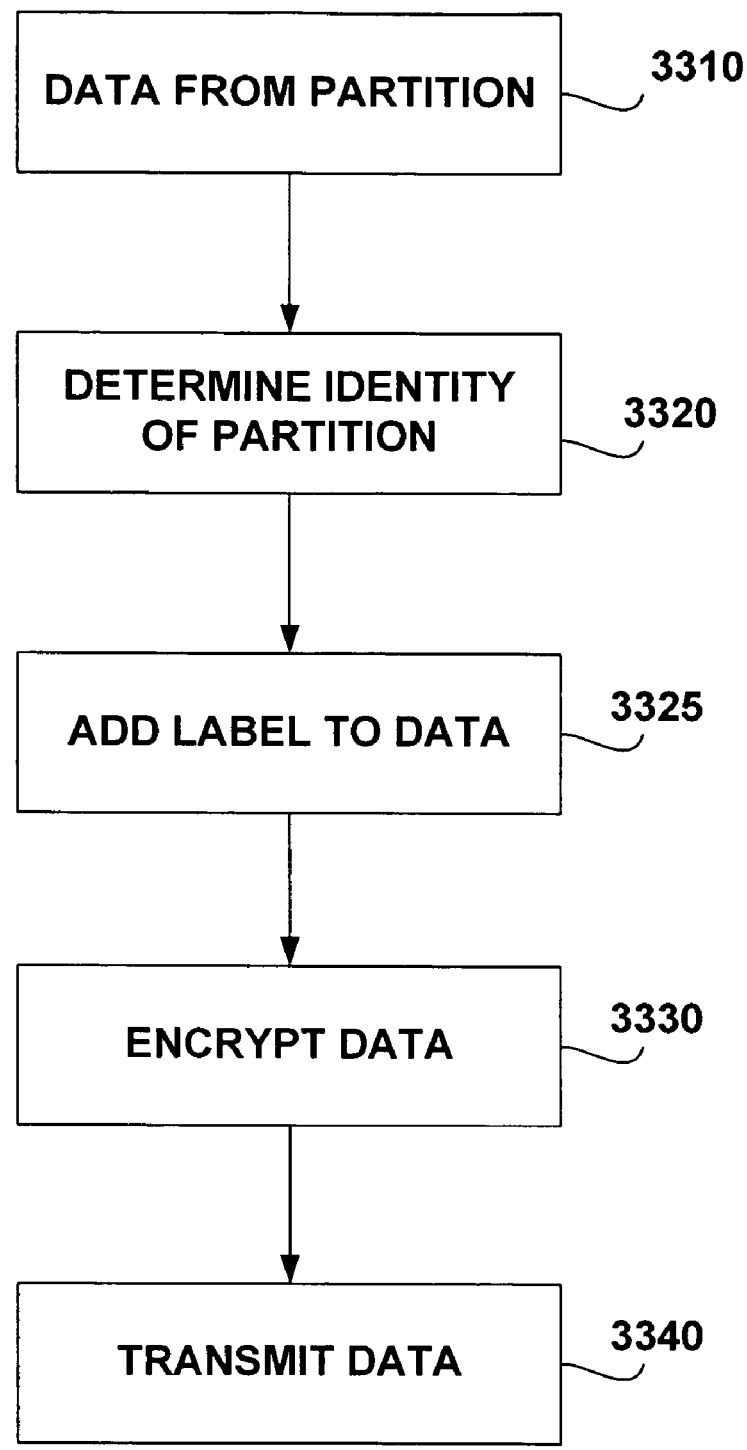
FIG. 31 shows a flow chart of a method of transmitting data according to one embodiment of the present invention.

FIG. 31 shows an exemplary flow chart of a method of transmitting data on a network according to an embodiment of the present invention. According to this exemplary embodiment, data may be received from a partition within the node, step 3310. Once the data is received from the partition, the TIU may be configured to determine the identity of the partition in which the data originated, step 3320. Once the TIU has identified the partition in which the data originated, step 3320, the TIU may be configured to add a label to the data, step 3325. In one embodiment of the present invention, the label may be a label associated with a sensitivity level of the data received from the partition. This sensitivity level may be, for example, a classification level. According to another embodiment of the invention, the label may be a flow label. The TIU may then encrypt the data, step 3330. In an alternative embodiment, which is not shown, the TIU may be configured to add the label after the data has been encrypted. According to this embodiment, the label may be added to an unencrypted portion of the header of the packet of data to be transmitted on the network. After the data has been encrypted and the labels have been added, the data may be transmitted to the network in a trusted manner, step 3340.

Figure 32:
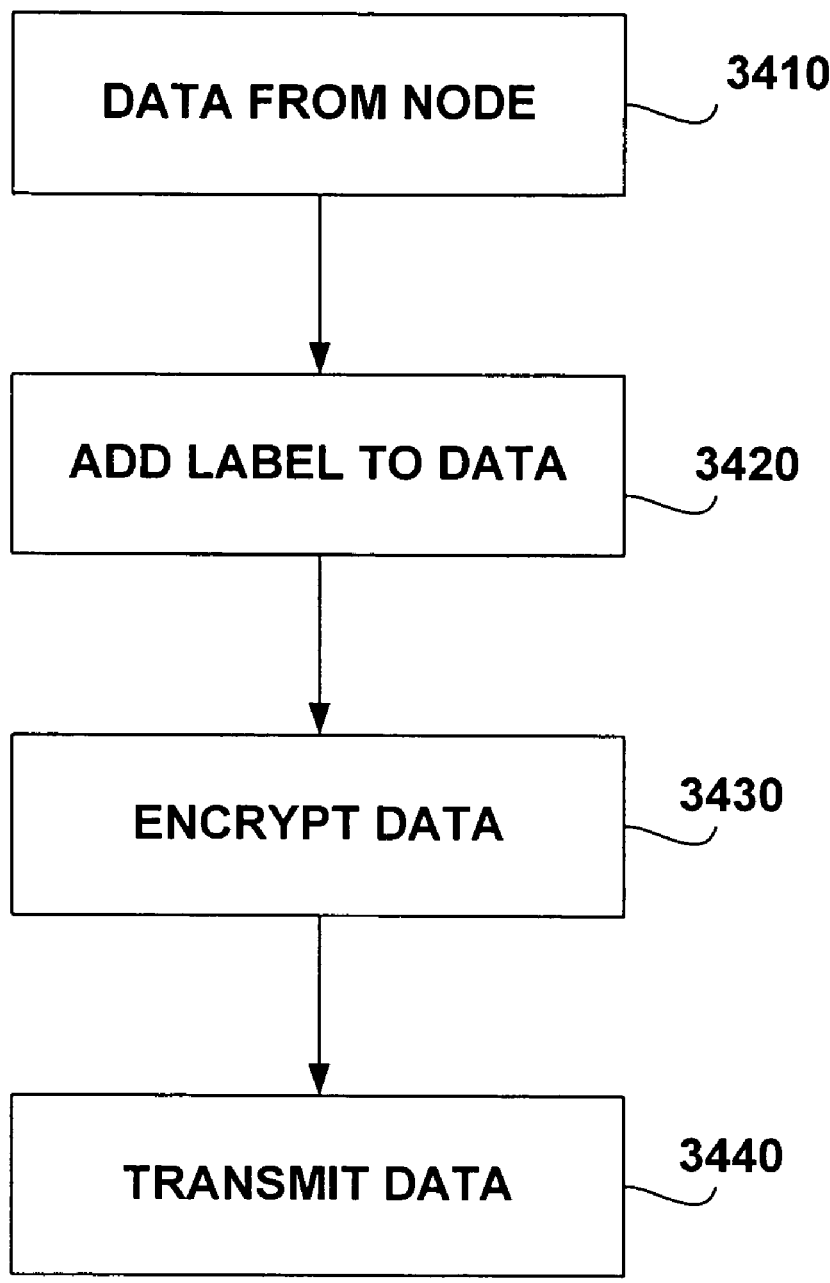
FIG. 32 shows another flow chart of a method of transmitting data according to another embodiment of the present invention.

FIG. 32 shows another example of a method of transmitting data according to another embodiment of the present invention. In this embodiment, data may be received from the node, step 3410. A label may be added to the data received from the node, step 3420. Once the data has been added, the data may be encrypted, step 3430. In an alternative embodiment, as described above, the data may be encrypted prior to adding the label associated with node. The Label associated with the node may be based on a sensitivity level of the associated node. Once the data is encrypted, step 3430, and the label has been added, step 3420, the data may be transmitted over the network, step 3440.

FIG. 33 shows a flow chart of a method of receiving data over a network according to an embodiment of the present invention. Data may be received at a local node from a remote location, such as, for example, a remote TIU within the same network, step 3510. In an alternative embodiment, the data may be received over a trusted network fabric from another node on the network where the other node does not have an associated TIU, but rather the switching fabric is configured to be trusted.

Once the data has been received at the local node, a label associated with the data may be retrieved, step 3520. This label may be encoded on the packet header, for example. In an alternative embodiment, the label may be encrypted as part of the data transmitted from the remote location. The label may have an associated value and that value may be compared to an anticipated value, step 3530. A decision may be made as to whether the value associated with the label is the same as the anticipated value, decision step 3540. This anticipated value may be based on, for example, a flow table stored within a TIU or at a remote location and being configured to be accessed by the TIU directly or indirectly. If the value associated with the label is equal to the anticipated value, then the data may be decrypted, step 3550. If the value associated with the label is not equal to the anticipated value, the data may be discarded, step 3570. In one embodiment of the invention, a report may be generated to record the incident, step 3590. This report may be sent to a system developer or administrator. This may be performed using a retrieved key, step 3550. This key may be retrieved based on the label encoded on the received data. A determination may be made to see if the data has been decrypted properly, decision step 3560. If the data has not been decrypted properly, the data may be discarded, step 3570, and a report may be generated, step 3590. If the data is properly decrypted, the data may be passed into the node, step 3580. In one embodiment of the present invention, the data may be passed into a partition within the node, particularly where the node includes an operating system employing a separation kernel. As indicated by the dashed line, each time a new packet is received from a remote location, this process may be repeated.

While the invention has been described with reference to specific embodiments, these embodiments are not intended to be limiting and have been presented by way of example to illustrate various examples of how a trusted interface unit ("TIU") of the present invention may be employed and utilized in various network configurations. For example, where specific embodiments of the invention describe the storage of information in a non-volatile memory within the TIU, it should be understood that this data may be stored in a volatile memory or may be stored remotely from the TIU. This data may be provided to the TIU at system power up. Various storage and retrieval systems are possible for providing the TIU with the appropriate configuration information. Additionally, while specific network configurations have been shown and described, any number possible network configurations and media are possible. While specific embodiments of the invention were described with respect to Ethernet communications, trusted fiber connect networks and trusted wireless networks may be facilitated using the inventions disclosed herein. The invention as disclosed herein is limited only by the following claims.

What is claimed is:

1. A method of transmitting data over a network, the method comprising:
   receiving data from a partition within a node on the network, the node being configured to transmit data associated with a plurality of sensitivity levels, the partition characterized by a sensitivity level;
   determining an identity of the partition within the node;
   adding a label to the data received from the partition, the label identifying the partition, and the sensitivity level of the partition, from which the data was received;
   obtaining a cryptographic key based on at least an identity of the partition and the sensitivity level of the partition, the cryptographic key being uniquely associated with the label added to the data;
   encrypting the data with the cryptographic key; and
   transmitting the data over the network.

2. The method of claim 1, wherein the label is one of a sensitivity label, a classification label, and a flow label.

3. The method of claim 1, wherein the label is a flow label, and said obtaining a cryptographic key is also based on at least a flow corresponding to the flow label.

4. The method of claim 1, wherein the label is associated with a unique destination node within the network, and said obtaining a cryptographic key is also based on the unique destination node within the network.

5. The method of claim 1, wherein the partition within the node is associated with the sensitivity level and wherein the step of adding a label to the data includes adding a label associated with the sensitivity level associated with the partition.

6. A method of receiving data over a network, the method comprising:
   receiving data at a local node from a remote location, the data being encoded with a label and the local node having multiple partitions, each of the multiple partitions being associated with a particular sensitivity level;
   retrieving a cryptographic key based upon the sensitivity level of at least one of the multiple partitions;
   checking the label against an anticipated value;
   discarding the data when the cryptographic key does not decrypt the received data or the label does not match the anticipated value; and
   passing the data to the local node when the label matches the anticipated value and the cryptographic key decrypts the received data.

7. The method of claim 6, wherein the step of checking the data against an anticipated value includes accessing a table including a list of anticipated values.

8. The method of claim 6, wherein the step of passing the data to the local node includes passing the data to the at least one of the multiple partitions in the local node based on the particular sensitivity level associated with the received data.

9. The method of claim 6, wherein the step of receiving the data at a local node includes receiving the data at a unit located at a point of data ingress and egress from the local node.

10. The method of claim 9, wherein the unit is the only point for data to enter or exit the local node.

11. The method of claim 6, wherein the step of passing the data to the local node includes passing the data to the at least one of the multiple partitions within the local node using a separation kernel.

12. The method of claim 6, wherein the step of retrieving the cryptographic key includes accessing a key memory to retrieve the cryptographic key.

13. The method of claim 6, further comprising:
   generating a report when the data that is received is discarded.

14. A method of transmitting and receiving data over a network, the method comprising:
   receiving data from at least one of multiple partitions within a first node on the network, the first node being configured to handle data associated with a plurality of sensitivity levels;
   determining an identity of the at least one of multiple partitions within the first node, the at least one of multiple partitions being associated with a sensitivity level of the plurality of sensitivity levels;
   encoding a label to the data received from the at least one of multiple partitions;
   obtaining a cryptographic key based on the identity of the at least one of multiple partitions and the corresponding sensitivity level of the at least one of multiple partitions, the cryptographic key being uniquely associated with the label added to the data;
   encrypting the data with a the cryptographic key;
   transmitting the data over the network;
   receiving the data from the first node, the data including the label added at the first node;
   comparing a value associated with the label encoded in the data received from the first node to an anticipated value;
   retrieving a cryptographic key based on the label;
   decrypting the data using the retrieved cryptographic key;

discarding the data when the retrieved cryptographic key does not decrypt the received data or when the value associated with the label encoded in the data received from the first node is not the same as the anticipated value; and passing the data received from the first node to a second node if the data is not discarded.

15. The method of claim 14, wherein the data is passed from a unit located at a port in a switch fabric into the second node, the second node being operatively coupled to the switch fabric.

16. The method of claim 14, wherein the step of comparing the data against an anticipated value includes accessing a table including a list of anticipated values.

17. The method of claim 14, wherein the step of receiving the data includes receiving the data at a unit located at a point of data ingress and egress from the local node.

18. The method of claim 17, wherein the unit is the only point for data to enter or exit the local node.

19. The method of claim 14, wherein the step of passing the data to the second node includes passing the data to at least one of multiple partitions within the second node using a separation kernel.

20. The method of claim 14, wherein the step of retrieving the cryptographic key includes accessing a key memory to retrieve the cryptographic key.

21. A trusted interface unit comprising:
a data processing element, the data processing element being configured to run application software and to receive data from a data interface;
an encryption/decryption element, the encryption/decryption element being configured to receive a cryptographic key and being configured to encrypt data received from the data processing element and being configured to decrypt data received from a network interface; and
a network interface processing element, the network interface processing element being configured to add a label to data being output onto a network and being configured to identify a label added to data received from a remote location on the network;
wherein the network interface processing element is configured to add a label associated with a sensitivity level of data received from one of a plurality of partitions within a node, each of the plurality of partitions being associated with a particular sensitivity level; and
wherein the encryption/decryption element is configured to obtain a cryptographic key based on at least the sensitivity level of the data received, the cryptographic key being uniquely associated with the label added to the data, and to encrypt the data with the cryptographic key.

22. The trusted interface unit of claim 21, wherein the data processing element, the encryption/decryption element, and the network interface processing element are arranged on a mezzanine card configured to be coupled to a processor board.

23. The trusted interface unit of claim 21, wherein the data processing element, the encryption/decryption element, and the network interface processing element are coupled to a network interface card, the network interface card being configured to interface a node with a network.

24. The trusted interface unit of claim 21, wherein the data processing element, the encryption/decryption element, and the network interface processing element are encoded on a computer readable medium as processor-readable software code.

25. The trusted interface unit of claim 24, wherein the processor-readable software code is run in a partition of a separation kernel at a node on the network.

26. The trusted interface unit of claim 21, wherein the data processing element, the encryption/decryption element, and the network interface processing element are configured to prevent unauthorized data flows into a node on the network.

27. The trusted interface unit of claim 21, wherein the trusted interface unit is configured at ingress and egress ports of a network fabric.

28. The trusted interface unit of claim 21, wherein the sensitivity level is a classification level.

29. The trusted interface unit of claim 21, wherein the label is one of a flow label and a sensitivity label.

* * * * *